(12) United States Patent
Lee et al.

(10) Patent No.: US 9,460,689 B2
(45) Date of Patent: Oct. 4, 2016

(54) MOBILE TERMINAL AND METHOD FOR CONTROLLING THE SAME

(71) Applicant: LG ELECTRONICS INC., Seoul (KR)

(72) Inventors: Haein Lee, Seoul (KR); Jungsun Cho, Seoul (KR); Yeongnam Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 70 days.

(21) Appl. No.: 14/478,706

(22) Filed: Sep. 5, 2014

(65) Prior Publication Data

US 2015/0379964 A1    Dec. 31, 2015

(30) Foreign Application Priority Data

Jun. 25, 2014  (KR) .................. 10-2014-0078466

(51) Int. Cl.
| | | |
|---|---|---|
| *G09G 5/12* | (2006.01) | |
| *G06F 3/041* | (2006.01) | |
| *G06F 3/01* | (2006.01) | |
| *G06F 1/16* | (2006.01) | |
| *G06F 3/0486* | (2013.01) | |
| *G06F 3/0485* | (2013.01) | |
| *H04M 1/725* | (2006.01) | |
| *G06F 3/0488* | (2013.01) | |

(52) U.S. Cl.
CPC ............... *G09G 5/12* (2013.01); *G06F 1/1626* (2013.01); *G06F 3/017* (2013.01); *G06F 3/0412* (2013.01); *G06F 3/0416* (2013.01); *G06F 3/0485* (2013.01); *G06F 3/0486* (2013.01); *G06F 3/04883* (2013.01); *H04M 1/7253* (2013.01); *G06F 2203/04101* (2013.01); *G06F 2203/04104* (2013.01); *G06F 2203/04806* (2013.01); *G06F 2203/04808* (2013.01); *G09G 2320/0693* (2013.01); *G09G 2354/00* (2013.01); *G09G 2356/00* (2013.01); *G09G 2370/16* (2013.01); *H04M 2250/64* (2013.01)

(58) Field of Classification Search
None
See application file for complete search history.

(56) References Cited

U.S. PATENT DOCUMENTS

| | | | | |
|---|---|---|---|---|
| 8,527,892 B2* | 9/2013 | Sirpal | ................... | G06F 1/1616 715/702 |
| 8,913,026 B2* | 12/2014 | Yoo | ........................ | G06F 3/0488 345/1.1 |
| 8,982,070 B2* | 3/2015 | Tomimori | ............. | G06F 3/0483 345/1.1 |
| 9,275,077 B2* | 3/2016 | Lee | ........................ | G06F 3/0488 |
| 2010/0079672 A1* | 4/2010 | Bae | ........................ | G06F 3/0483 348/565 |
| 2012/0084694 A1* | 4/2012 | Sirpal | ................... | G06F 1/1616 715/769 |
| 2012/0169638 A1* | 7/2012 | Kim | ....................... | G06F 1/1643 345/173 |
| 2012/0218216 A1* | 8/2012 | Tomimori | ............. | G06F 3/0483 345/173 |
| 2012/0278727 A1 | 11/2012 | Ananthakrishnan et al. | | |

(Continued)

FOREIGN PATENT DOCUMENTS

| | | |
|---|---|---|
| EP | 2 148 268 A2 | 1/2010 |
| EP | 2 226 713 A1 | 9/2010 |

*Primary Examiner* — Dismery Mercedes
(74) *Attorney, Agent, or Firm* — Birch, Stewart, Kolasch & Birch, LLP

(57) ABSTRACT

A mobile terminal including a body; a touchscreen provided to a front and extending to side of the body and configured to display content; and a controller configured to detect one side of the body comes into contact with one side of an external terminal, display a first area on the touchscreen corresponding to a contact area of the body and the external terminal and a second area including the content, receive an input of moving the content displayed in the second area to the first area, display the content in the first area, and share the content in the first area with the external terminal.

19 Claims, 67 Drawing Sheets

(56) References Cited

U.S. PATENT DOCUMENTS

| | | | |
|---|---|---|---|
| 2013/0021262 A1* | 1/2013 | Chen | G06F 3/0488 345/173 |
| 2013/0090065 A1* | 4/2013 | Fisunenko | G06F 3/017 455/41.2 |
| 2013/0122960 A1* | 5/2013 | Kim | H04M 1/7253 455/566 |
| 2013/0169510 A1* | 7/2013 | Tahara | G09G 5/00 345/1.3 |
| 2014/0068469 A1* | 3/2014 | Lee | H04M 1/7253 715/761 |
| 2014/0123038 A1* | 5/2014 | Ahn | G06F 3/0488 715/761 |
| 2014/0164966 A1* | 6/2014 | Kim | G06F 3/04886 715/769 |

* cited by examiner

FIG. 2D
(a)
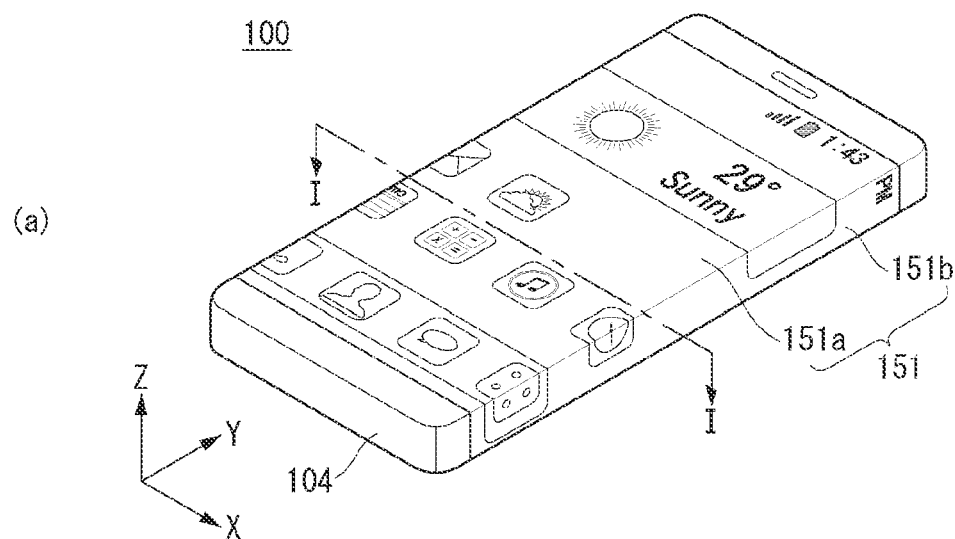
(b)
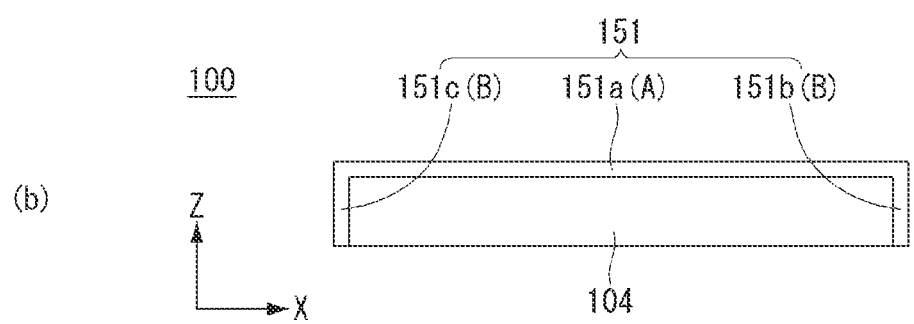
(c)
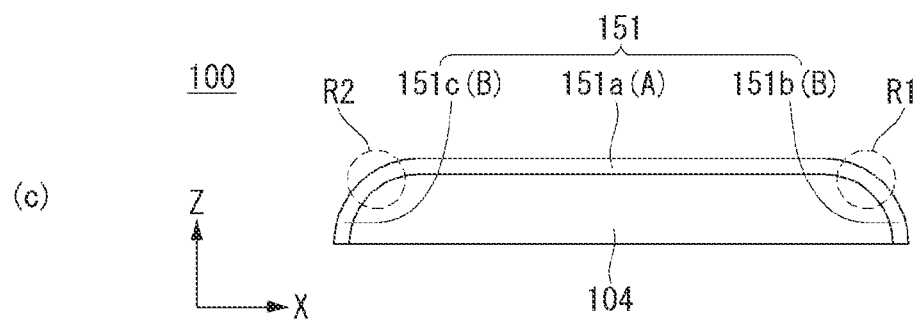

(a)  (b)

FIG. 17a
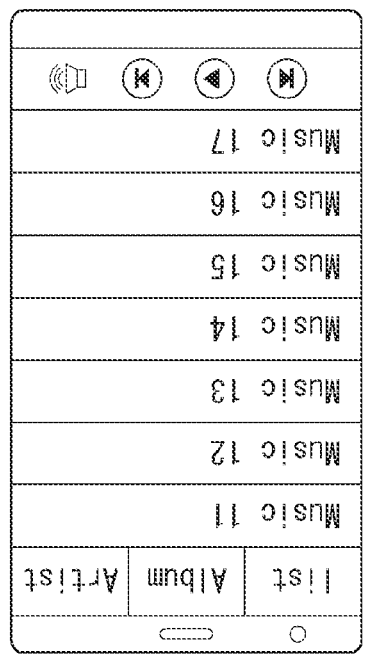

FIG. 23a
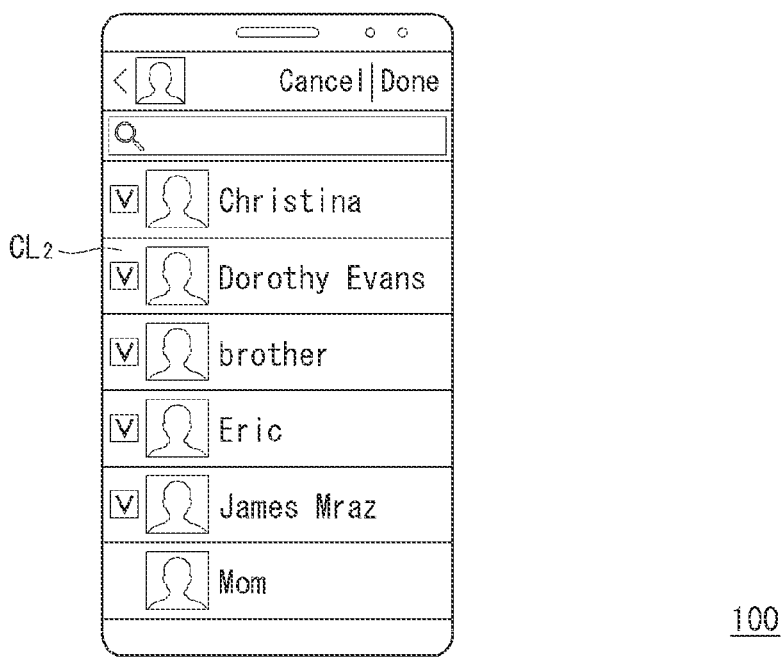
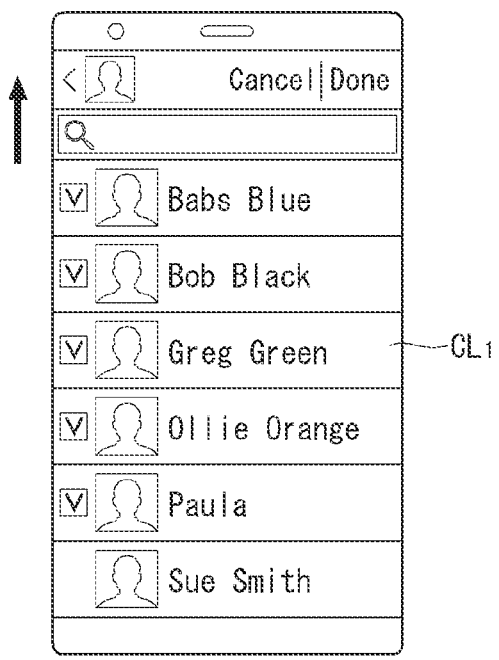

FIG. 34
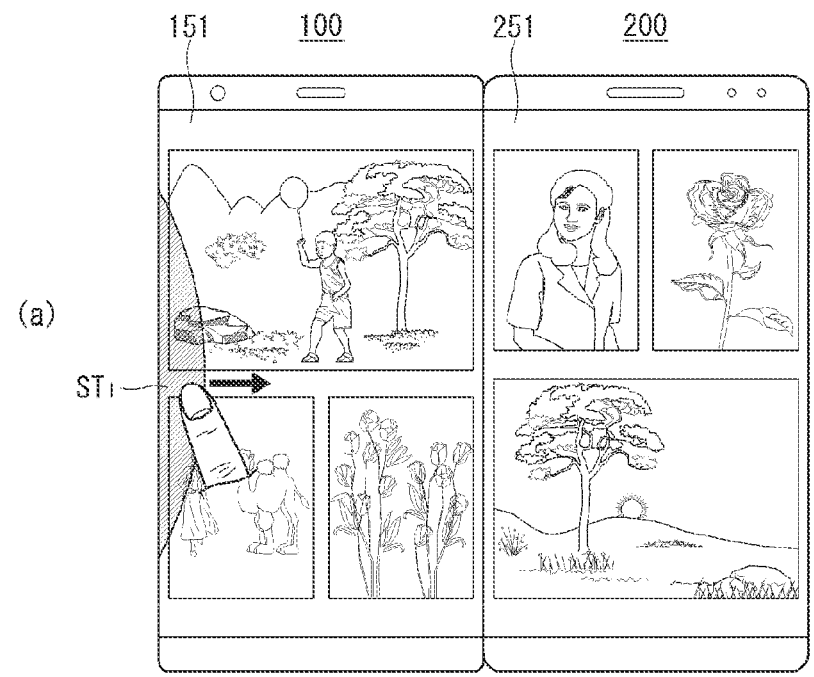
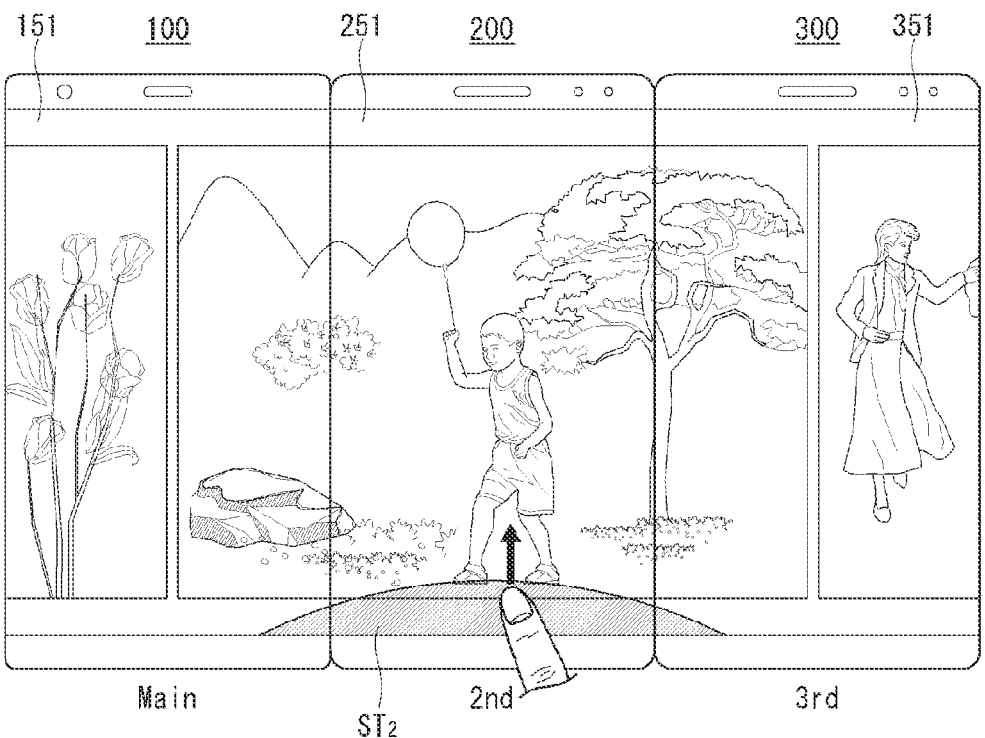

FIG. 35
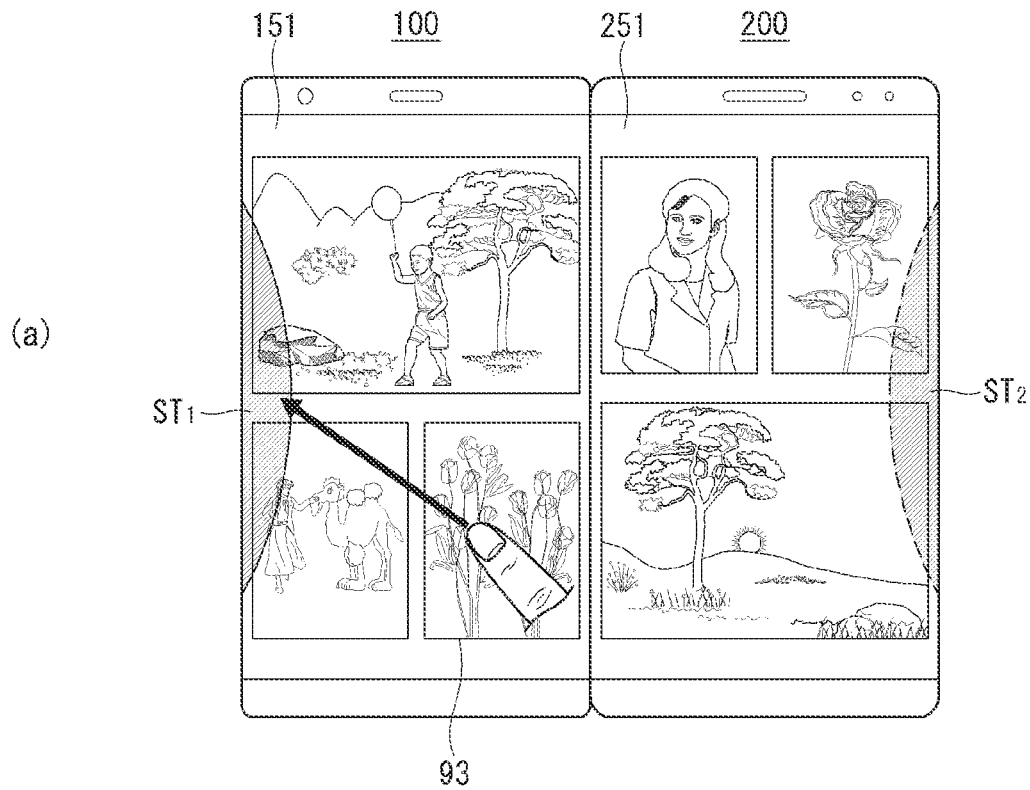
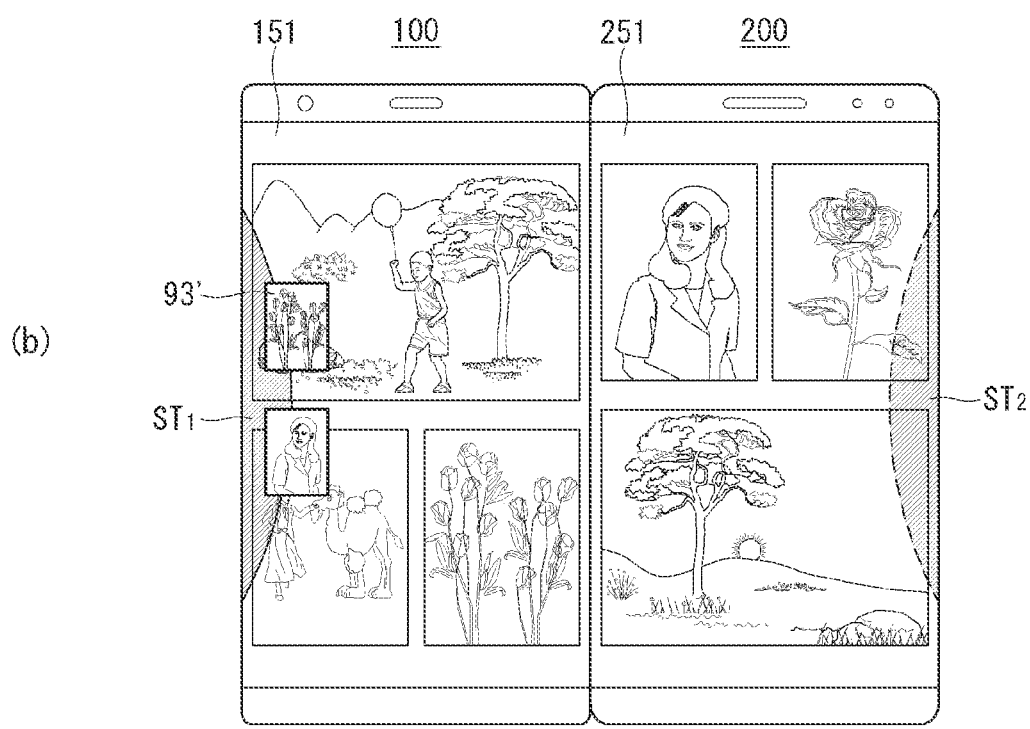

MOBILE TERMINAL AND METHOD FOR CONTROLLING THE SAME

CROSS-REFERENCE TO RELATED APPLICATIONS

Pursuant to 35 U.S.C. §119(a), this application claims the benefit of earlier filing date and right of priority to Korean Patent Application No. 10-2014-0078466, filed on Jun. 25, 2014, the contents of which are incorporated by reference herein in their entirety.

BACKGROUND OF THE INVENTION

1. Field of the Invention

The present invention relates to a mobile terminal and corresponding method for sharing a display with an external terminal.

2. Discussion of the Related

Terminals may be generally classified as mobile/portable terminals or stationary terminals. Mobile terminals may also be classified as handheld terminals or vehicle mounted terminals.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

However, because the mobile terminal is generally small in size, the display is also limited in size making it sometimes difficult for the user to operate the mobile terminal.

SUMMARY OF THE INVENTION

Accordingly, one object of the present invention is to address the above-noted and other problems.

Another object of the present invention is to provide a mobile terminal for sharing content stored in a terminal with another terminal through a shared area according to an embodiment of the present invention.

Yet another object of the present invention is to provide a mobile terminal for displaying predetermined content on a large screen through the overall shared area.

To achieve these and other advantages and in accordance with the purpose of the present invention, as embodied and broadly described herein, the present invention provides in one aspect a mobile terminal including a body; a touchscreen provided to a front and extending to side of the body and configured to display content; and a controller configured to detect one side of the body comes into contact with one side of an external terminal, display a first area on the touchscreen corresponding to a contact area of the body and the external terminal and a second area including the content, receive an input of moving the content displayed in the second area to the first area, display the content in the first area, and share the content in the first area with the external terminal. The present invention also provides a corresponding method of controlling a mobile terminal.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will be more fully understood from the detailed description given herein below and the accompanying drawings, which are given by illustration only, and thus are not limitative of the present invention, wherein:

FIG. 2D is a front perspective view and partial cross-sectional views illustrating another example of the mobile terminal according to an embodiment of the present invention;

FIGS. 23A to 23C are views illustrating an operation of the mobile terminal when the second embodiment of the present invention is applied to an example of sharing a contact list;

FIGS. 34 and 35 are views illustrating an example of sharing content through sharing trays when the content is displayed through the entire shared area according to the third embodiment of the present invention;

DETAILED DESCRIPTION OF THE EMBODIMENTS

Description will now be given in detail according to embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function.

The accompanying drawings are used to help easily understand various technical features and it should be understood that the embodiments presented herein are not limited by the accompanying drawings. As such, the present invention should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
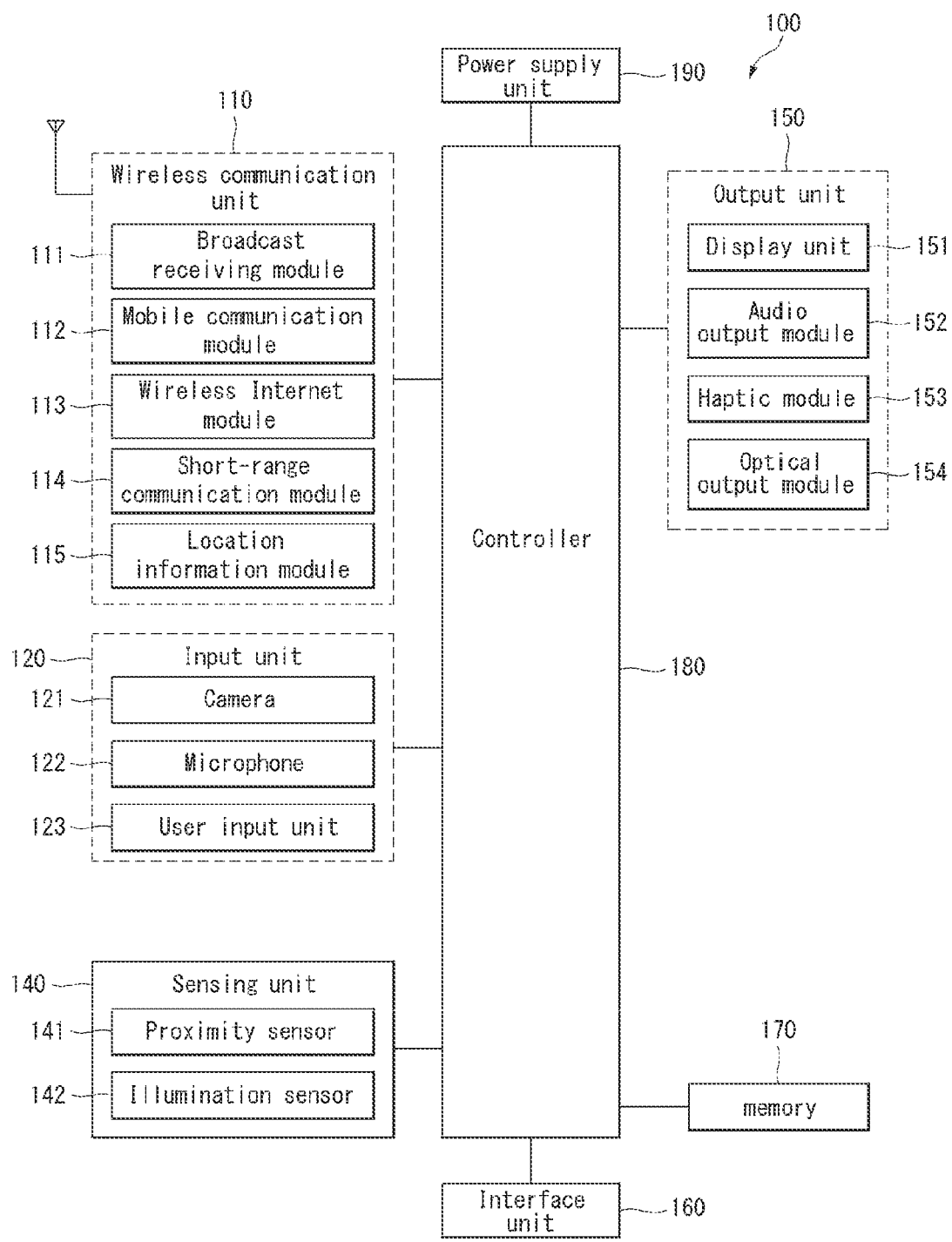
FIG. 1A is a block diagram of a mobile terminal according to an embodiment of the present invention.
Figure 1B:
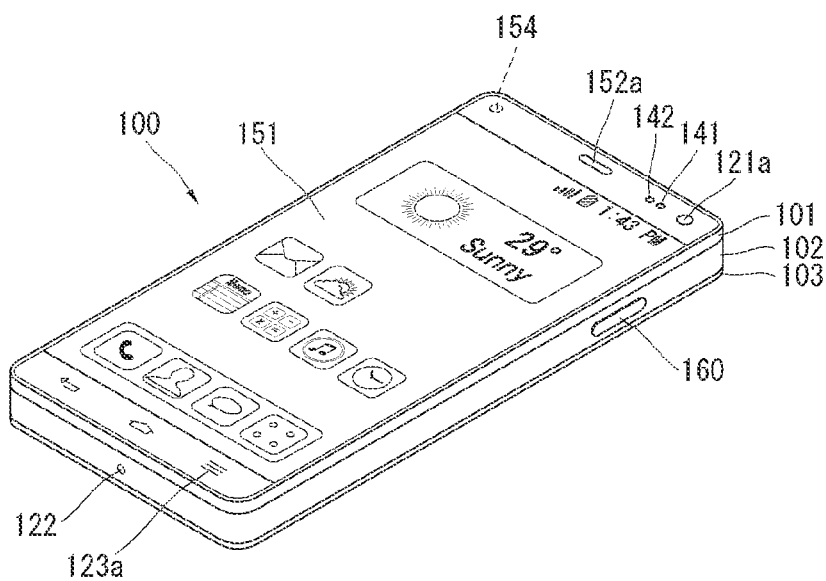
FIGS. 1B and 1C are conceptual views of one example of the mobile terminal, viewed from different directions.
Figure 1C:
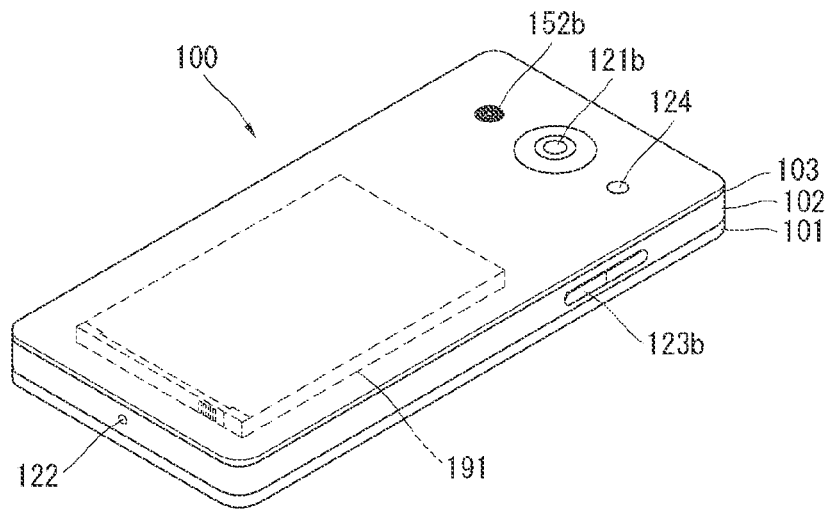

Reference is now made to FIGS. 1A-1C, where FIG. 1A is a block diagram of a mobile terminal 100 in accordance with the present invention, and FIGS. 1B and 1C are conceptual views of one example of the mobile terminal 100, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various embodiments disclosed herein.

The power supply unit 190 receives external power or provides internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151*a* of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121*b* or an audio output module 152*b*.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151*a* and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant invention. Some components may be omitted or rearranged. For example, the first manipulation unit 123*a* may be located on another surface of the terminal body, and the second audio output module 152*b* may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151*a* and a display on a rear surface of the window 151*a*, or a metal wire which is patterned directly on the rear surface of the window 151*a*. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123*a*.

The first audio output module 152*a* may be implemented in the form of a speaker to output voice audio, alarm sounds, multimedia audio reproduction, and the like.

The window 151*a* of the display unit 151 will typically include an aperture to permit audio generated by the first audio output module 152*a* to pass. One alternative is to allow audio to be released along an assembly gap between the structural bodies (for example, a gap between the window 151*a* and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input of power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be movable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2A:
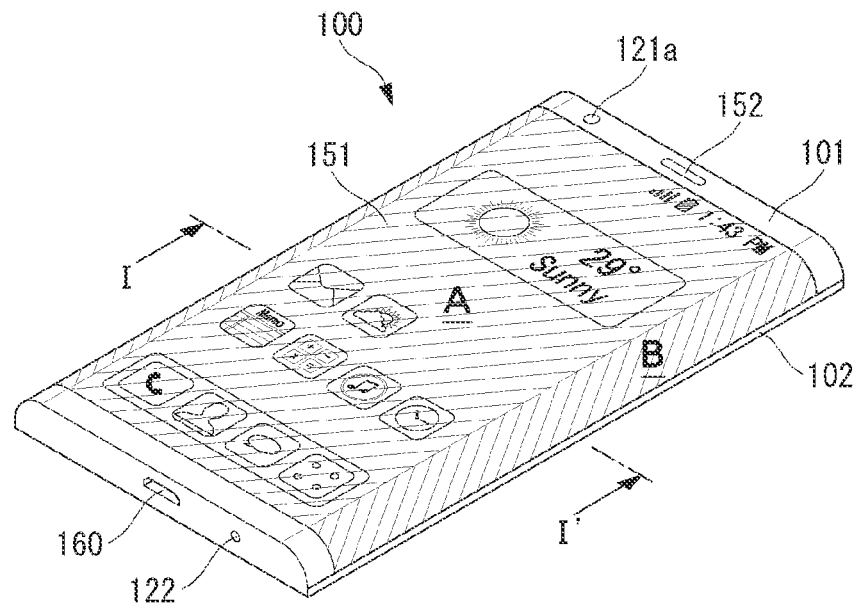
FIGS. 2A and 2B are conceptual views of another example of the mobile terminal according to an embodiment of the present invention, viewed from different directions.
Figure 2B:
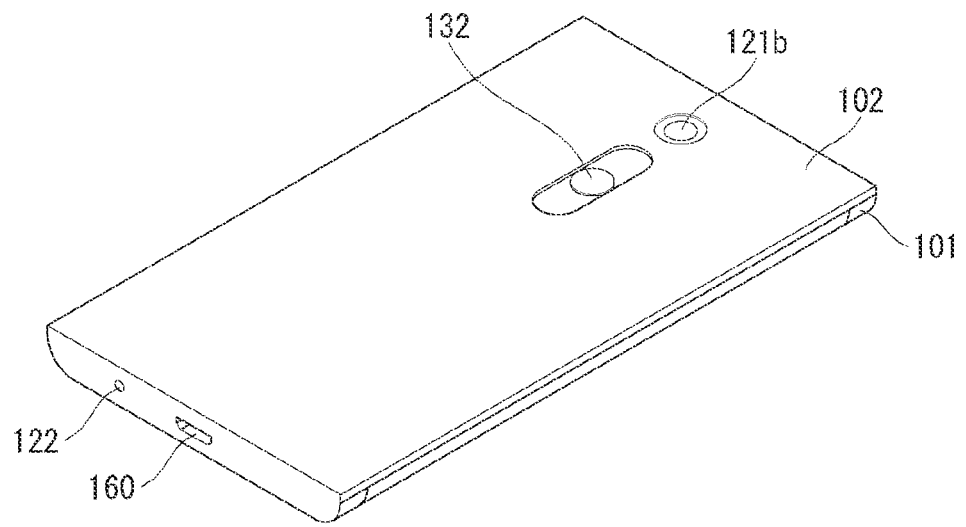
Figure 2C:
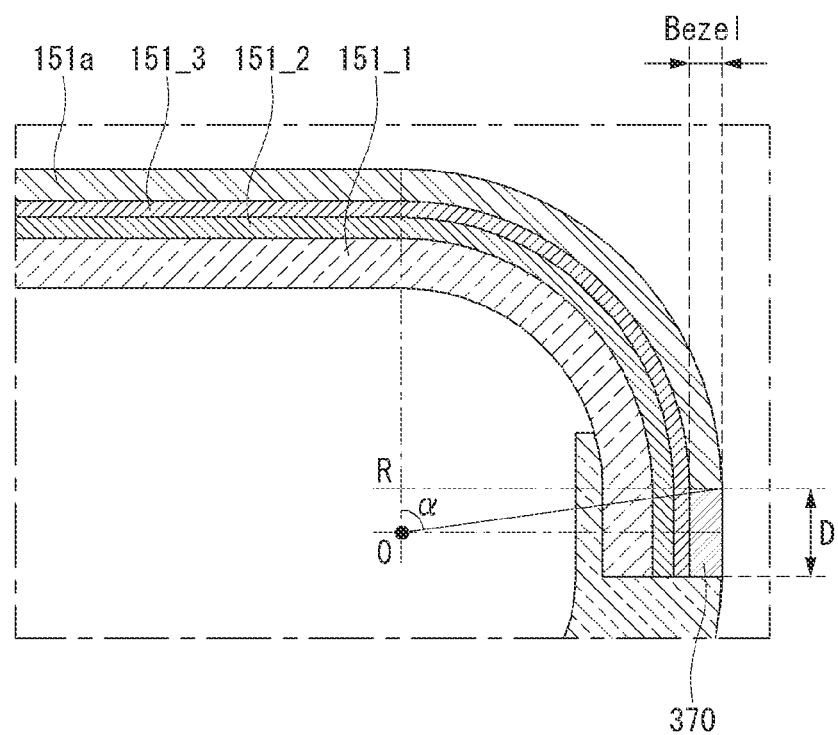
FIG. 2C is a partial cross-sectional view of a display unit of the mobile terminal shown in FIG. 2A.

Next, FIGS. 2A and 2B are conceptual views of another example of the mobile terminal according to an embodiment of the present invention, viewed from different directions and FIG. 2C is a partial cross-sectional view of a display unit of the mobile terminal shown in FIG. 2A.

Referring to FIGS. 2A and 2B, the mobile terminal 100 has a bar-shaped terminal body. However, the present invention is not limited thereto and the mobile terminal 100 may alternatively be implemented in any of a variety of different configurations. Examples of such configurations include a slide-type, folder-type, swing-type, and swivel-type in which two and more bodies are combined with each other in a relatively movable manner.

The body of the mobile terminal 100 includes a case (casing, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151, the audio output unit 152 and the camera module 121a may be disposed in the terminal body, mostly in the front case. An interface 160 may be disposed on the sides of the front case 101 and the rear case 102.

The display unit 151 occupies the surface of the front case 101. That is, the display unit 151 is shown located on the front side of the terminal body to output visual information. The display unit 151 according to an embodiment of the present invention is formed on the front side of the terminal and extends to other sides of the terminal. More specifically, the display unit 151 includes a first area A corresponding to the front side of the terminal body and a second area B (refer to FIG. 3) corresponding to the sides of the terminal body and extended from the first area A.

For example, the window provided to the surface of the display unit 151 is formed such that both sides thereof are bent, and thus the front and sides of the terminal body are formed by the window. Accordingly, the first area A and the second area B can be connected without a physical interface. In this instance, the display unit 151 may include a display device formed in a bent shape and incorporated therein corresponding to the window.

Alternatively, the display unit 151 may be a flexible display unit. The flexible display unit includes flexible, bendable, twistable, foldable and rollable displays. The flexible display unit may include a normal flexible display and e-paper.

The normal flexible display refers to a display which is flexible, bendable, foldable or rollable while having display characteristics of a conventional flat panel display, and which is formed on a thin flexible substrate and thus is light and is not easily broken.

E-paper is a display technology employing characteristics of ink and differs from the conventional flat panel display in that the e-paper uses reflected light. The e-paper can change pictures or characters using twist balls or electrophoresis using capsules.

As described above, the terminal body having the display unit with both sides thereof bent according to flexible material characteristics can be implemented.

The audio output unit 152 and the camera module 121 may be disposed close to one of the display unit 151 and a front input unit and the microphone 122 may be disposed close to the other end thereof.

The front input unit is an example of the user input unit 123a (refer to FIG. 1B) and may include a plurality of manipulating units. The manipulating units may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation.

The display unit 151 may form a touchscreen with a touch sensor. In this instance, the touchscreen may be a user input unit. Accordingly, a configuration in which the front input unit is not provided to the front side of the mobile terminal may be implemented. That is the first area A may be a unique input unit positioned on the front side of the terminal.

Referring to FIG. 2B, the camera module 121b may be additionally provided to the rear side of the terminal body, that is, the rear case 102. The camera module 121b may be a camera having a photographing direction substantially opposite to that of the camera module 121a (refer to FIG. 1B) and including pixels different from those of the camera module 121a.

For example, the camera module 121a has low resolution since it can capture an image of a user's face in low resolution and transmit the image during video telephony, whereas the camera module 121b preferably has high resolution since it captures an image of an object and does not immediately transmit the image in many cases. The camera modules 121a and 121b may be incorporated into the terminal body in a rotatable or pop-up manner.

A flash lamp and a mirror may be additionally provided in proximity to the camera module 121b. The flash lamp flashes a light upon an object when the camera module 121b captures an image of the object. The mirror is used for the user to look at their face reflected therein when the user wants to photograph (self-photograph) them using the camera module 121b.

An audio output unit may be additionally provided to the backside of the terminal body. The audio output unit of the backside can provide a stereo function with the front audio output unit 152 and may be used to provide a speaker phone mode.

That is, the second audio output unit may be formed using the backside of the terminal body or a speaker along with the front audio output unit 152 (first audio output unit) formed using a receiver. However, the present invention is not limited thereto and the second audio output unit may be provided to the side of the mobile terminal.

A power supply unit for supplying power to the mobile terminal 100 may be provided to the terminal body. The power supply unit may be incorporated into the terminal body or configured so it can directly attached/detached to/from the terminal body.

As illustrated, a rear input unit 132 may be provided to the backside of the terminal body. The rear input unit 132 may be disposed below the camera module 121b, for example.

The rear input unit 132 is manipulated to receive commands for controlling operations of the mobile terminal 100. Various commands may be input through the rear input unit 132. For example, commands such as power on/off, start, end, scroll, and the like and commands such as adjustment of the volume of sound output from the audio output unit 152, switching to a touch recognition mode of the display module 151 and the like can be input through the rear input unit 132. However, the present invention is not limited thereto and the mobile terminal may include only one of the front input unit and the rear input unit 132.

Next, FIG. 2C is a partial cross-sectional view of the mobile terminal according to an embodiment of the present invention. Referring to FIG. 2C, a display 151_2, a touch sensor 151_3 and a window 151_a are mounted on a frame 151_1. The frame 151_1, display 151_2, touch sensor 151_3 and window 151_a are all bent toward the sides of the terminal body. A bezel according to the display 151_2 of the mobile terminal is very thin since it merely corresponds to the thickness of the window 151_a.

The bezel can have a minimum size when the window 151_a is bent at 90° with the radius of R having a point O positioned inside the terminal as a center. However, the window 151_a may not be bent at 90° due to problems in a manufacturing process. That is, α shown in FIG. 2C is narrower than 90°.

FIG. 2D is a front perspective view and partial cross-sectional views illustrating another example of the mobile terminal according to an embodiment of the present invention. As illustrated in FIG. 2D (a), a case 104 of the mobile terminal 100 may have a hexahedral shape. For example, the area of the front side and the rear side on the X-Y plane is wider and the areas of sides that connect the front side and the rear side are narrower.

The display unit 151 may be provided over a plurality of sides of the case 104. For example, the display unit 151 may include a first display unit 151a provided to the front side of the mobile terminal 100 and a second display unit 151b provided to both sides of the first display unit 151a.

The display unit 151 may be seamlessly formed over a plurality of sides of the case 104. That is, while first, second and third display units 151a, 151b and 151c are described for convenience of understanding, the first, second and third display units 151a, 151b and 151c may be one display. Here, the first display unit 151a may correspond to the first area A illustrated in FIG. 2A and the second and third display units 151b and 151c may correspond to the second area B illustrated in FIG. 2A.

FIG. 2D (b) is a cross-section view of the mobile terminal, taken along line I-I. This embodiment assumes that the window 151a, 151b and 151c is formed using a material which can be bent at 90°, as described above. As illustrated, the mobile terminal 100 may have the display unit 151 provided to at least three faces thereof. That is, the mobile terminal 100 may include the first display unit 151a provided to the front side thereof and the second and third display units 151b and 151c provided to the sides thereof.

FIG. 2D (c) illustrates a case in which the mobile terminal shown in FIGS. 2A, 2B and 2C does not include the bezel. The display unit 151 may be a flexible display. Accordingly, the boundary between the first display unit 151a and the second and/or third display units 151b and 151c may be bent with a predetermined radius according to flexible characteristics of the display.

The structure of the mobile terminal for implementing a method of controlling the mobile terminal according to an embodiment of the present invention has been briefly described.

In FIGS. 1B and 1C, the bezel is minimized (eliminated) in the front side of the body of the mobile terminal although a display unit is not provided to the sides of the body such that the display units of the mobile terminal 100 and an external terminal can be used as one display when the two terminals come into contact with each other through the sides thereof.

In addition, FIGS. 2A, 2B and 2C illustrate an example in which the display unit (touchscreen) provided to the front side of the body of the mobile terminal 100 is extended to the sides of the body and the end of the extended touchscreen includes the bezel. FIG. 2D illustrates a structure in which the touchscreen provided to the front side of the body of the mobile terminal 100 can be extended to the sides thereof using a material that can be bent at 90° without having a side bezel. Accordingly, when the mobile terminal 100 comes into contact with an external terminal through the sides thereof, the touchscreens of the two terminals can be used as one touchscreen more naturally and easily through the side display units of the two terminals.

The mobile terminal according to an embodiment of the present invention can display predetermined information on the side display unit and control operations by manipulating the side display unit using hardware characteristics thereof, as described in the following.

Figure 3:
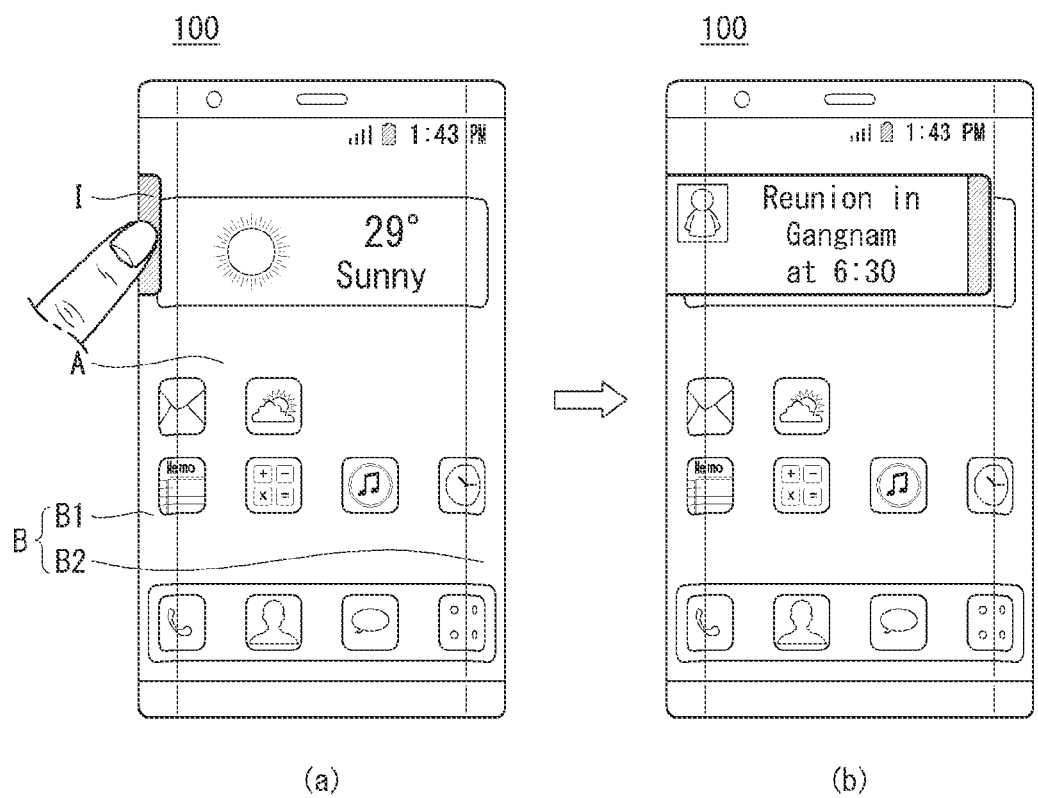
FIG. 3 is a conceptual view of an example of display operation implemented by the mobile terminal according to an embodiment of the present invention, shown in FIGS. 2A to 2D.

Next, FIG. 3 is a conceptual view of an example of display operation implemented by the mobile terminal according to an embodiment of the present invention, shown in FIGS. 2A to 2D.

Referring to FIGS. 2 and 3, the display unit 151 includes the first area A corresponding to the front side of the terminal body and the second area B extended from the first area A and corresponding to the sides of the terminal body. The first area A and the second area B display different types of information and have different types of user graphic interfaces (GUIs).

In addition, the second area B includes a left area B1 and a right area B2 respectively corresponding to the left and right sides of the mobile terminal. Accordingly, the second area B is provided in a laterally symmetrical structure on the basis of the first area A.

Referring to FIG. 3(a), a homescreen page may be displayed on the display unit 151 of the mobile terminal 100. The homescreen page may include at least one object which may be an icon or a widget of an application installed in the mobile terminal. In this instance, the homescreen page may be displayed over the first and second areas A and B. However, the present invention is not limited thereto and the homescreen page may be displayed on the first area only and the second area B may be a target area which does not display information and receives touch input applied thereto.

Referring to FIG. 3(b), the controller 180 senses touch input applied to the second area B and performs a control operation related to the touch input. In this example, when an icon I indicating generation of an event is touched, information about the event can be displayed in the first area A.

Further preferred embodiments will be described in more detail with reference to additional drawing figures. It is understood by those skilled in the art that the present features can be embodied in several forms without departing from the characteristics thereof.

The mobile terminal according to an embodiment of the present invention can include the touchscreen area corresponding to the front side of the display unit, as described above. That is, a bezel is present in only part of the upper and lower ends of the front body and the sides of the front body do not have a bezel. Accordingly, when the side of a first mobile terminal comes into contact with the side of a second mobile terminal, a first touchscreen of the first mobile terminal and a second touchscreen of the second mobile terminal can be used as one large touchscreen.

According to one embodiment of the present invention, when the sides of the first and second mobile terminals are brought into contact with each other, the first and second mobile terminals can perform data communication. Here, data communication may refer to data communication through which content of the first mobile terminal can be shared with the second mobile terminal. Otherwise, data communication may refer to data communication through which content of the second mobile terminal can be shared with the first mobile terminal. When the sides of the first and second mobile terminals come into contact with each other, the first mobile terminal can control the second touchscreen of the second mobile terminal.

According to an embodiment of the present invention, the first touchscreen and the second touchscreen that share the contact area can be used as one shared area and thus content of the first mobile terminal and content of the second mobile terminal can be shared through the shared area.

The aforementioned first and second mobile terminals are respectively referred to as "mobile terminal" and "external terminal" in embodiments of the present invention. It is assumed that the external terminal has a configuration identical or similar to that of the mobile terminal and executes the same or similar functions.

Figure 4:
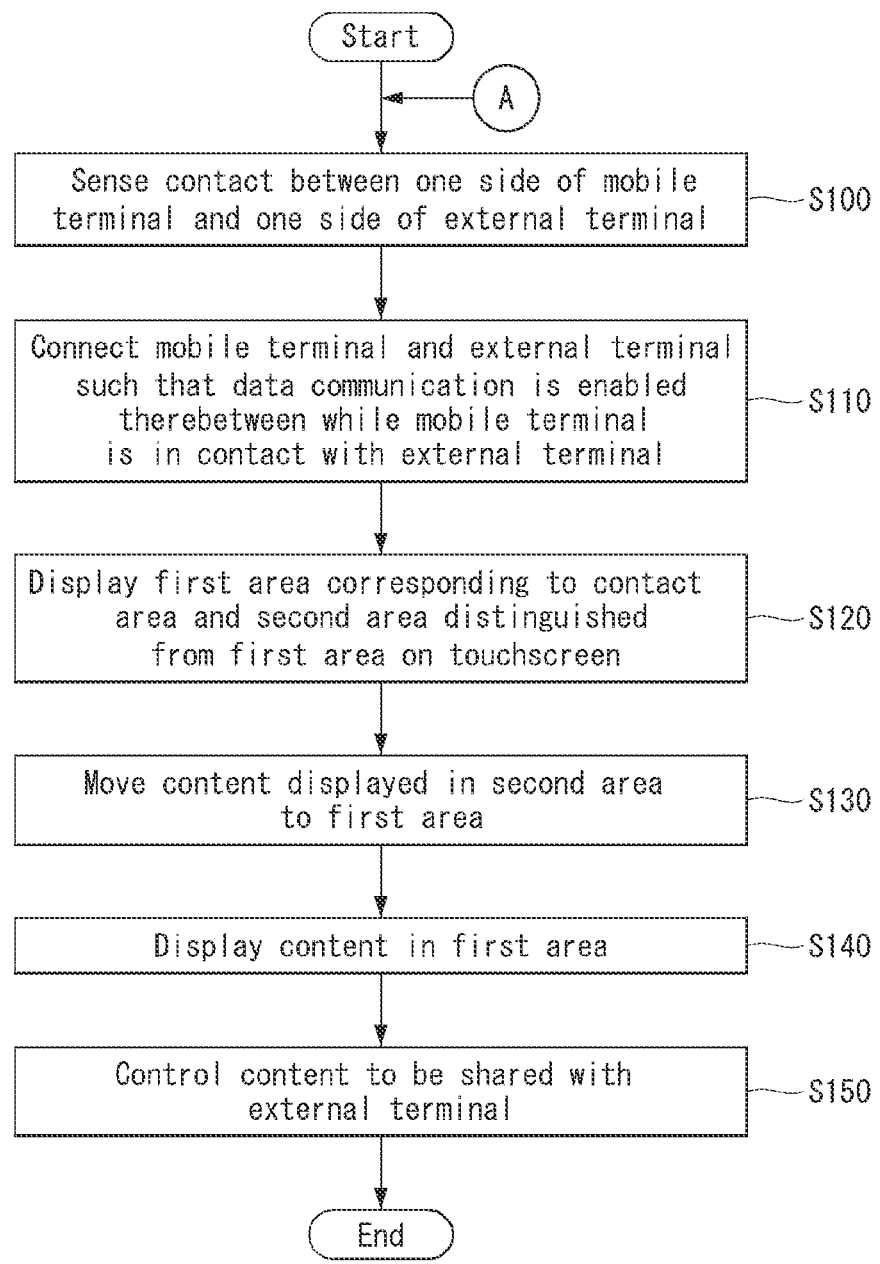
FIG. 4 is a flowchart illustrating a method for controlling the mobile terminal according to a first embodiment of the present invention.
Figure 5:
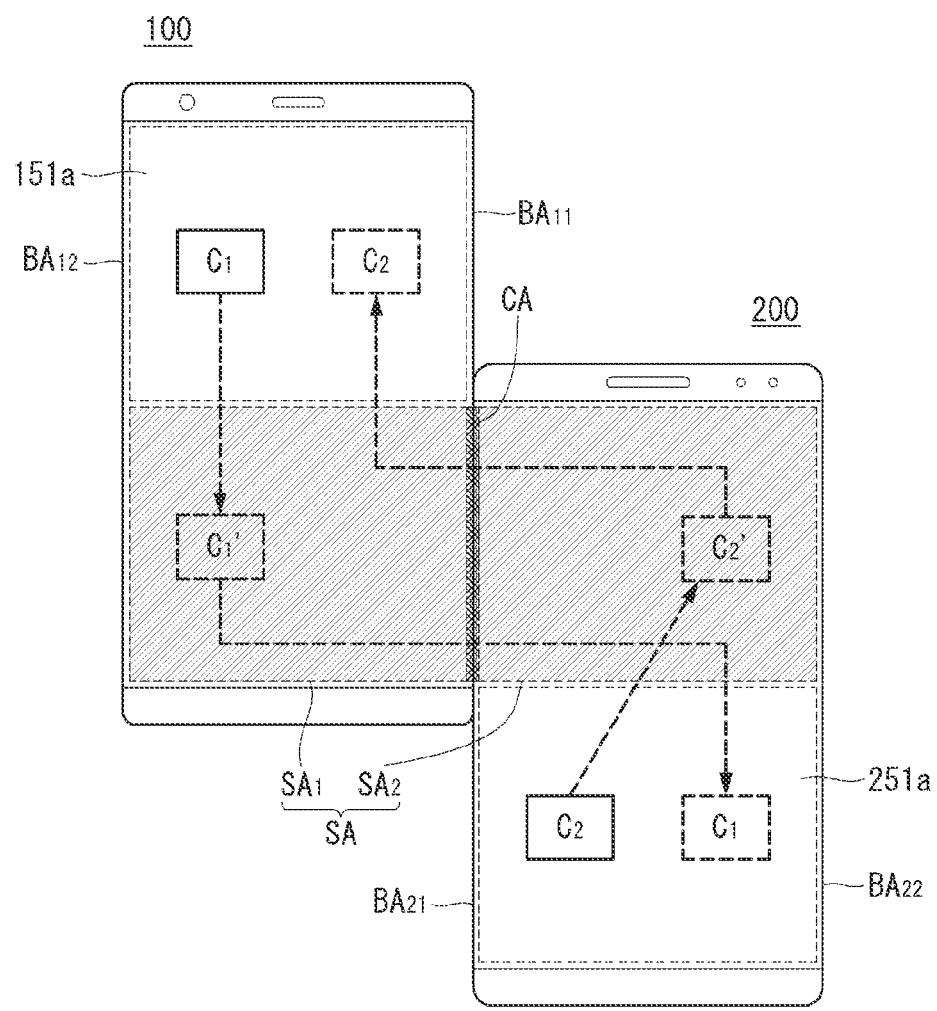
FIG. 5 is a conceptual view illustrating generation of a shared area through side contact between the mobile terminal and an external terminal according to an embodiment of the present invention.

Next, FIG. 4 is a flowchart illustrating a method for controlling the mobile terminal according to a first embodiment of the present invention, and FIG. 5 is a conceptual view illustrating the generation of a shared area through side contact between the mobile terminal and the external terminal according to an embodiment of the present invention.

The method for controlling the mobile terminal according to the first embodiment of the present invention may be implemented in the mobile terminal 100 described above with reference to FIGS. 1 to 3.

Referring to FIG. 4, the controller 180 can sense contact of one side of the body of the mobile terminal 100 with one side of the external terminal (S100). The touchscreen 151 of the mobile terminal 100 may be provided to the front of the body and extended to the side of the body. Here, the display provided to the front of the body may be referred to as a front display area and the display area extended to the side of the body may be referred to as a side display area.

That is, the controller 180 can sense contact between the side display area of the mobile terminal and the side display area of the external terminal. The controller 180 then connects the mobile terminal 100 and the external terminal such that data communication can be performed between the two terminals upon contact between the mobile terminal 100 and the external terminal through the side display area of the mobile terminal 100 (S110).

Connection of the mobile terminal 100 and the external terminal such that data communication can be performed between the two terminals may refer to establishment of a predetermined data communication link between the mobile terminal 100 and the external terminal. According to an embodiment of the present invention, the two terminals can share predetermined data through the data communication link in response to a predetermined manipulation applied to a predetermined shared area formed in the display units of the two terminals in contact with each other.

According to an embodiment of the present invention, the data communication link may be maintained only when the two terminals come into contact with each other and may be automatically disconnected when contact between the two terminals is cancelled. Here, a state that the two terminals come into contact with each other may include not only when sides of the mobile terminal and the external terminal physically come into contact with each other but also when the two terminals in physical contact with each other are separated from each other by a predetermined distance.

Accordingly, when the two terminals are brought into contact with each other, the controller 180 displays the first area corresponding to the contact area of the two terminals and the second area distinguished from the firs area, on the touchscreen 151 (S120).

A description will be given of steps S100 to S120 in more detail with reference to FIG. 5. Referring to FIG. 5, the body of the mobile terminal 100 has a first side BA11 and a second side BA12 and the body of an external terminal 200 also has a first side BA21 and a second side BA22. The sides BA11, BA12, BA21 and BA22 may include a touchscreen extended from the front of the bodies and the ends of the touchscreen extended to the sides may be connected to predetermined bezels as necessary.

When the first side BA11 of the mobile terminal 100 is brought into contact with the first side BA21 of the external terminal 200, the controller 180 can sense the contact. The contact may be slide contact and the mobile terminal 100 and the external terminal 200 may share a predetermined contact area CA according to the contact.

Upon contact between the two terminals, the controller 180 can display a first area SA1 corresponding to the contact area CA and a second area 151a distinguished from the first area SA1 on the touchscreen 151.

The first area SA1 and the second area 151a may be displayed in various manners. For example, when the mobile terminal 100 is brought into contact with the external terminal 200 while the second area 151a is displayed on the overall area of the touchscreen 151, the first area SA1 and the second area 151a may be displayed in an overlaid manner in a position corresponding to the contact area while the size of the second area 151a is not changed. In this instance, a layer corresponding to the second area 151a and a layer corresponding to the first area SA1 may be displayed in an overlaid manner.

In addition, when the mobile terminal 100 is brought into contact with the external terminal 200 while the second area 151a is displayed on the overall area of the touchscreen 151, part of the touchscreen 151, which corresponds to the contact area, may be displayed as the first area SA1 and the second area 151a may be displayed in the remaining area of the touchscreen 151 other than the first area SA1. In this instance, the size of the second area 151a displayed on the overall area of the touchscreen 15 may be reduced.

Upon sensing the contact between the mobile terminal 100 and the external terminal 200, the external terminal 200 may also display, on a touchscreen 251 thereof, a first area SA2 corresponding to the contact area CA and a second area 251a distinguished from the first area SA2. In this instance, the first area SA2 and the second area 251a may be displayed in the same manner as the aforementioned example in the external terminal 200.

The mobile terminal 100 can recognize the first area SA1 included in the touchscreen 151 as a first shared area SA1 and recognize the first area SA2 included in the touchscreen of the external terminal 200 as a second shared area SA2. Accordingly, the controller 180 can recognize the first shared area SA1 and the second shared area SA2 as one combined shared area SA. Here, while the first shared area SA1 and the second shared area SA2 are implemented through the touchscreens which are physically divided from each other based on the common contact area CA, the first shared area SA1 and the second shared area SA2 may be recognized as one seamless screen since the touchscreens do not have bezels.

Referring to FIGS. 4 and 5, the controller 180 can receive input of moving content C1 displayed in the second area 151a to the first area (first shared area) SA1 (S130). Upon reception of the input of moving the first content C1 to the first shared area SA1, the controller 180 can display the first content C1 in the first shared area SA1 (S140).

Then, the controller 180 can control the mobile terminal 100 to share the first content C1 with the external terminal 200 (S150). More specifically, the controller 180 can receive a drag input of moving the first content C1' displayed in the first shared area SA1 to the second area 251a of the touchscreen of the external terminal 200 via the second shared area SA2 of the external terminal 200. Accordingly, the mobile terminal 100 can share the first content C1 with the external terminal 200 through the first shared area SA1 and/or the second shared area SA2.

In addition, the controller 180 can control the first content C1' displayed in the first shared area SA1 to be shared by the external terminal 200 without passing through the second shared area SA2 through predetermined input.

Furthermore, content C2 of the external terminal 200 may also be shared with the mobile terminal 100 through the second shared area SA2 and/or the first shared area SA1. Various methods for sharing content displayed in the shared area SA with the external terminal will be described later.

According to an embodiment of the present invention, the controller 180 can recognize the shared area SA as one large screen and display predetermined content in the shared area CA. This will be described later with reference to related drawings.

The input of moving the content C1 to the first area SA1 may include at least one of input of dragging the content C1 to the first shared area SA1, input of dragging the content C1 to the second shared area SA2 and input of dragging content displayed in the first shared area SA1 to the second shared area SA2.

When the touchscreen 151 of the mobile terminal 100 extends to the side of the mobile terminal 100 and thus contact with the external terminal can be sensed through the side touchscreen has been described. However, the present invention is not limited thereto. For example, an embodiment of the present invention can be implemented in a terminal including a sensing means for sensing contact with an external terminal, which is provided to at least one area of the body of the terminal.

According to an embodiment of the present invention, contact between one side of the body of the mobile terminal 100 and one side of the external terminal 200 can be sensed by the sensing unit 140 provided to the side of the mobile terminal 100.

The sensing unit 140 may be included in the rear case 102 in FIGS. 1B and 1C. Since the rear case 102 forms at least one side of the body of the mobile terminal 100, contact between the mobile terminal 100 and the external terminal 200 can be sensed through the sensing unit 140 and a sensing signal can be transmitted to the controller 180 when one side of the body of the mobile terminal 100 comes into contact with one side of the external terminal.

The sensing unit 140 (shown in FIG. 1B) may be provided to the bezel 370 shown in FIG. 2C. According to an embodiment of the present invention, the touchscreen 151 of the mobile terminal 100 may be provided to the front of the body of the mobile terminal 100 and extended to the side of the body. The touchscreen 151 may be provided to the front of the body, bent and extended to the side of the body and the end of the extended touchscreen 151 may be fixed to the bezel 370.

Accordingly, when the side of the external terminal having the same structure as the mobile terminal 100 is brought into contact with the side of the mobile terminal 100, the bezels of the two terminals come into contact with each other and thus the sensing units included in the bezels can sense the contact between the two terminals and transmit sensing signals corresponding to the sensed results to the controllers 180 of the two terminals.

The sensing unit 140 (shown in FIG. 1B) may be provided to the sides 151b and 151c of the touchscreen 151 in a structure having no bezel, as shown in FIG. 2D. In this instance, when one side (151b or 151c) of the touchscreen of the mobile terminal 100 comes into contact with one side of the touchscreen of the external terminal, the sensing unit provided to the side 151b or 151c of the touchscreen of the mobile terminal 100 can generate a sensing signal representing the contact between the two terminals and transmit the sensing signal to the controller 180.

According to an embodiment of the present invention, the sensing unit 140 (shown in FIG. 1B) can sense contact with one side of the external terminal irrespective of the position of the sensing unit, for example, the rear case 102 (shown in FIG. 1B) of the body of the mobile terminal, bezel 370 (shown in FIG. 2C) or the inside (151b and 151c in FIG. 2D) of the touchscreen. Furthermore, it is possible to recognize whether contact between the two terminals is contact between the entire sides of the two terminals or contact between specific regions (e.g. parts corresponding to 50%) of the sides of the two terminals. Accordingly, the size of the shared area according to an embodiment of the present invention can be determined by a sensing signal generated by the sensing unit.

The position of the sensing unit according to an embodiment of the present invention is not limited to the aforementioned example. The sensing unit can be disposed in any position in which the sensing unit can sense contact between the two terminals as the structure and appearance of the display unit are changed.

In addition, the sensing unit included in the mobile terminal 100 according to an embodiment of the present invention may sense a change in the contact area according to sliding contact at the side of the terminal body. Furthermore, the sensing unit may sense the start point and end point of the sliding contact to recognize the length of the sliding contact.

A description will now be given of application of the first embodiment of the present invention to an application (e.g. a gallery application) for displaying a predetermined image. In particular, FIG. 6 illustrates a state before the mobile terminal and the external terminal are brought into contact with each other while predetermined content is displayed on the two terminals according to the first embodiment of the present invention.

Figure 6:
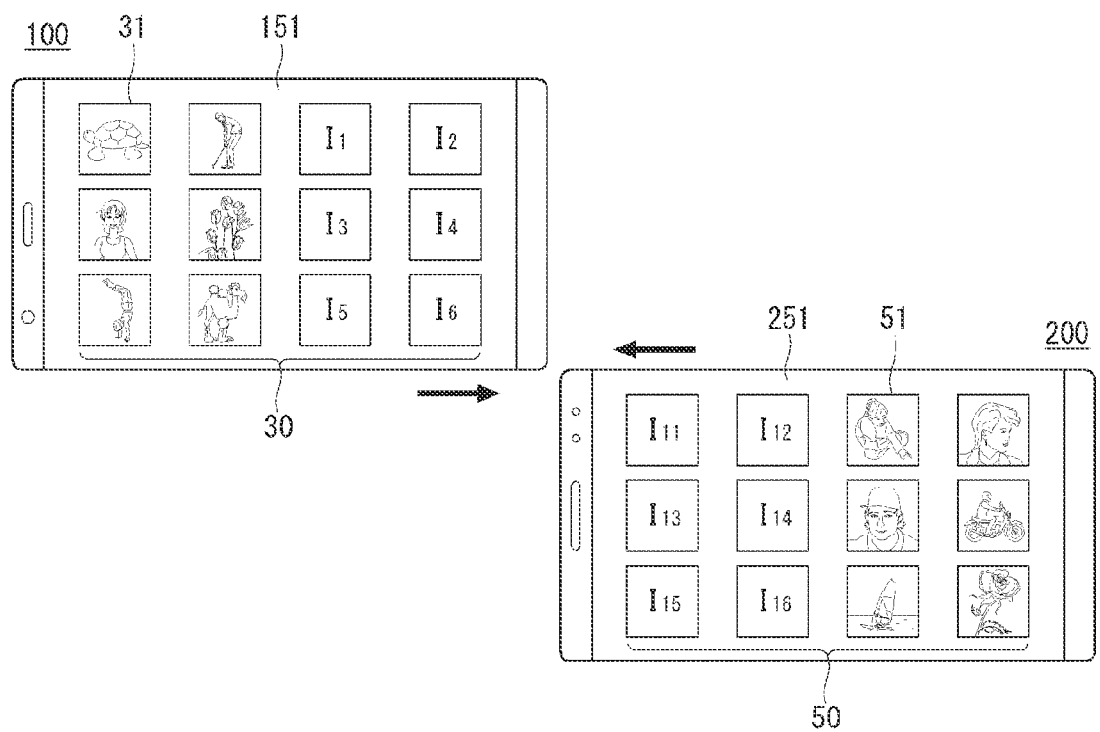
FIG. 6 illustrates a state before the mobile terminal and the external terminal come into contact with each other while predetermined content is displayed on the two terminals according to the first embodiment of the present invention.

Referring to FIG. 6, the controller 180 can display a predetermined image on the touchscreen 151. The external terminal 200 may also display a predetermined image on the touchscreen 251. When the mobile terminal 100 senses the aforementioned lateral contact with the external terminal 200, the shared area SA having the predetermined contact area CA may be displayed, as shown in FIGS. 7A and 7B.

Figure 7A:
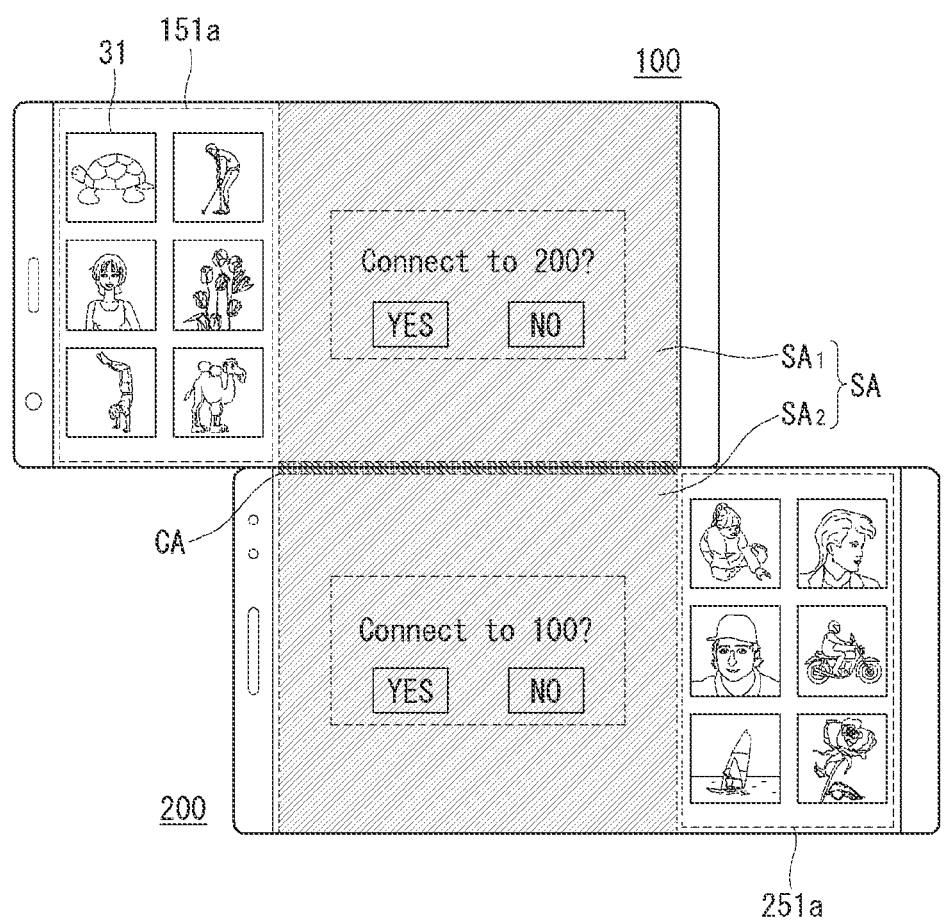
FIGS. 7A and 7B illustrate an example of displaying a shared area according to contact between the mobile terminal and the external terminal according to the first embodiment of the present invention.
Figure 7B:
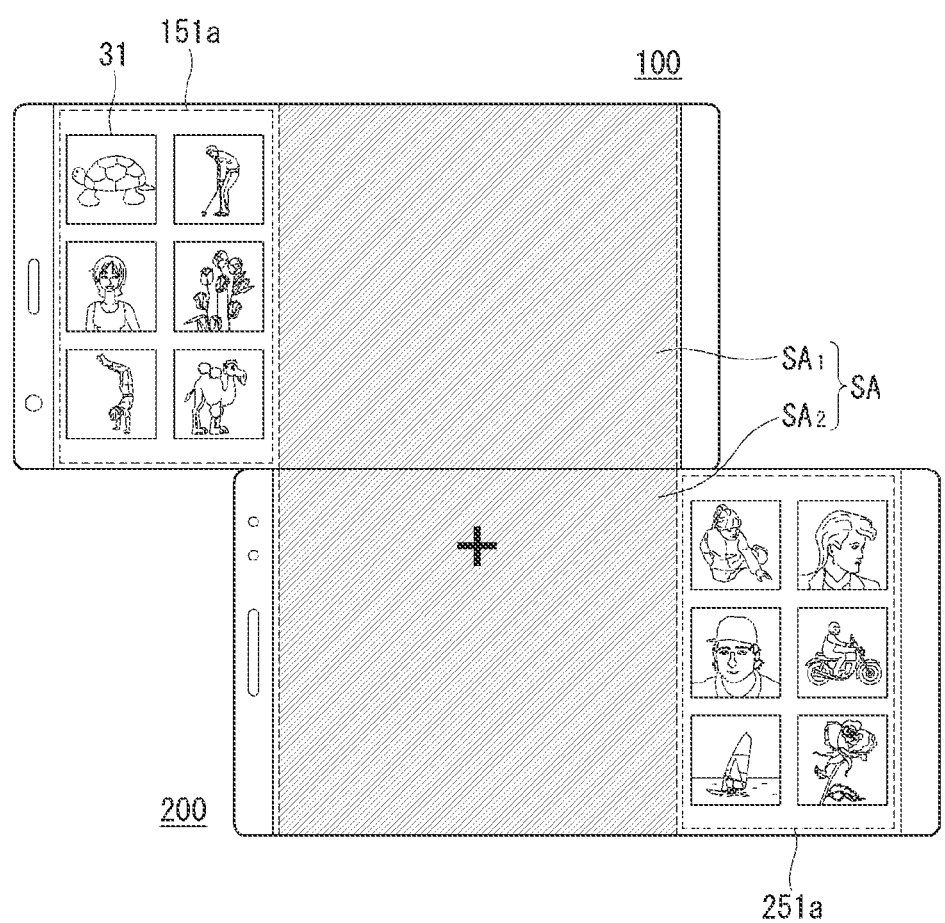

FIGS. 7A and 7B illustrate an example of displaying the shared area according to contact between the mobile terminal and the external terminal according to the first embodiment of the present invention.

Referring to FIG. 7A, the controller 180 can display the first shared area SA1 (first area) and the second area 151a distinguished from the first shared area SA1 on the touchscreen irrespective of display of a predetermined image displayed before the two terminals are brought into contact with each other. The predetermined image may be continuously displayed in the second area 151a.

The controller 180 can display the first shared area SA1 on the touchscreen 151 in an overlaid manner. In this instance, arrangement of a plurality of images displayed on the touchscreen 151 before the mobile terminal 100 comes into contact with the external terminal 200 is not changed and a new layer corresponding to the first shared area SA1 may be overlaid on the images.

In addition, the controller 180 can control the first shared area SA1 to occupy a predetermined area of the touchscreen 151 and control the images displayed on the touchscreen 151 before the mobile terminal 100 comes into contact with the external terminal 200 to be scrolled in a predetermined direction and automatically arranged in the second area 151a distinguished from the first shared area SA1. The external terminal 200 operates in the same manner.

While the touchscreens of the two terminals may display the first area and the second area, as described above, as the two terminals are brought into contact with each other, the first area and the second area may not be activated. That is, approval of the user may be needed in order to use at least part of the display areas of the two terminals as a shared area when the two terminals come into contact with each other.

Referring to FIG. 7A, upon lateral contact between the mobile terminal 100 and the external terminal 200, a pop-up window for inquiring whether to connect the two terminals in order to share content through the shared area may be displayed on the touchscreen 151. For example, when the external terminal 200 does not want to be connected to the mobile terminal 100, the mobile terminal 100 and the external terminal 200 may not activate the shared area.

Referring to FIG. 7B, upon lateral contact between the mobile terminal 100 and the external terminal 200, a soft key (e.g. "+" shown in FIG. 7B) for activating the shared area may be displayed in the shared area SA including the contact area. The controller 180 can activate the shared area SA through the pop-up window shown in FIG. 7A or the indicator, that is, soft key shown in FIG. 7B.

Figure 8:
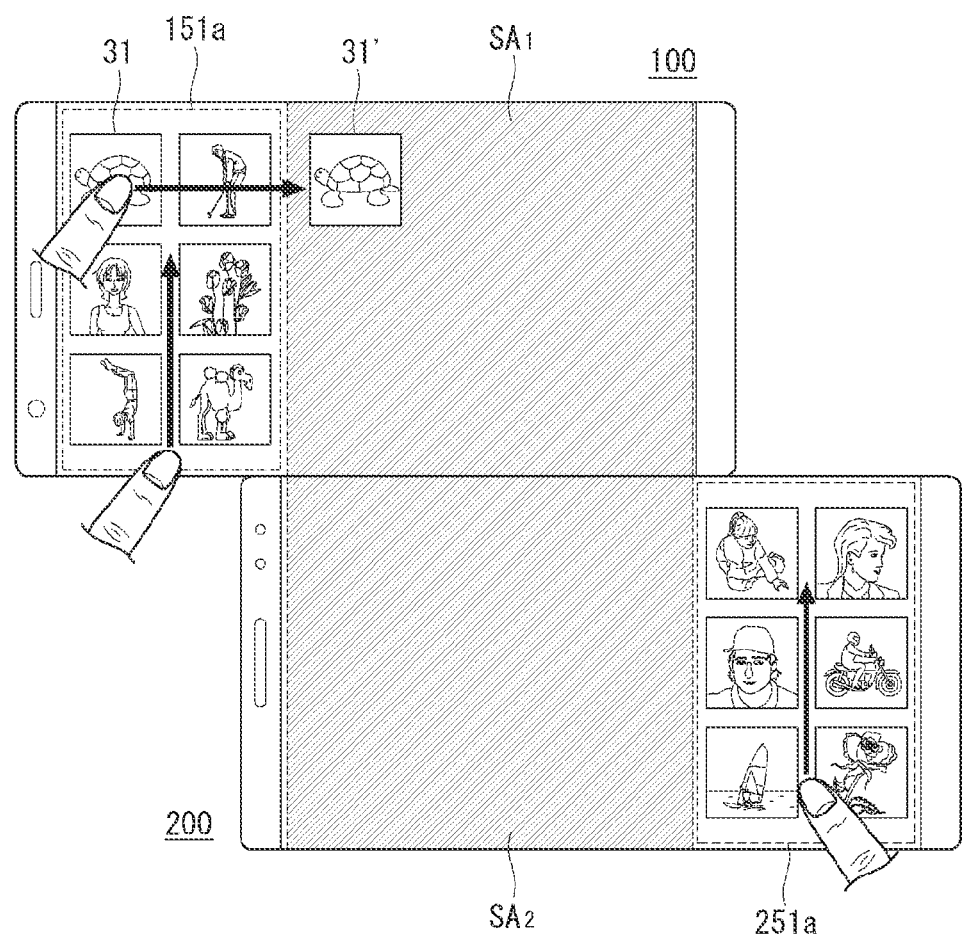
FIG. 8 is a view illustrating an example of sharing content through the shared area shown in FIGS. 7A and 7B.

Next, FIG. 8 is a view illustrating an example of sharing content through the shared area shown in FIGS. 7A and 7B. Referring to FIG. 8, the mobile terminal 100 can separately process inputs applied to the first shared area SA1 and the second area 151a.

For example, the controller 180 can prevent predetermined scroll input applied to the second area 151a from affecting the first shared area SA1 or the second shared area SA2. Accordingly, when multiple pieces of content are displayed in the second area 151a, movement of the content displayed in the second area 151a can be easily controlled through the scroll input applied to the second area 151a.

Upon reception of input of dragging first content 31 displayed in the second area 151a to the first shared area SA1, the controller 180 can display the first content 31 in the first shared area SA1. Here, the first content 31 displayed in the second area 151a is not actually moved to the first shared area SA1 and virtual first content 31' corresponding to the first content 31 may be displayed in the first shared area SA1 in response to the drag input while the first content 31 is still displayed in the second area 151a.

The virtual first content 31' may be a state displayed in the shared area before the first content 31 is downloaded to the external terminal 200.

Figure 9:
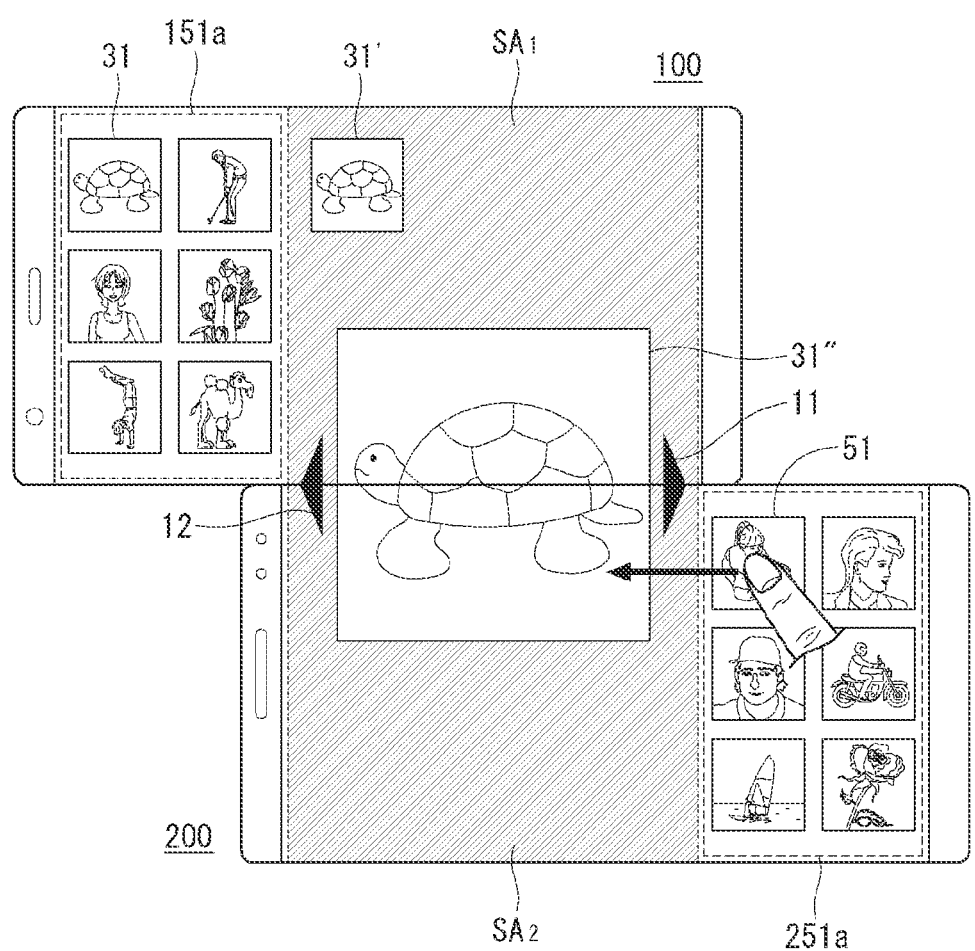
FIG. 9 is a view illustrating an example of displaying content through the entire shared area shown in FIGS. 7A and 7B.

FIG. 9 is a view illustrating an example of displaying content through the entire shared area shown in FIGS. 7A and 7B. Referring to FIG. 9, upon reception of a predetermined input applied to the first content 31' displayed in the first shared area SA1, the controller 180 can control the first content 31' to be magnified and displayed throughout the shared area SA including the first shared area SA1 and the second shared area SA2.

Here, the predetermined input may include touch input of selecting the first content 31', double touch input applied to the first content 31', zoom-in operation for the first content 31' and the like. The controller 180 can display magnified first content 31" throughout the shared area SA in response to the predetermined input.

The shared area SA may display icons 11 and 12 by which the next image or previous image of the displayed image can be selected. Second content 51 of the external terminal 200 can also be moved to the second shared area SA2 while the magnified first content 31" is displayed in the shared area SA.

Figure 10A:
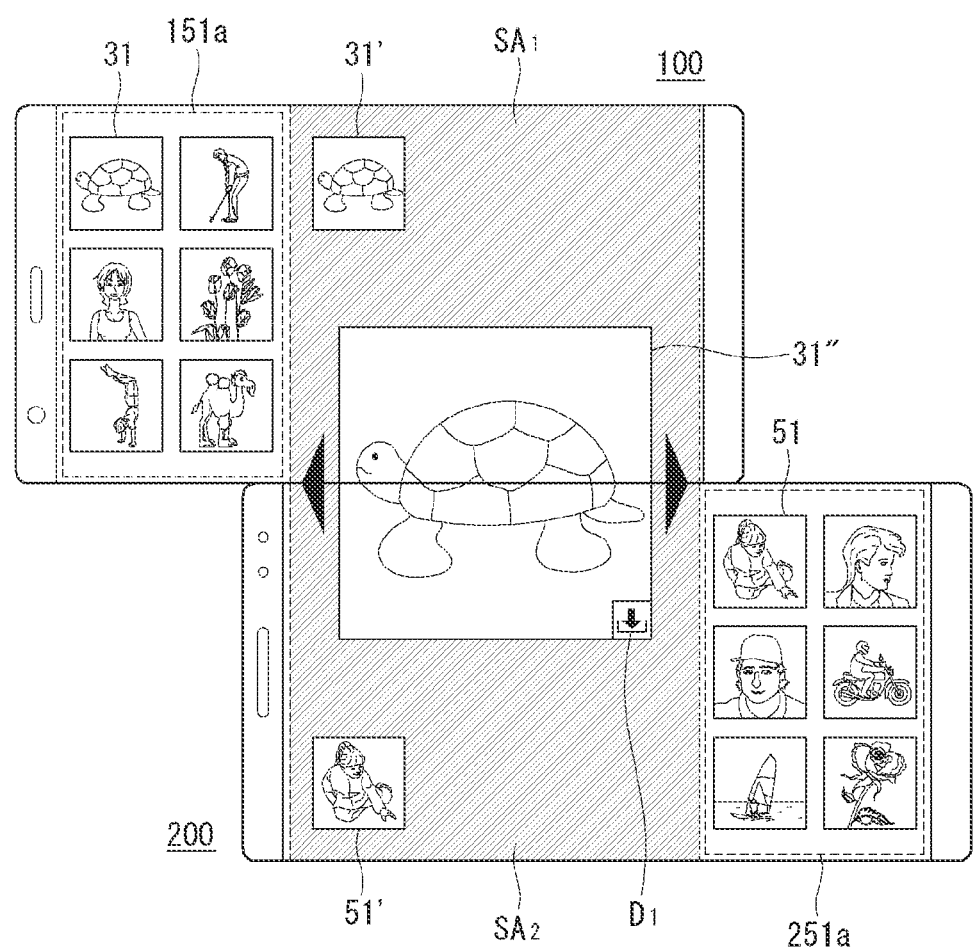
FIGS. 10A and 10B illustrate an example of displaying sources of the content, shared through the shared area shown in FIGS. 7A and 7B, on the content.

Accordingly, the first content 31' can be displayed in the first shared area SA1, the second content 51' can be displayed in the second shared area SA2 and the magnified first content 31" can be displayed over the first and second shared areas SA1 and SA2, as shown in FIG. 10A.

Figure 10B:
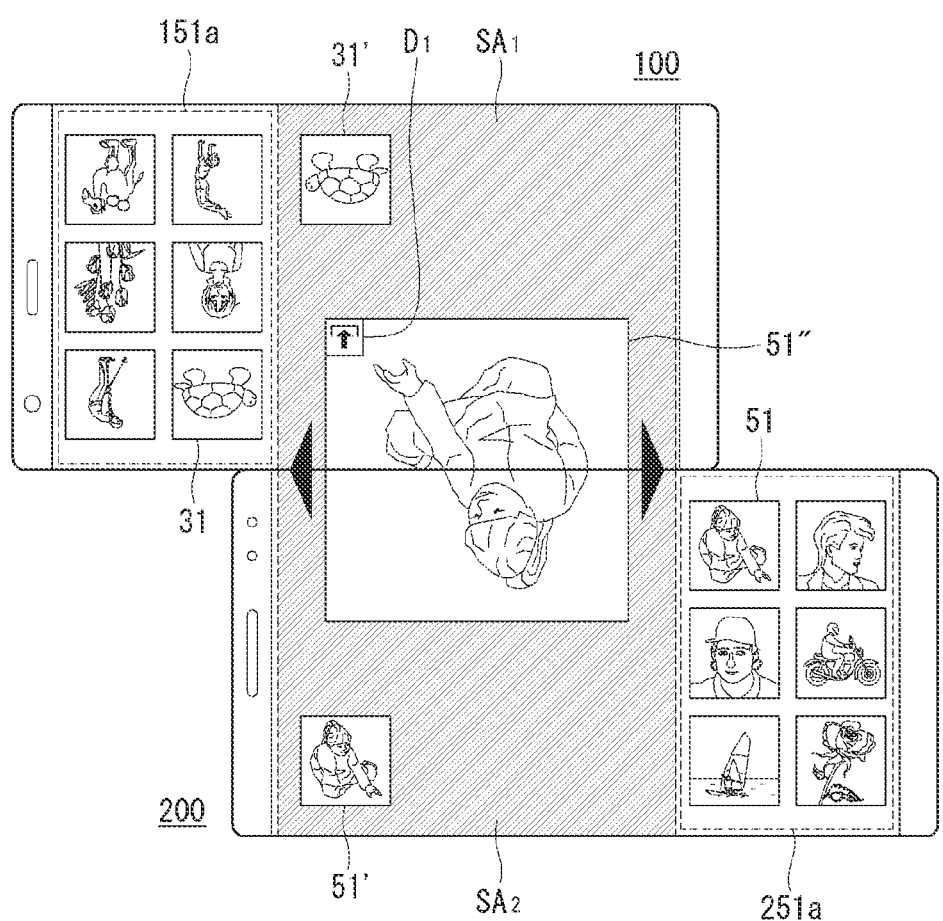
Figure 11:
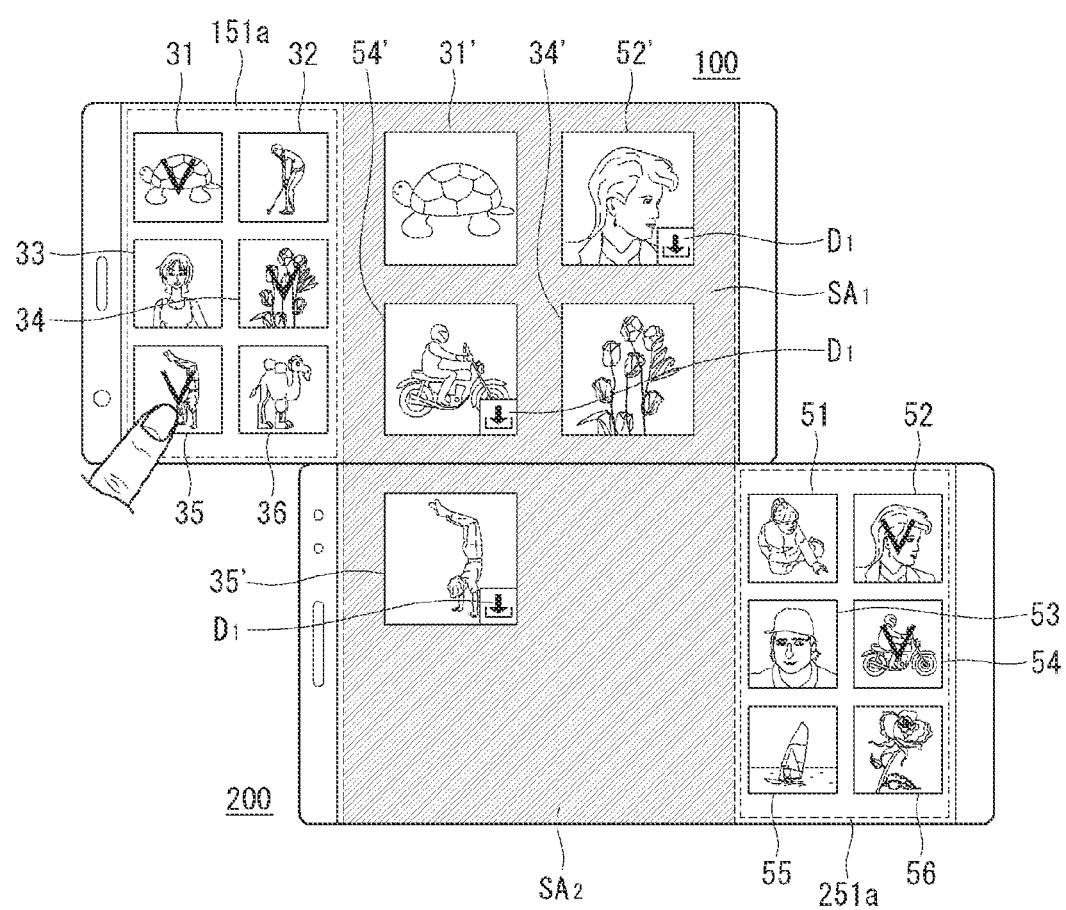
FIG. 11 is an overview illustrating an example of displaying indicators for indicating the sources of the content, shown in FIGS. 10A and 10B, on the content.

FIGS. 10A and 10B illustrate an example of displaying sources of the content, shared through the shared area shown in FIGS. 7A and 7B, on the content, and FIG. 11 illustrates an example of displaying indicators for indicating the sources of the content, shown in FIGS. 10A and 10B, on the content.

Referring to FIG. 10A, both the content 31' of the mobile terminal 100 and the content 51' of the external terminal 200 can be displayed in the shared area SA. When multiple pieces of content are displayed together in the shared area SA, content of one terminal needs to be distinguished from content of the other terminal such that the user of the mobile terminal 100 can easily recognize content, which is not stored in the mobile terminal 100 and thus needs to be downloaded.

For example, the source of the first content 31" magnified and displayed in the shared area SA, shown in FIG. 10A, is the mobile terminal 100. Accordingly, the controller 180 can display a download indicator D1 on a portion of the first content 31", which is displayed in the second shared area SA2, such that the user can intuitively recognize that the first content 31" does not belong to the external terminal 200.

When the content displayed in the first shared area SA1 is not content stored in the mobile terminal 100, the controller 180 can add the download indicator to the content. That is, the controller 180 can selectively display the download indicator according to whether content to be shared is displayed in the first shared area SA1 or second shared area SA2.

Upon reception of input of selecting the download indicator D1 in the state shown in FIG. 10A, the controller 180 can transmit the first content 31" to the external terminal 200. The orientation of content displayed in the shared area SA may also be changed in various manners. That is, the orientation of the content displayed in the shared area SA can depend on the source of the content, the orientation of the terminal sharing the content, etc.

Referring to FIG. 10B, when the content 51" is displayed in the shared area SA and the source of the displayed content 51" is the external terminal 200, the orientation of the content 51" may be determined according to the orientation of the mobile terminal 100. When the user of the mobile terminal 100 is located opposite to the user of the external terminal 200, the orientation of the content 51" can be controlled such that the content 51" is not seen upside down by the user of the mobile terminal 100.

Referring to FIG. 11, the controller 180 can receive input of associating one or more pieces of content 31, 34 and 35 from among a plurality of pieces of content 31, 32, 33, 34, 35 and 36, displayed in the second area 151a of the touchscreen 151, with the first shared area SA1 or the second shared area SA2.

For example, the content 31 and content 34 are associated with the first shared area SA1 and thus content 31' and content 34' can be displayed in the first shared area SA1. In addition, the content 35 is associated with the second shared area SA2 and thus content 35' can be displayed in the second shared area SA2. Furthermore, content 52 and content 54 of the external terminal 200 are associated with the first shared area SA and thus content 52' and content 54' can be displayed in the first shared area SA1.

In this instance, the controller 180 can add the download indicator D1 to each piece of content in order to indicate the source of each piece of content associated with the shared area SA. For example, the download indicator D1 may be added to the content 52' and content 54' displayed in the first shared area SA1 since the content 52' and content 54' are content stored in the external terminal 200. In addition, the download indicator D1 may be added to the content 35' displayed in the second shared area SA2 since the content 35' is content stored in the mobile terminal 100.

Figure 12:
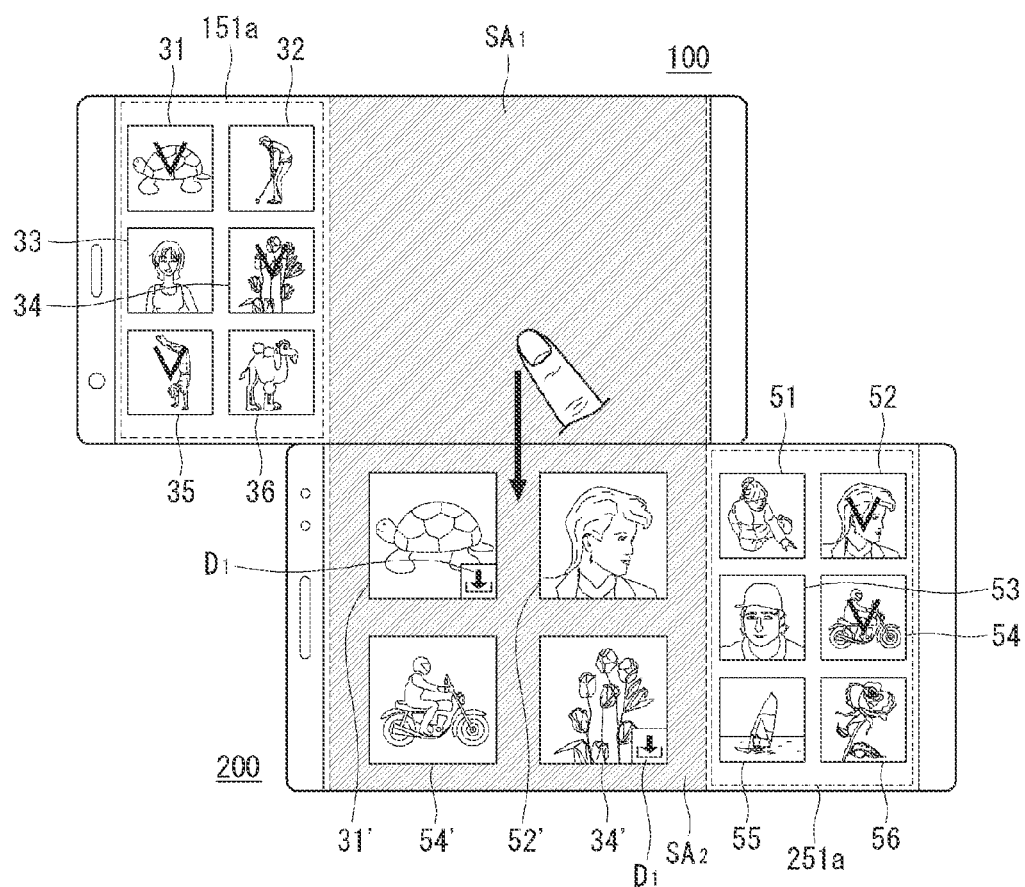
FIG. 12 is an overview illustrating an example of controlling display of content in the shared area shown in FIGS. 7A and 7B by controlling the shared area when multiple pieces of content are displayed in the shared area.

FIG. 12 illustrates an example of controlling display of content in the shared area shown in FIGS. 7A and 7B by controlling the shared area when multiple pieces of content are displayed in the shared area.

Referring to FIG. 12, when scroll input for the shared area SA is received while the content 31', 52', 54', 34' and 35' is displayed in the shared area SA as shown in FIG. 11, the content 31', 52', 54', 34' and 35' may be scrolled through the shared area SA.

In this instance, the second area 151a of the touchscreen 151 and the second area 251a of the touchscreen of the external terminal 200 may be irrelevant to the scroll input. The controller 180 can control the content 31', 52', 54', 34' and 35' to be moved downward in response to the scroll input such that the content 31', 52', 54' and 34' displayed in the first shared area SA1 can be moved to the second shared area SA2.

As the content is moved to the second shared area SA2 corresponding to the external terminal 200, the controller 180 can add the download indicator D1 to the content 31' and 34' having the mobile terminal 100 as the source thereof. In addition, the controller 180 can delete the download indicator D1 previously added to the content 52' and 54'.

That is, the controller 180 can selectively add or delete the download indicator according to whether content is displayed in the first shared area SA1 or the second shared area SA2.

Figure 13:
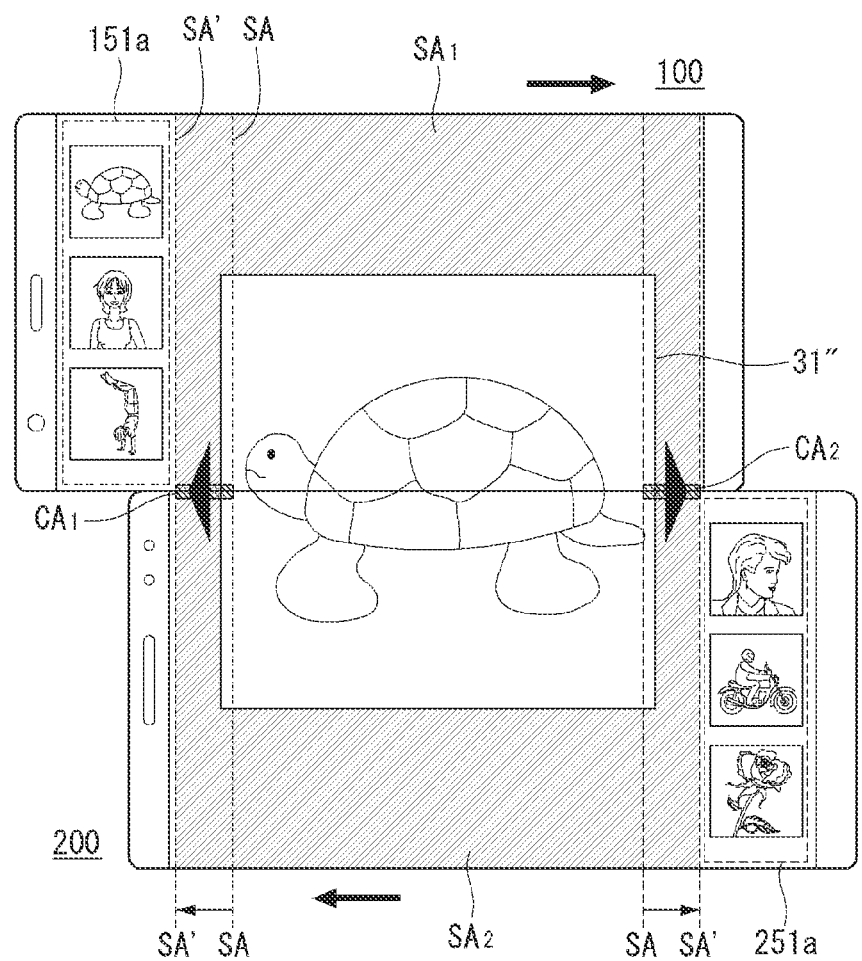
FIG. 13 is an overview illustrating an example of changing the area of the shared area shown in FIGS. 7A and 7B according to the contact area of the mobile terminal and the external terminal in accordance with the first embodiment of the present invention.

Next, FIG. 13 illustrates an example of changing the area of the shared area shown in FIGS. 7A and 7B according to the contact area of the mobile terminal and the external terminal in accordance with the first embodiment of the present invention. Referring to FIG. 13, the lateral contact area of the mobile terminal 100 and the external terminal 200 may increase. That is, when the contact side of the external terminal 200 additionally slides to the left, the lateral contact area of the mobile terminal 100 and the external terminal 200 can increase.

Accordingly, the controller 180 can use shared areas extending from the shared area SA to the left and right to share content. The controller 180 can increase the size of the content 31" displayed in the shared area and display the content 31" when the shared area increases. In addition, the controller 180 can increase the size of the shared area only and maintain the size of the content 31" displayed in the shared area.

Figure 14:
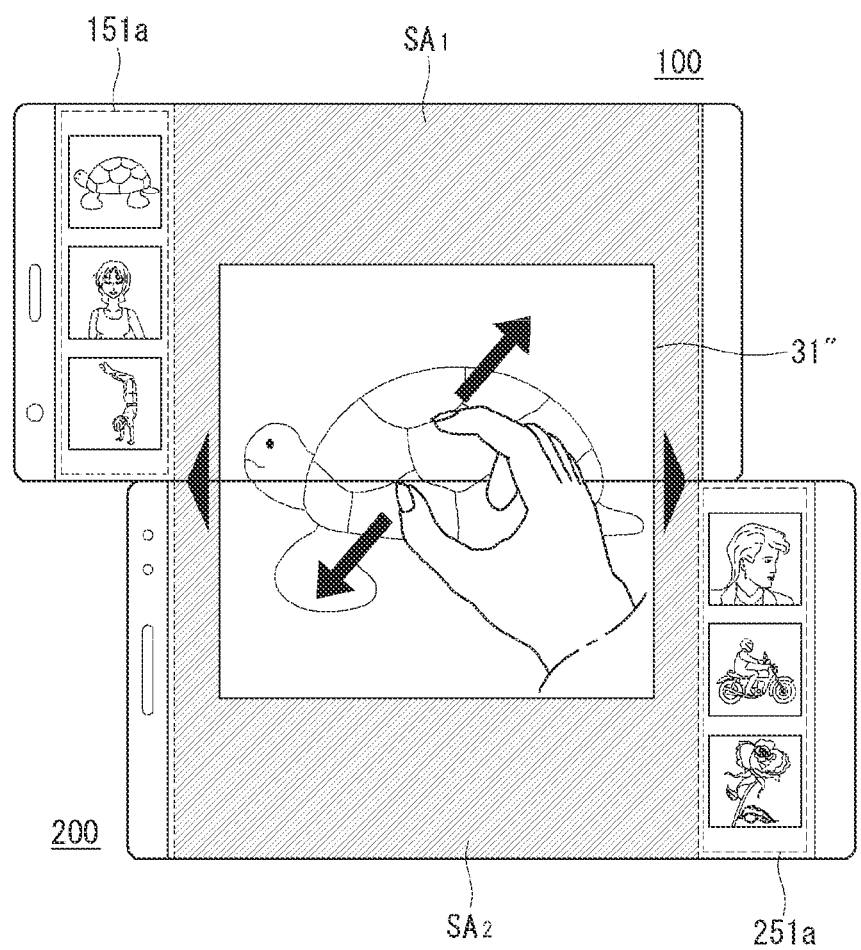
FIG. 14 is an overview illustrating an example of controlling display of content displayed through the entire shared area shown in FIGS. 7A and 7B.

Next, FIG. 14 illustrates an example of controlling display of content displayed in the shared area shown in FIGS. 7A and 7B. Referring to FIG. 14, the controller 180 can receive a zoom-in command with respect to the content 31" displayed in the shared area SA. In this instance, the controller 180 can perform the zoom-in command for the first shared area SA1 and the second shared area SA2. For example, even when zoom-in operation of the user is performed on one of the first shared area SA1 and the second shared area SA2, the content 31" can be magnified and displayed over the first shared area SA1 and the second shared area SA2.

According to an embodiment of the present invention, a zoom-out command in addition to the zoom-in command may be received. While the size of content displayed in the shared area may be reduced according to the zoom-out command, the size of the shared area SA can be reduced according to continuously input zoom-out commands.

Figure 15A:
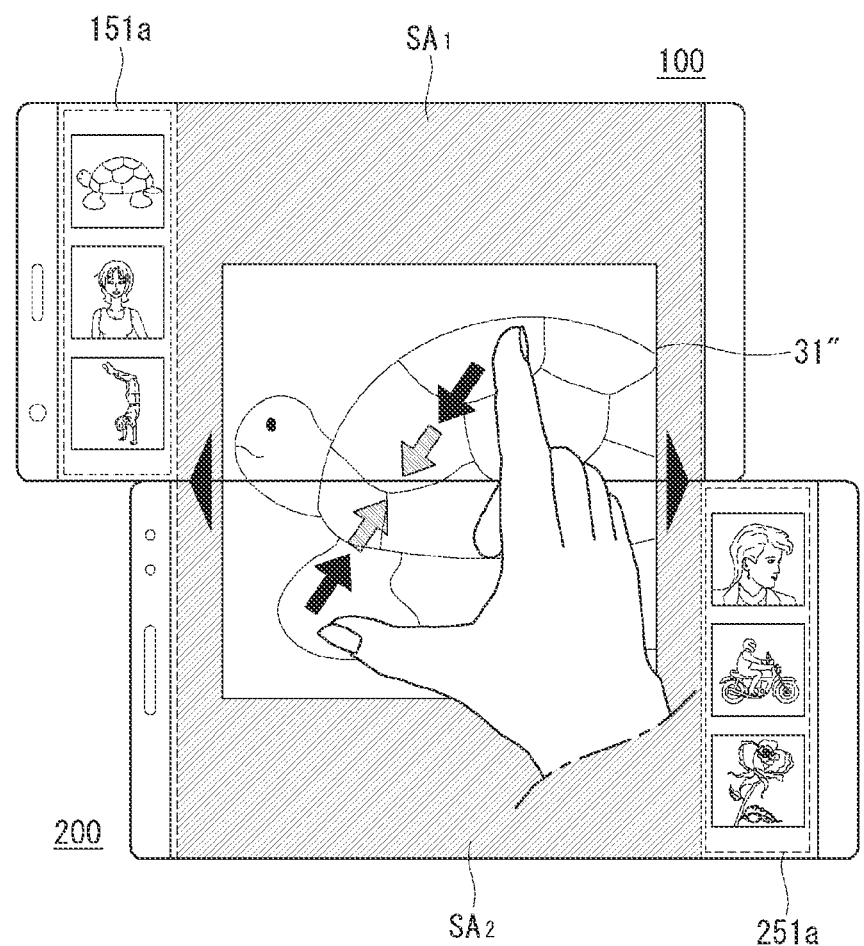
FIGS. 15A and 15B are overviews illustrating an example of changing the area of the shared area without changing the contact area of the two terminals by controlling display of content displayed through the entire shared area shown in FIG. 7.
Figure 15B:
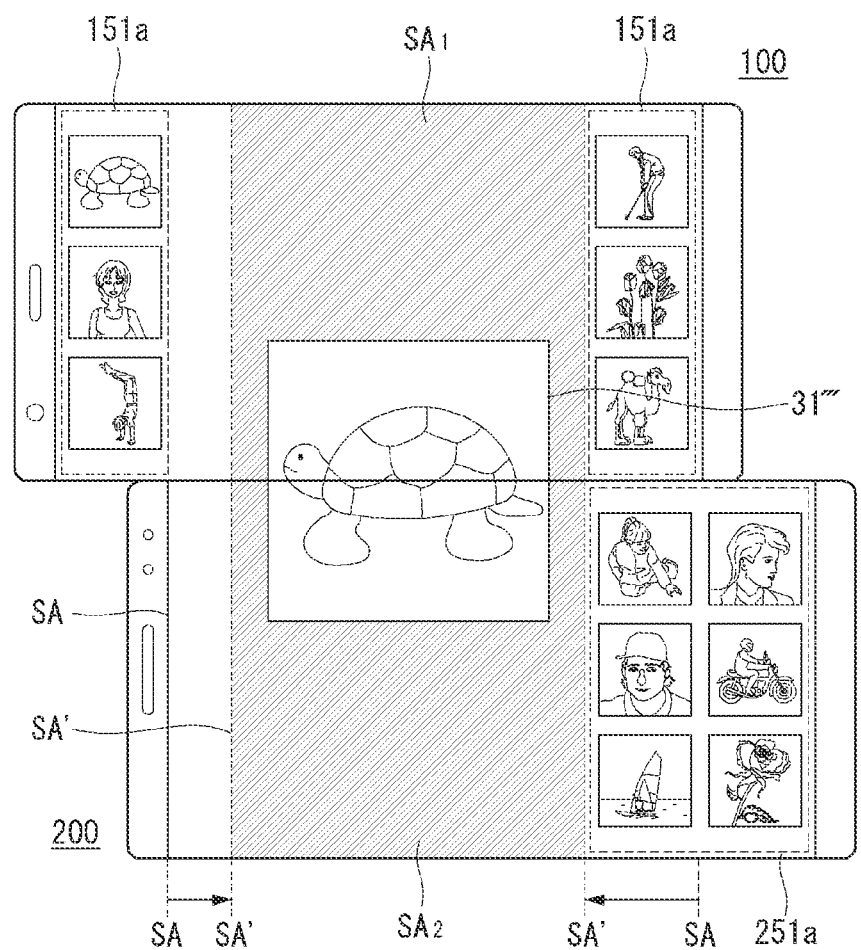

FIGS. 15A and 15B illustrate an example of changing the area of the shared area without changing the contact area of the two terminals by controlling display of content displayed in the shared area shown in FIGS. 7A and 7B.

Referring to FIGS. 15A and 15B, upon reception of two or more zoom-out commands with respect to the content 31" displayed in the shared area SA (FIG. 15A), the controller 180 can reduce the size of the content (31''') and, simultaneously, decrease the size of the shared area SA (SA→SA'), as shown in FIG. 15B.

In addition, the controller 180 can increase the sizes of the second areas 151a and 251a as the sizes of the first shared area SA1 and the second shared area SA2 decrease. Furthermore, predetermined content that can be shared may be displayed in the increased second areas 151a and 251a.

Figure 16:
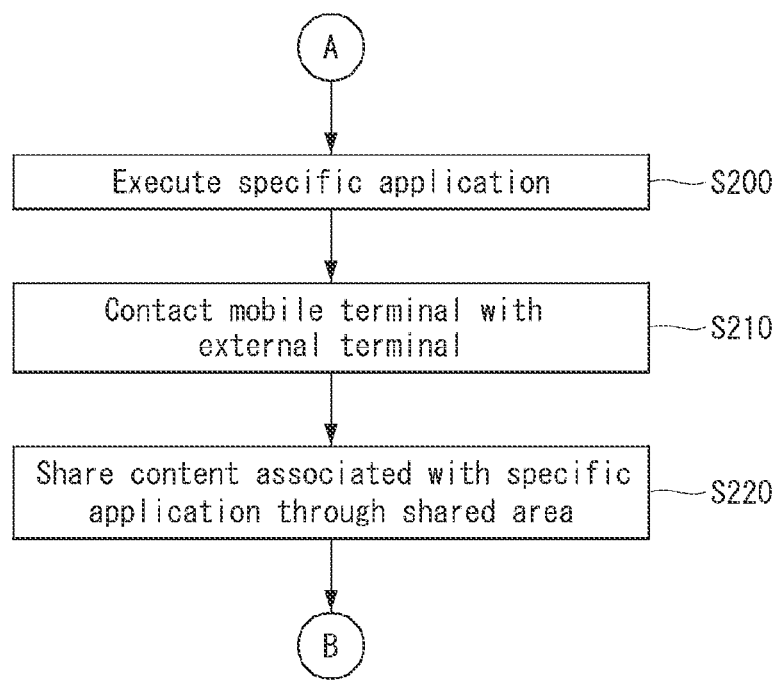
FIG. 16 is a flowchart illustrating a method for controlling the mobile terminal according to a second embodiment of the present invention.

FIG. 16 is a flowchart illustrating a method for controlling the mobile terminal according to a second embodiment of the present invention. The method for controlling the mobile terminal according to the second embodiment of the present invention may be implemented in the mobile terminal 100 described above with reference to FIGS. 1 to 3. The second embodiment of the present invention may be implemented based on the first embodiment. Further, it is assumed that the external terminal 200 which is brought into contact with the mobile terminal 100 can equally perform all operations performed by the mobile terminal 100.

Referring to FIG. 16, the mobile terminal 100 may execute a specific application (S200). The mobile terminal 100 may not execute the specific application and the external terminal 200 may execute the specific application. Upon lateral contact between the mobile terminal and the external terminal 200 (S210), the controller 180 controls content related to the specific application to be shared through the shared area (S220).

In the second embodiment of the present invention, the shared area is used for the specific application to be separately executed in the mobile terminal 100 and the external terminal as well as functioning as a simple tray for sharing content.

FIG. 17A to 19 are views illustrating an operation of the mobile terminal when the second embodiment of the present invention is applied to a music player application. Referring to FIG. 17A, the mobile terminal 100 can execute an application for playing music. The external terminal 200 can also execute the application for playing music or other applications. The external terminal 200 may display the homescreen on the touchscreen without executing a specific application. Otherwise, the display of the external terminal 200 may be turned off.

Figure 17B:
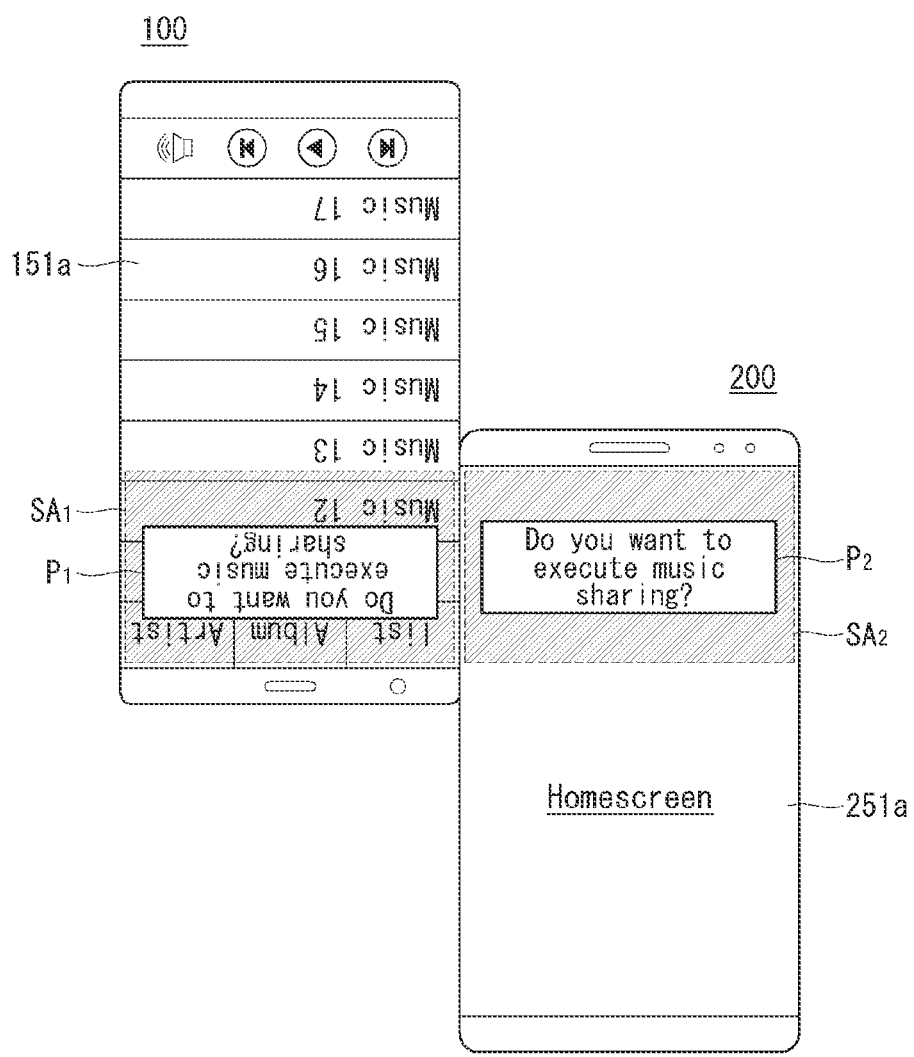
FIGS. 17A to 19 are views illustrating an operation of the mobile terminal when the second embodiment of the present invention is applied to a music player application.

Upon lateral contact between the mobile terminal 100 and the external terminal 200, the controller 180 of the mobile terminal 100 displays the first area SA1 (first shared area) and the second area 151a distinguished from the first area on the touchscreen 151, as shown in FIG. 17B, as described in the first embodiment of the present invention. The display area of the external terminal 200 may be divided into the first area SA2 (second shared area) and the second area 251a.

Then, the controller 180 of the mobile terminal 100 displays a pop-up window P1 for inquiring whether to execute a music sharing function in the first shared area SA1. The external terminal 200 may also display the pop-up window P2 in the second shared area SA2.

When the music sharing function is executed according to predetermined input, the mobile terminal 100 and the external terminal 200 respectively activate the first shared area SA1 and the second shared area SA2 for the music sharing function.

Figure 17C:
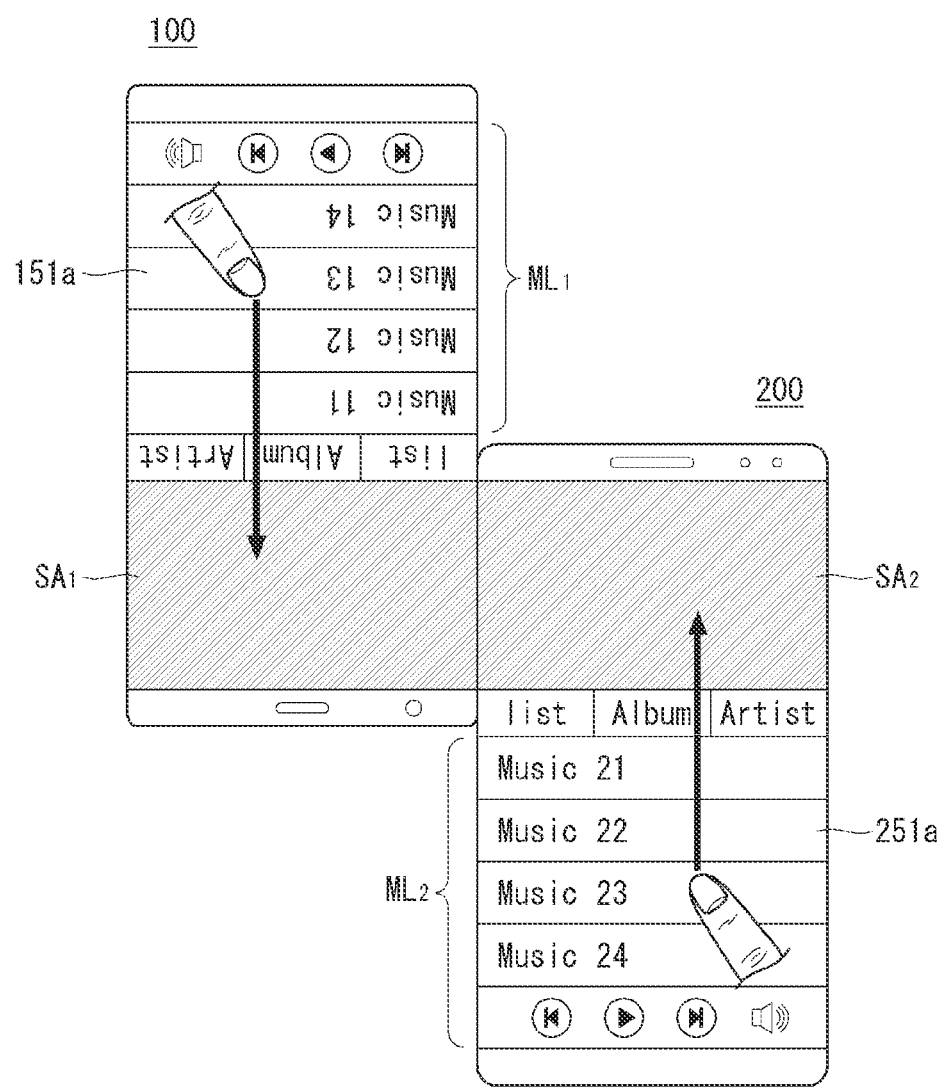

Referring to FIG. 17C, the controller 180 of the mobile terminal 100 receives input of associating at least one of music files ML1 displayed in the second area 151a with the first shared area SA1. The input may be drag input. The external terminal 200 receives input of dragging at least one of music files ML2 displayed in the second area 251a to the second shared area SA2.

Figure 18:
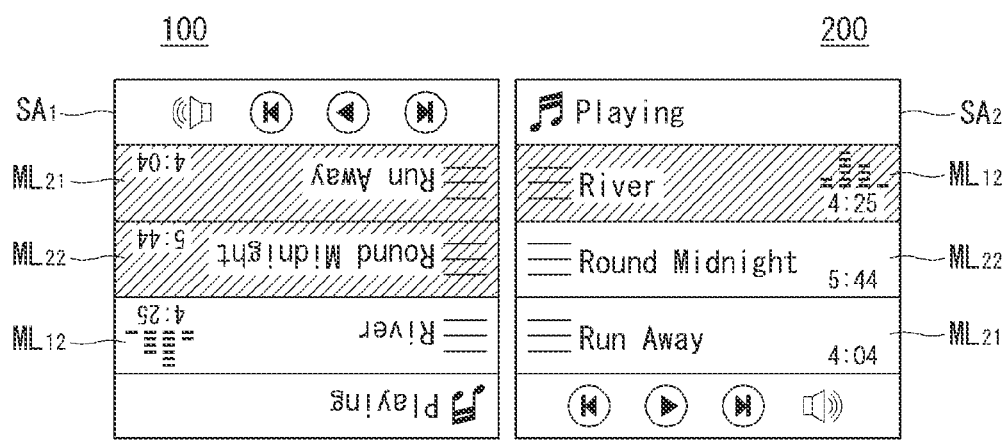

Referring to FIG. 18, the controller 180 displays, in the first shared area SA1, a play list including shared content ML12 of the mobile terminal 100 and shared content ML21 and ML22 of the external terminal 200.

The controller 180 of the mobile terminal 100 may display content such that the content is visually discriminated in order to recognize the source of the content. For example, the mobile terminal 100 can display content included in the first shared area SA1 differently according to whether the source of the content is the mobile terminal 100 or the external terminal 200 such that the user can intuitively recognize the source of the content. The external terminal 200 may operate in the same manner.

The controller 180 can also display, in the first shared area SA1, a control area for controlling playback of the content included in the play list in addition to the play list.

Upon reception of input of playing specific content included in the play list through the control area, the controller 180 can commonly play the specific content in the mobile terminal 100 and the external terminal 200.

When the input of playing the specific content is received, the controller 180 can control the audio output unit 152 of the mobile terminal 100 to be connected to the audio output unit (e.g. speaker or earphone) of the external terminal 200 so as to output sounds according to playback of the specific content according to combination of the mobile terminal 100 and the external terminal 200.

Figure 19:
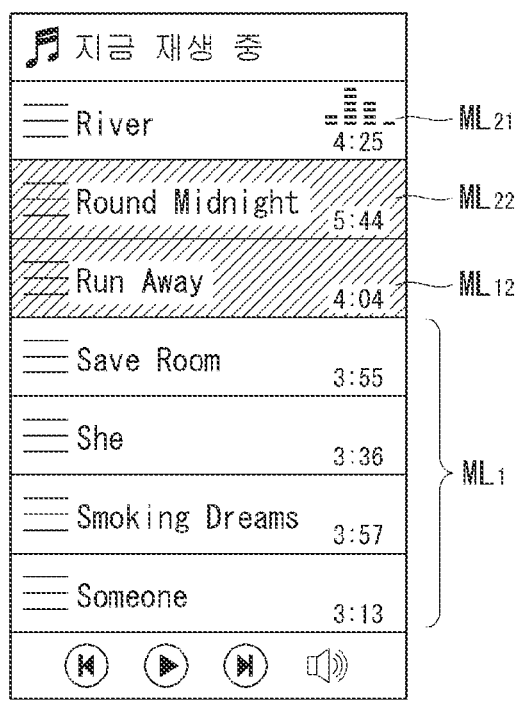

Referring to FIG. 19, contact between the mobile terminal 100 and the external terminal 200 is terminated while playback of the specific content is shared through the first shared area SA1, the controller 180 can display a list of shared playback content on the touchscreen 151. The external terminal 200 may operate in the same manner.

In addition, the controller 180 can store a record of a predetermined play list shared through contact with the external terminal 200. When the mobile terminal 100 is brought into contact with the same external terminal again after the contact is terminated, the record may be used through the shared area.

Figure 20A:
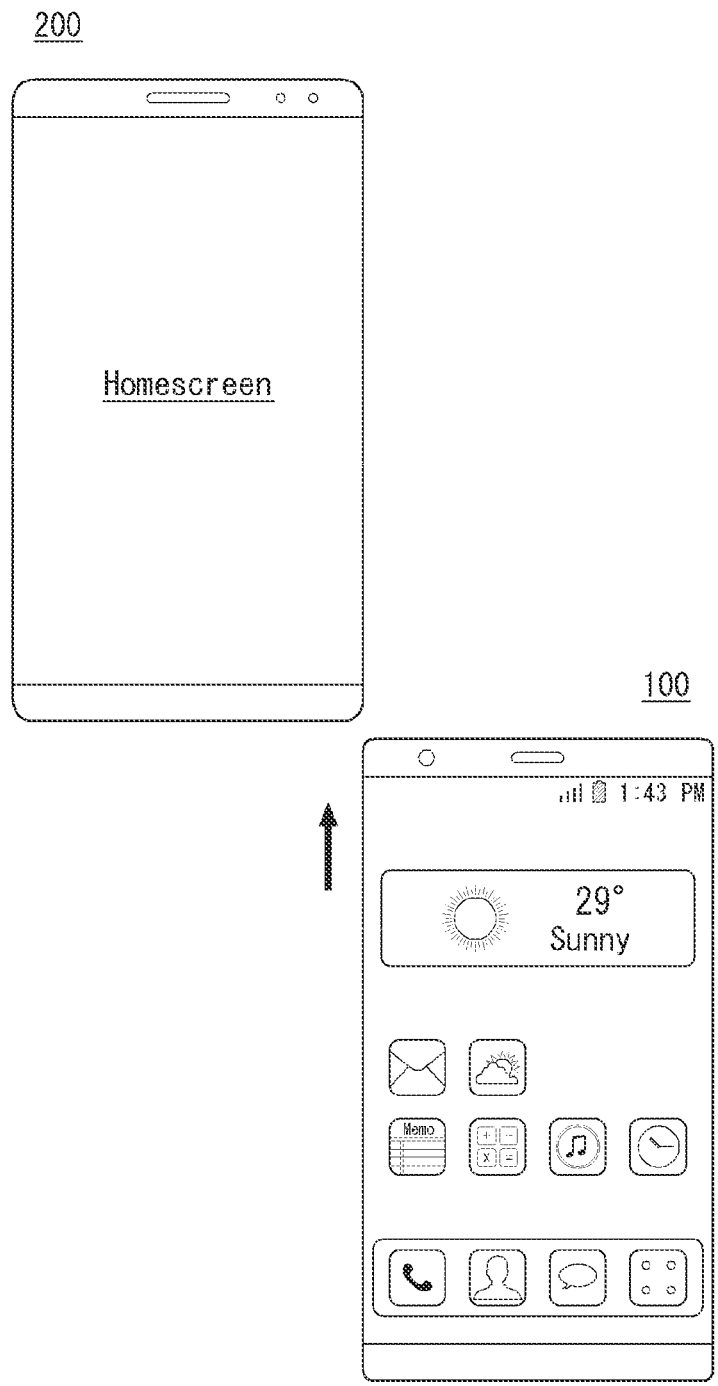
FIGS. 20A to 21 are views illustrating an operation of the mobile terminal when the second embodiment of the present invention is applied to an example of sharing an application.
Figure 20B:
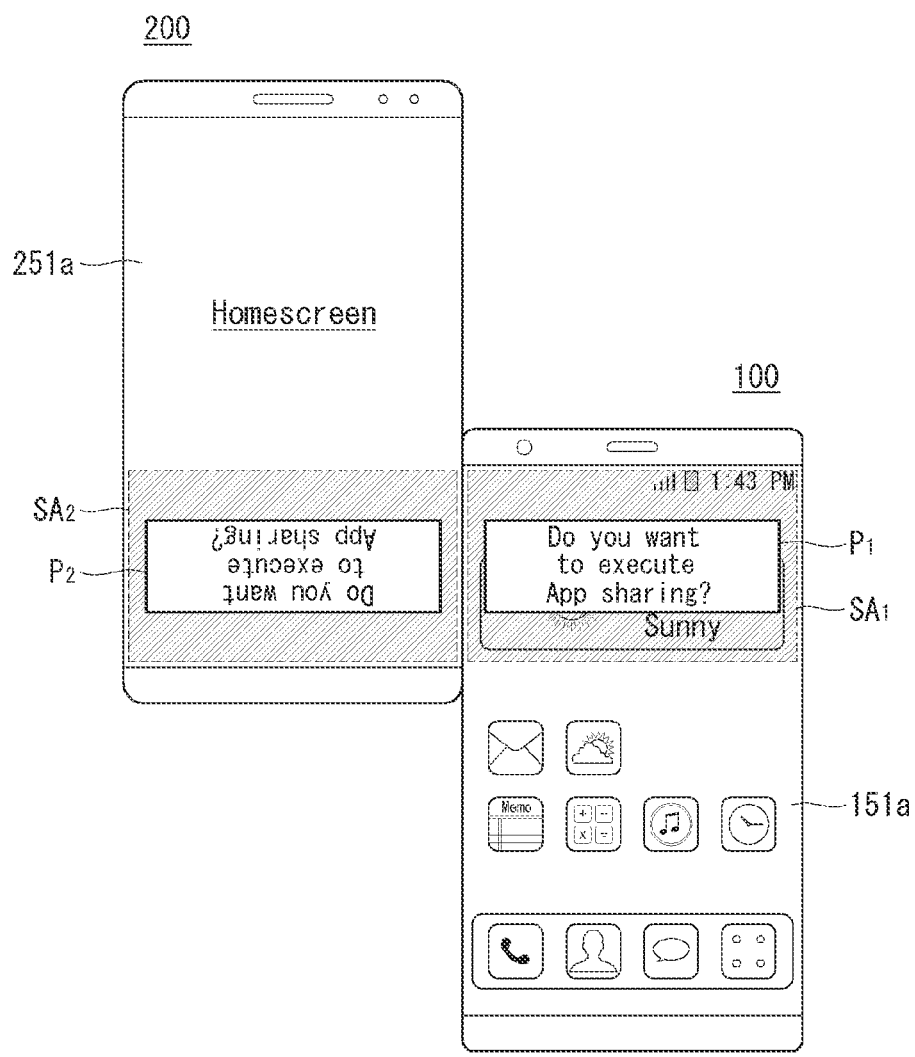
Figure 20C:
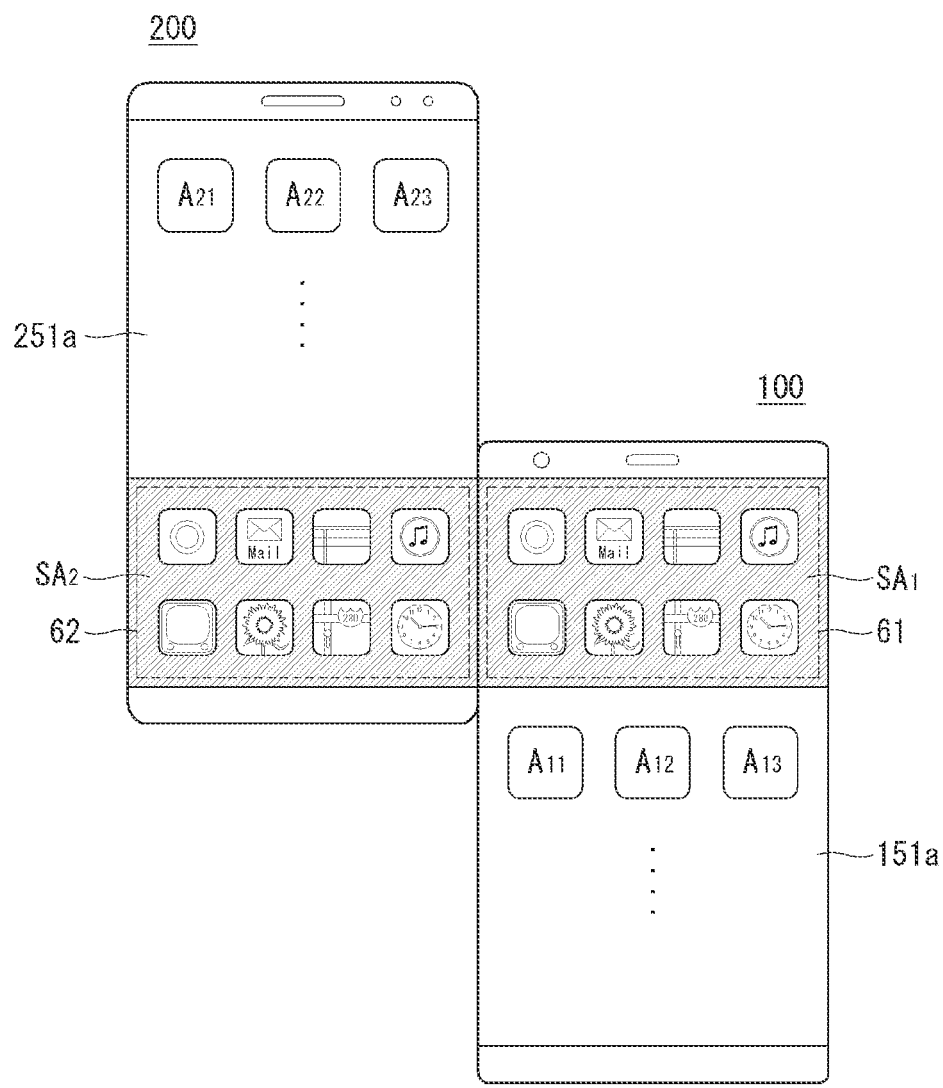
Figure 20D:
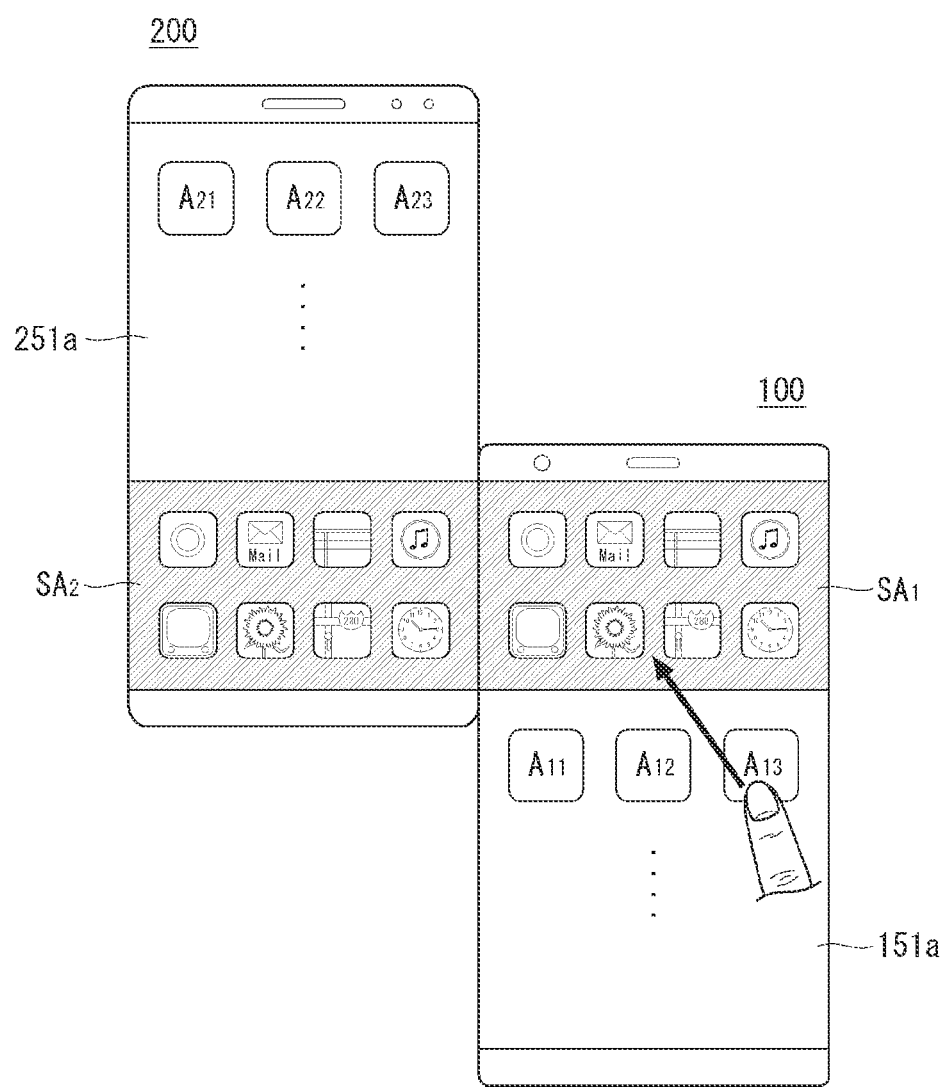
Figure 20E:
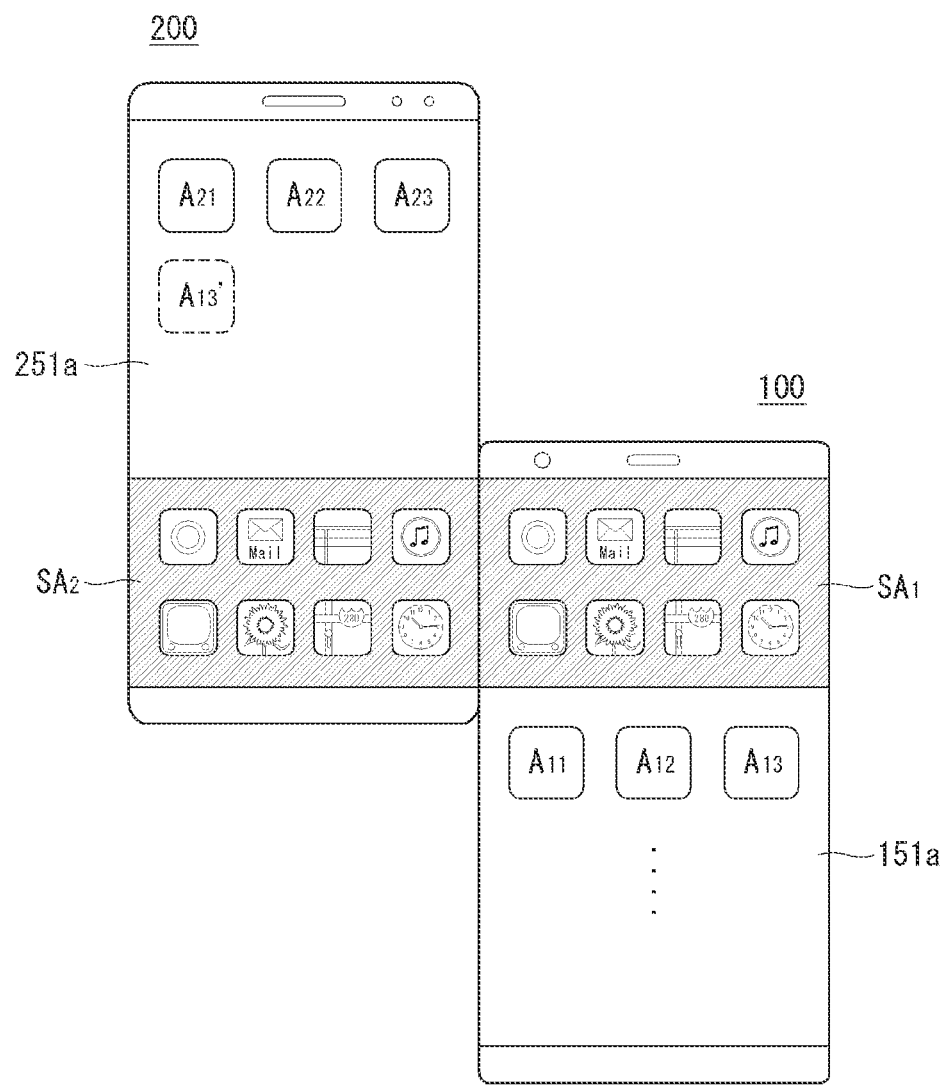
Figure 21:
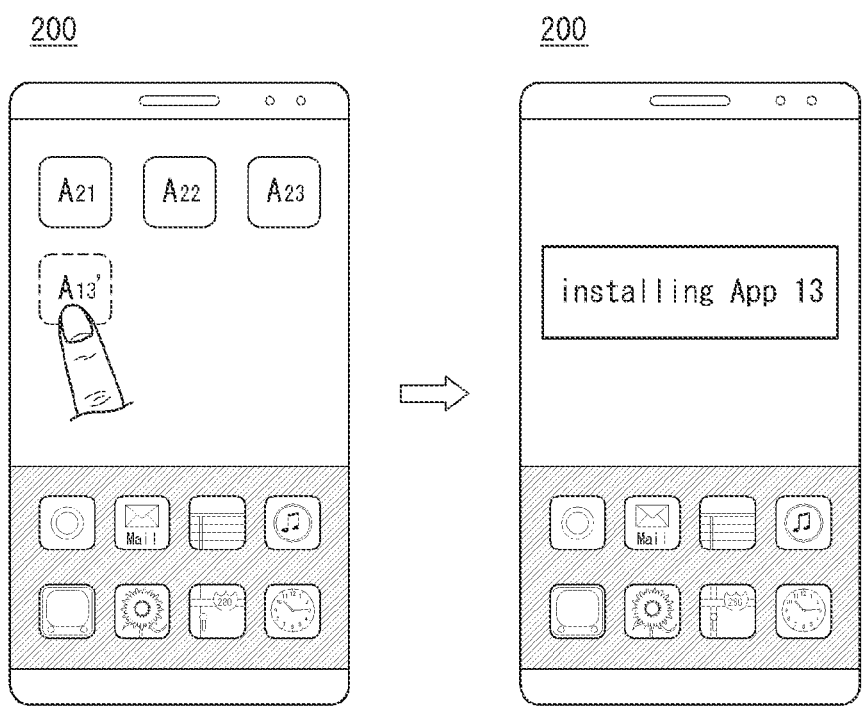

Next, FIGS. 20A to 21 are views illustrating an operation of the mobile terminal when the second embodiment of the present invention is applied to an example of sharing an application. Referring to FIG. 20A, the mobile terminal 100 may display the homescreen on the touchscreen 151. The homescreen may display at least one application that can be executed in the mobile terminal 100 and widget icons. Upon sensing lateral contact with the external terminal 200, the controller 180 can display the first shared area SA1 on the touchscreen 151.

Referring to FIG. 20B, the controller 180 can display a pop-up window P1 for inquiring whether to execute an application sharing function in the first shared area SA1. The external terminal 200 in contact with the mobile terminal 100 may operate in the same manner.

Referring to FIG. 20C, the controller 180 can display, in the first shared area SA1, at least one application 61 installed in the external terminal 200, from among applications available in the mobile terminal 100. The external terminal 200 may operate in the same manner.

The controller 180 of the mobile terminal 100 may display applications A11, A12 and A13 other than the common application 61 in the second area 151a. The external terminal 200 may also display applications A21, A22 and A23 other than the common application 62 in the second area 251a.

While the common application 61 is respectively displayed in the first shared area SA1 and the second shared area SA2 in FIG. 20C, the common application 61 may be displayed in one shared area including the first and second shared areas SA1 and SA2.

Referring to FIG. 20D, upon reception of input of dragging the specific application A13 displayed in the second area 151a to the first shared area SA1, the controller 180 can control the specific application A14 to be shared by the external terminal 200.

More specifically, referring to FIG. 20E, the controller 180 can display a virtual application A13' corresponding to the shared application A13 in the second area 251a of the external terminal 200. The virtual application A13' may be mapped to a link address for installing the specific application A13.

Referring to FIG. 21, upon reception of input of selecting the virtual application A13', the external terminal 200 may install the specific application A13.

When the virtual application A13' is displayed, as shown in FIGS. 20E and 21, and input of dragging the specific application A13 to the first shared area SA1 is received, as shown in FIG. 20D, without a process of selecting the virtual application 13', the controller 180 can control the specific application A13 to be automatically installed in the external terminal 200.

Figure 22A:
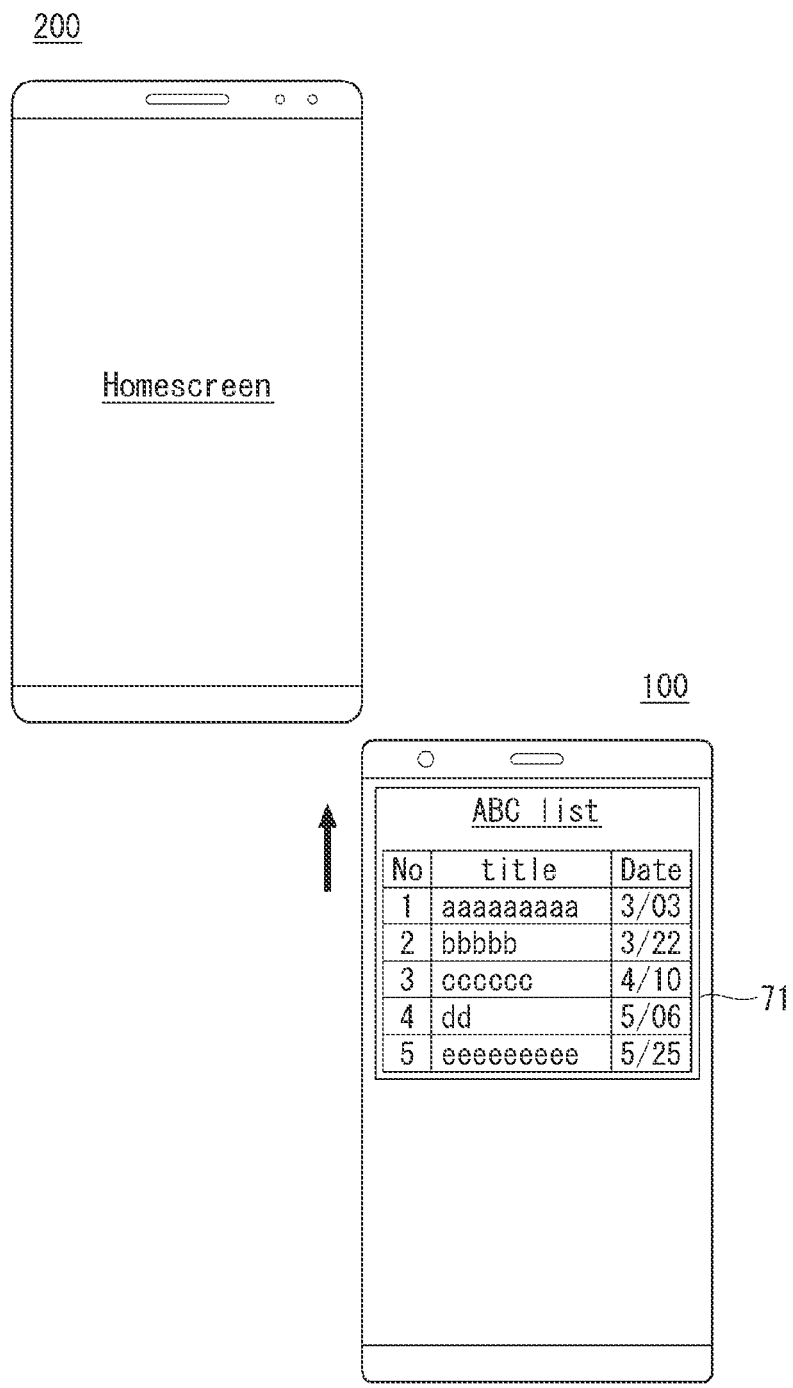
FIGS. 22A to 22D) are views illustrating an operation of the mobile terminal when the second embodiment of the present invention is applied to an example of sharing a text.

FIGS. 22A to 22D are views illustrating an operation of the mobile terminal when the second embodiment of the present invention is applied to an example of sharing a text. Referring to FIG. 22A, the mobile terminal 100 may execute a text file 71 including predetermined texts.

The controller 180 can display the first shared area SA1 on the touchscreen 151 upon sensing lateral contact between the mobile terminal 100 and the external terminal 200.

Figure 22B:
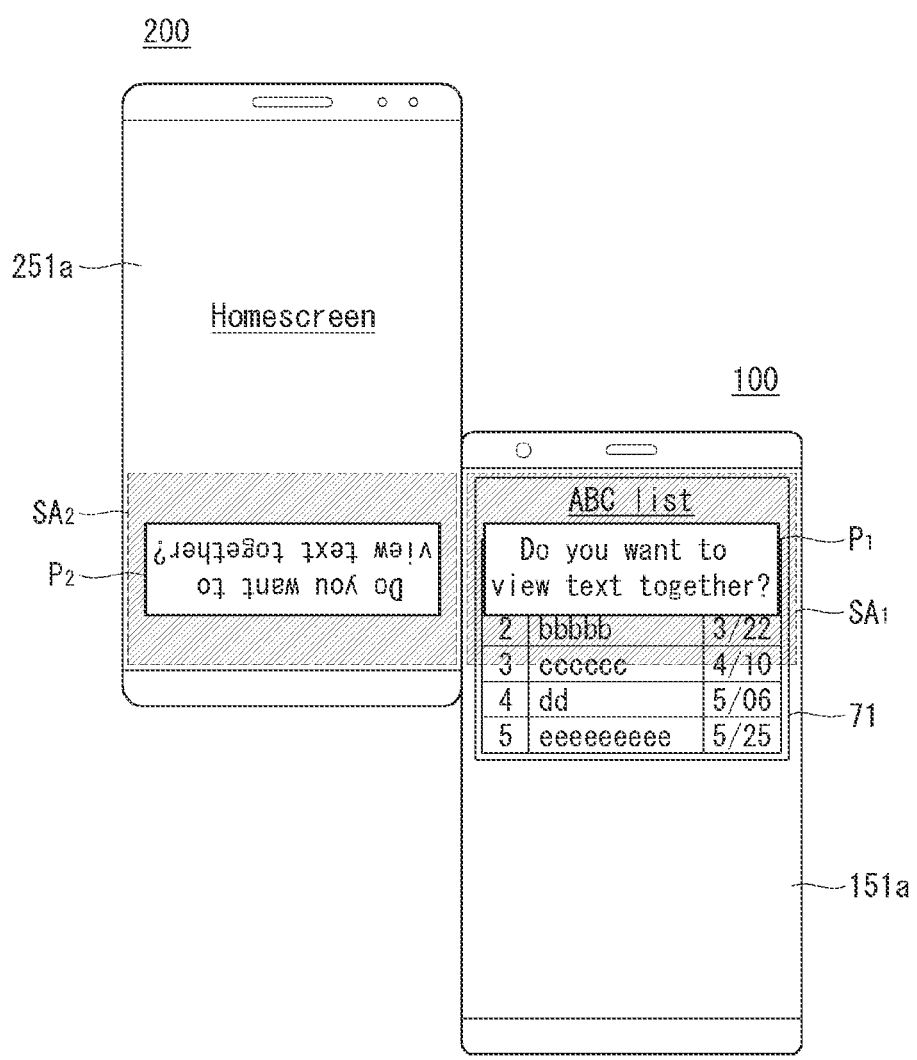

Referring to FIG. 22B, the controller 180 can display, in the first shared area SA1, a pop-up window P1 for inquiring whether to execute a text view function. The external terminal 200 in contact with the mobile terminal 100 may operate in the same manner.

Figure 22C:
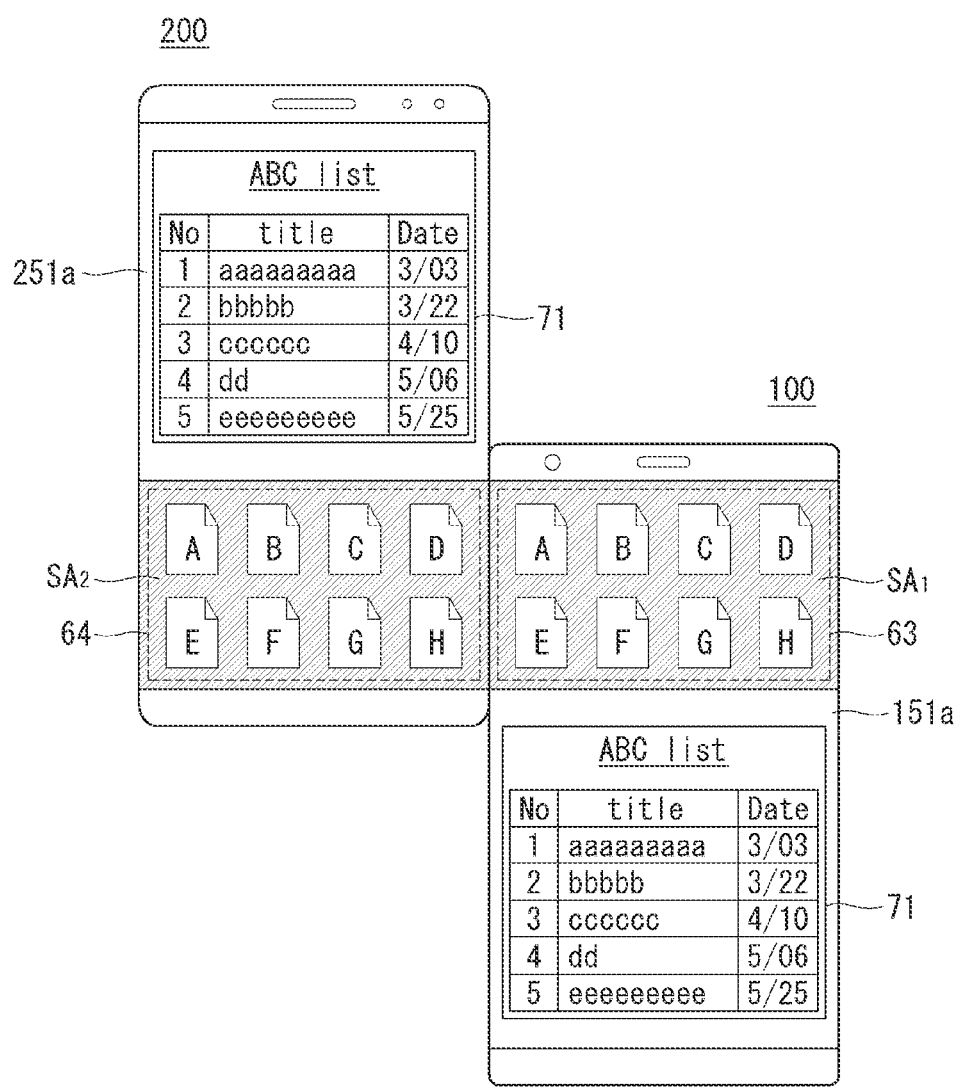

Referring to FIG. 22C, the controller 180 can display, in the first shared area SA1, at least one text file 64 present in the external terminal 200, from among text files 63 that can be used in the mobile terminal 100. The external terminal 200 may operate in the same manner.

Upon reception of input of dragging a specific text file 71 from among the at least one common text file 64 to the first shared area SA1, the controller 180 of the mobile terminal 100 may display the specific text file 71 in the second area 151a of the touchscreen 151. The specific text file 71 may also be displayed in the second area 251a of the touchscreen of the external terminal 200.

Figure 22D:
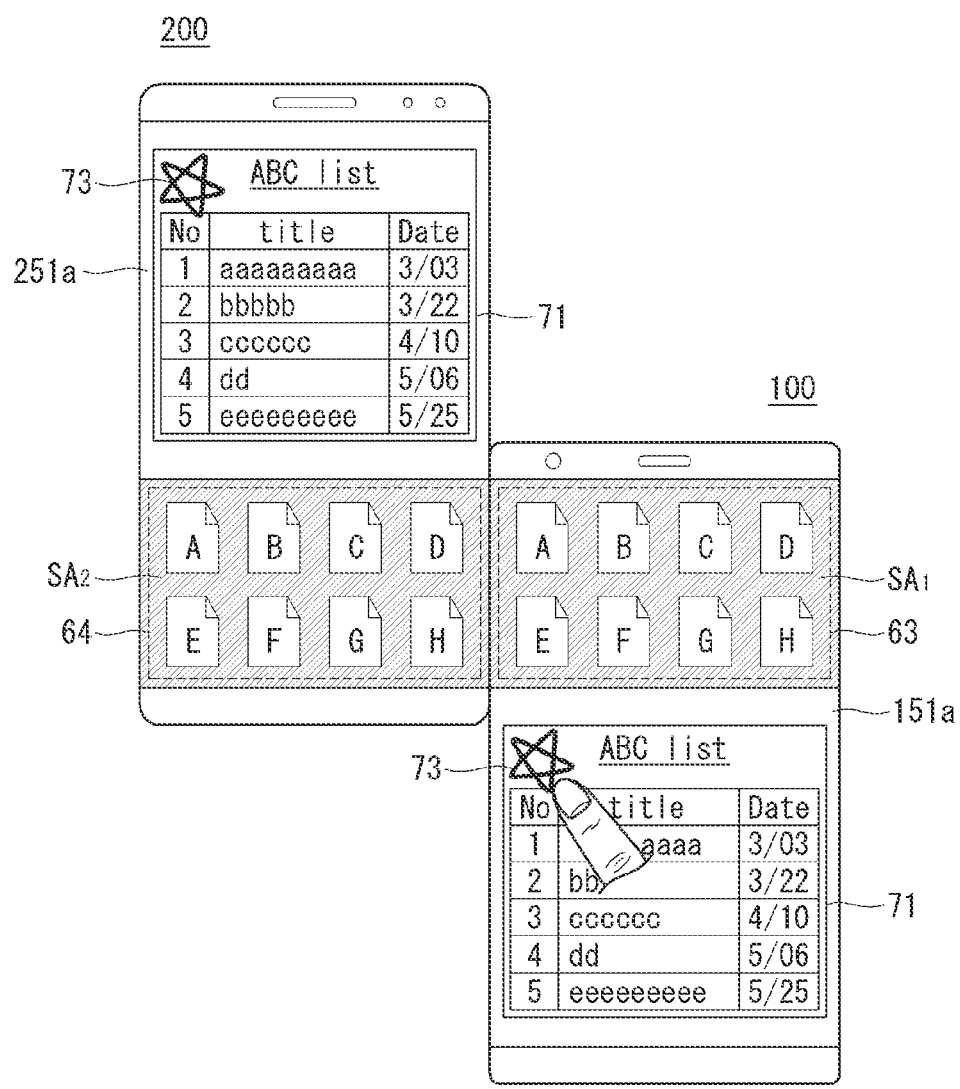

Referring to FIG. 22D, the controller 180 can perform operation of editing the text file 71 displayed in the second area 151a of the touchscreen 151. For example, predetermined handwriting input 73 can be applied to the text file 71. In this instance, the controller 180 of the mobile terminal 100 may control the handwriting input 73 to be displayed on the external terminal 200.

The external terminal 200 may separately store the edited text file. Accordingly, the edited result of the text file shared through contact between the mobile terminal 100 and the external terminal 200 can be shared more easily.

Figure 23B:
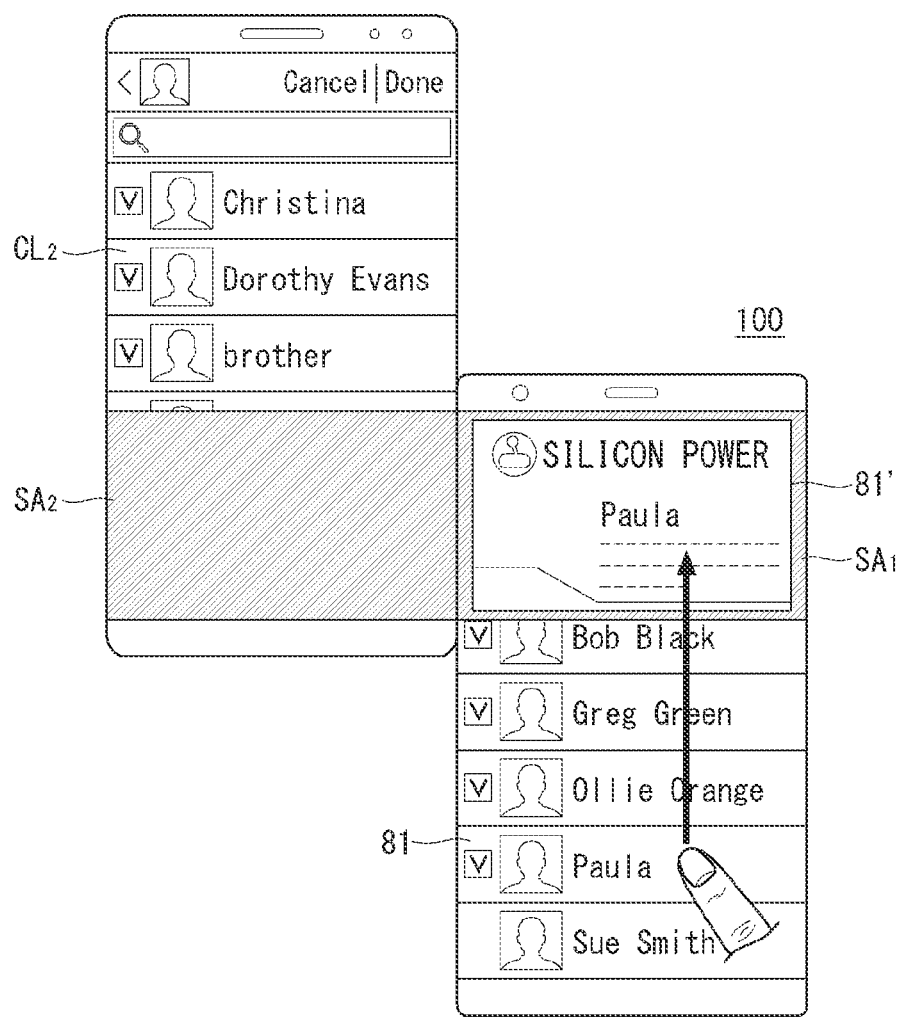
Figure 23C:
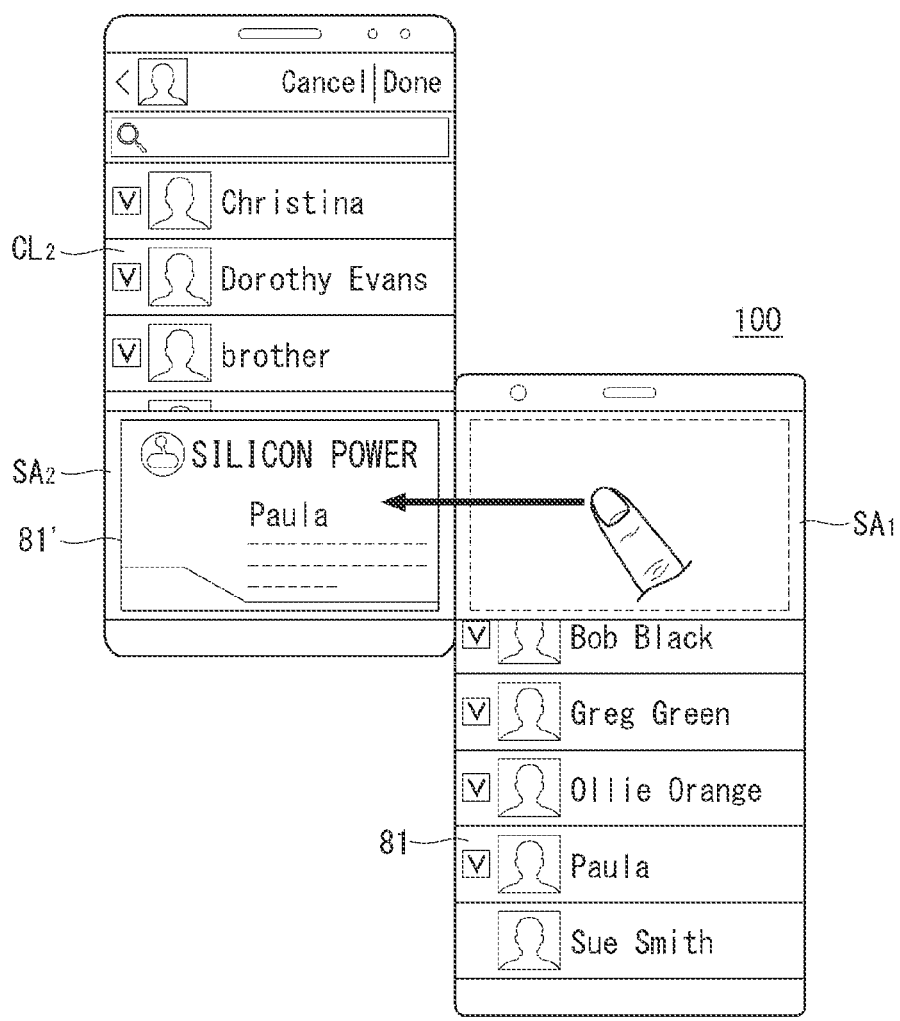

FIGS. 23A to 23C are views illustrating an operation of the mobile terminal when the second embodiment of the present invention is applied to an example of sharing a contact list. Referring to FIG. 23A, the mobile terminal 100 may display a contact list CL1 stored in the memory on the touchscreen 151.

The controller 180 can display the first shared area SA1 on the touchscreen 151 upon sensing lateral contact between the mobile terminal 100 and the external terminal 200. The external terminal 200 may display a contact list CL2 stored therein in the second area 251a of the touchscreen thereof.

Referring to FIG. 23B, when the controller 180 receives input of dragging contact information 81 of a specific person, included in the contact list CL1, to the first shared area SA1, the controller 180 can display the contact information 81' of the specific person in the first shared area SA1. The contact information 81' of the specific person, displayed in the first shared area SA1, may be a business card file of the specific person.

Referring to FIG. 23C, upon reception of input of dragging the business file 81' of the specific person, displayed in the first shared area SA1, to the second shared area SA2 of the external terminal 200, the controller 180 controls the business file 81' to be transmitted to the external terminal 200 while being displayed in the second shared area SA2.

The external terminal 200 may store contact information of the specific person, which corresponds to the business file 81', and add the contact information to the contact list CL2. Accordingly, it is possible to easily share contact information through contact between the mobile terminal 100 and the external terminal 200.

Figure 24:
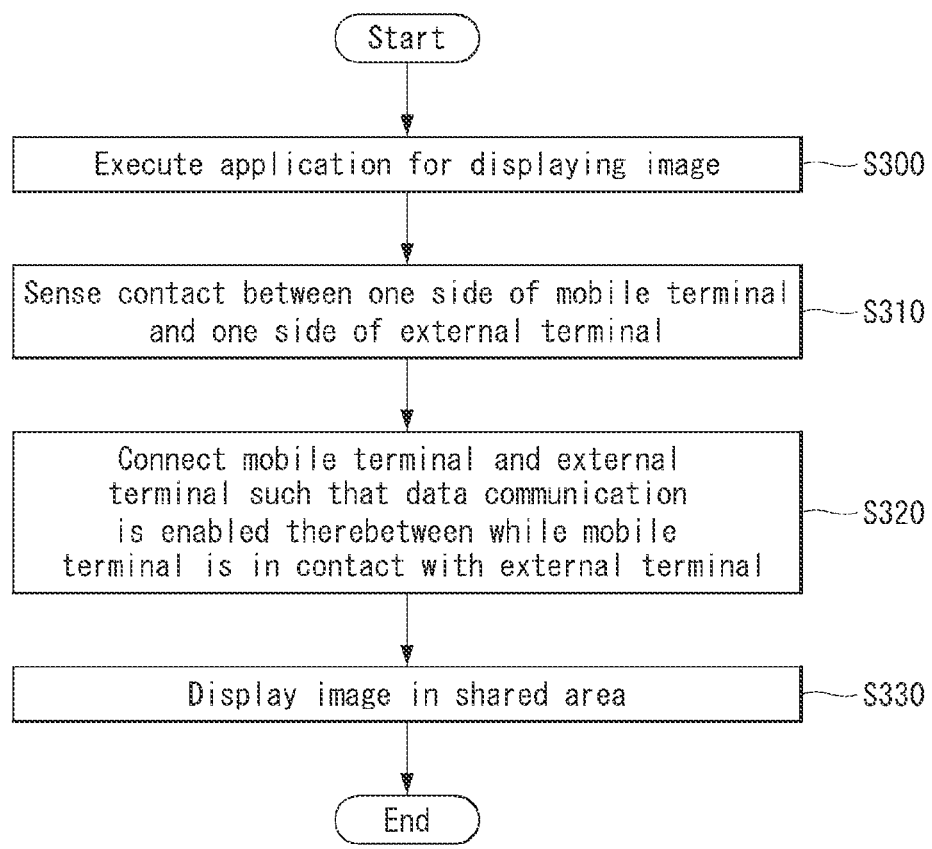
FIG. 24 is a flowchart illustrating a method for controlling the mobile terminal according to a third embodiment of the present invention.

FIG. 24 is a flowchart illustrating a method for controlling the mobile terminal according to a third embodiment of the present invention. The method for controlling the mobile terminal according to the third embodiment of the present invention may be implemented in the mobile terminal 100 described above with reference to FIGS. 1 to 3. The third embodiment of the present invention may be implemented based on the first embodiment.

The third embodiment is implemented on the assumption that the external terminal 200 coming into contact with the mobile terminal 100 can perform the same operations as those performed in the mobile terminal 100. In the third embodiment of the present invention, galleries of the terminals are shared.

Specifically, the mobile terminal 100 and the external terminal 200 may store images captured using cameras or images transmitted form external devices in galleries. According to the third embodiment of the present invention, the screens of the two terminals can be combined into one large screen and predetermined images stored in the galleries of the two terminals can be displayed through the large screen upon contact between the mobile terminal 100 and the external terminal 200.

Referring to FIG. 24, the controller 180 of the mobile terminal 100 can execute an application (e.g. a gallery application) for displaying images and display a specific image on the touchscreen 151 (S300). The controller 180 can sense contact between one side of the mobile terminal 100 and one side of the external terminal 200 (S310).

According to the third embodiment of the present invention, contact may mean contact between the entire sides of the two terminals or contact between parts of the sides of the two terminals. The controller 180 can connect the mobile terminal 100 and the external terminal 200 to each other such that data communication can be performed therebetween while the two terminals are in contact with each other (S320).

When the entire sides of the two terminals come into contact with each other, the controller 180 can recognize the touchscreen 151 of the mobile terminal 100 and the touchscreen of the external terminal 200 as one screen and control the specific image to be displayed on the overall area of the touchscreen (S330).

Figure 25A:
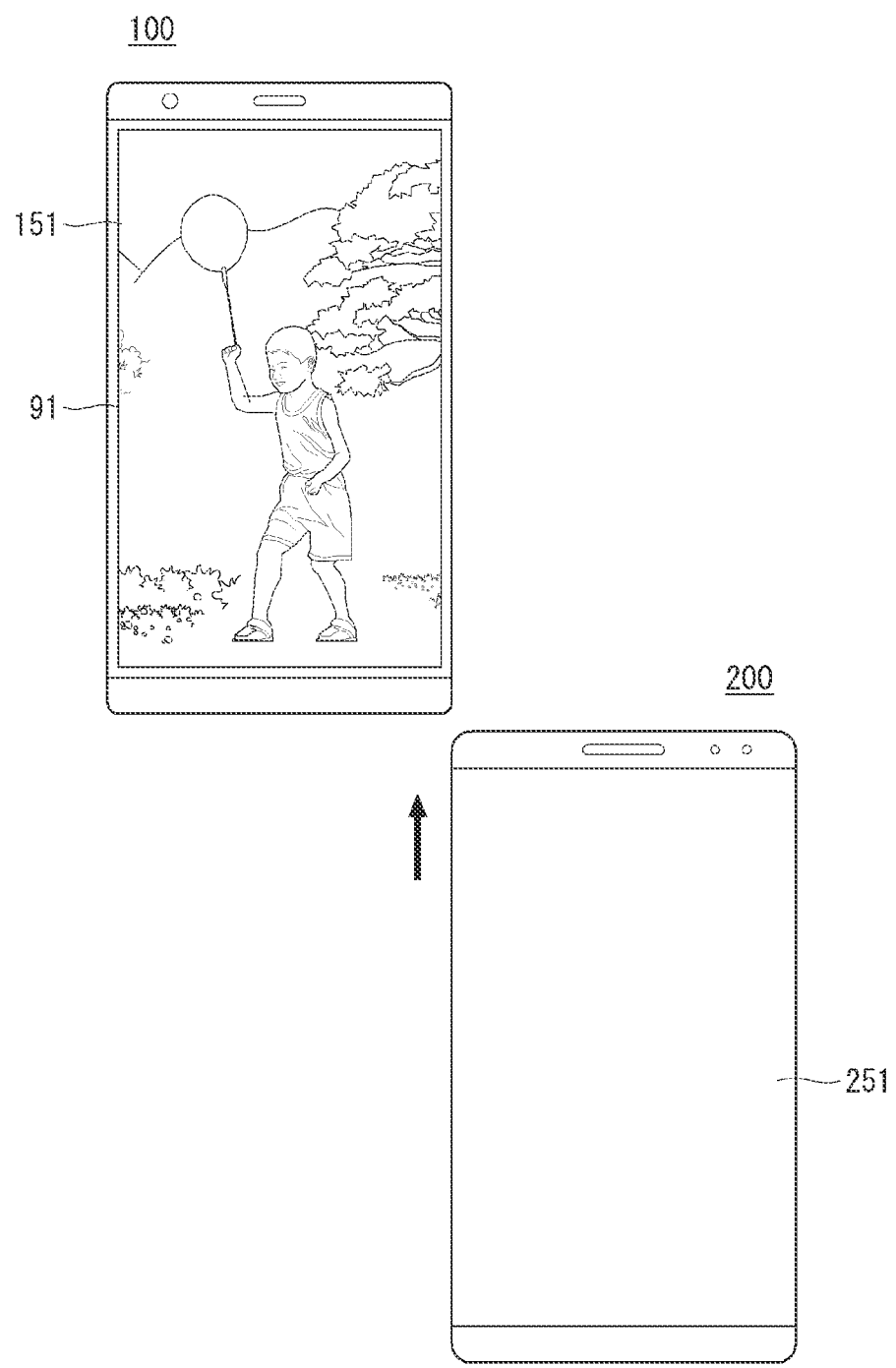
FIGS. 25A and 25B are views illustrating an example of using the screen of the external terminal to display a predetermined image when the mobile terminal displaying the image comes into contact with the external terminal according to the third embodiment of the present invention.
Figure 25B:
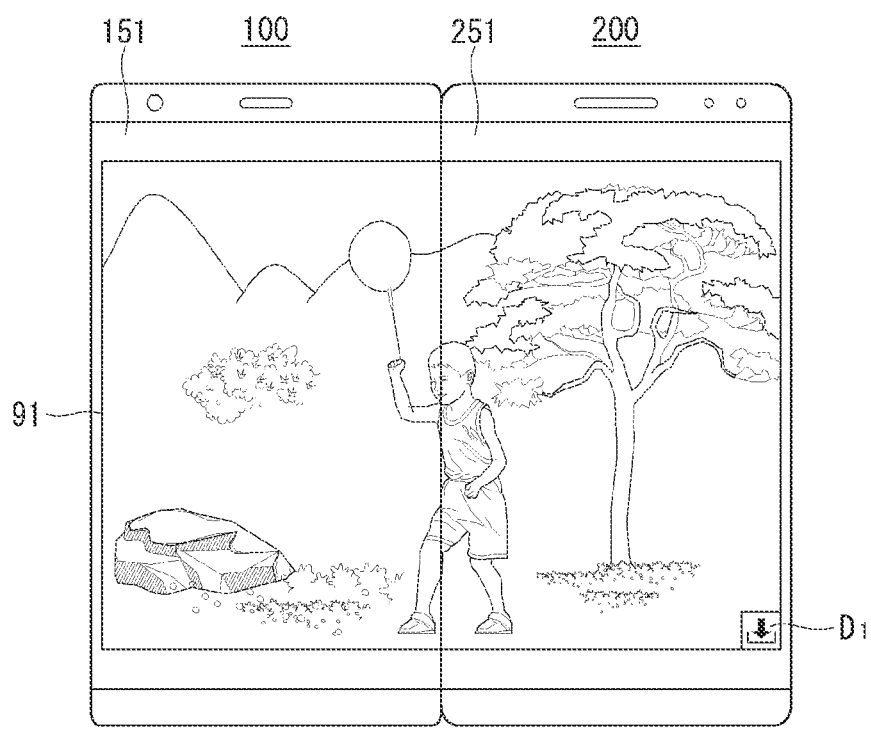

FIGS. 25A and 25B are views illustrating an example of using the full screen of the external terminal to display a predetermined image when the mobile terminal displaying the image comes into contact with the external terminal according to the third embodiment of the present invention.

Referring to FIG. 25B, the controller 180 of the mobile terminal 100 may display a first image 91 on the entire touchscreen 151 in a full view mode. When the external terminal 200 comes into contact with the overall side of the mobile terminal 100, the first image 91 displayed on the touchscreen 151 may be displayed over the touchscreen (first touchscreen) of the mobile terminal 10 and the touchscreen (second touchscreen) of the external terminal 200. The controller 180 can control the aspect ratio of the first image 91 and display the first image 91 over the first and second touchscreens.

The controller 180 can display a download indicator D1 in the portion of the first image 91, which is displayed on the second touchscreen, such that the user can intuitively recognize that the source of the first image 91 is the mobile terminal 100. Accordingly, upon reception of input of selecting the download indicator D1, the controller 180 can control the first image 91 to be stored in the external terminal 200.

Figure 26:
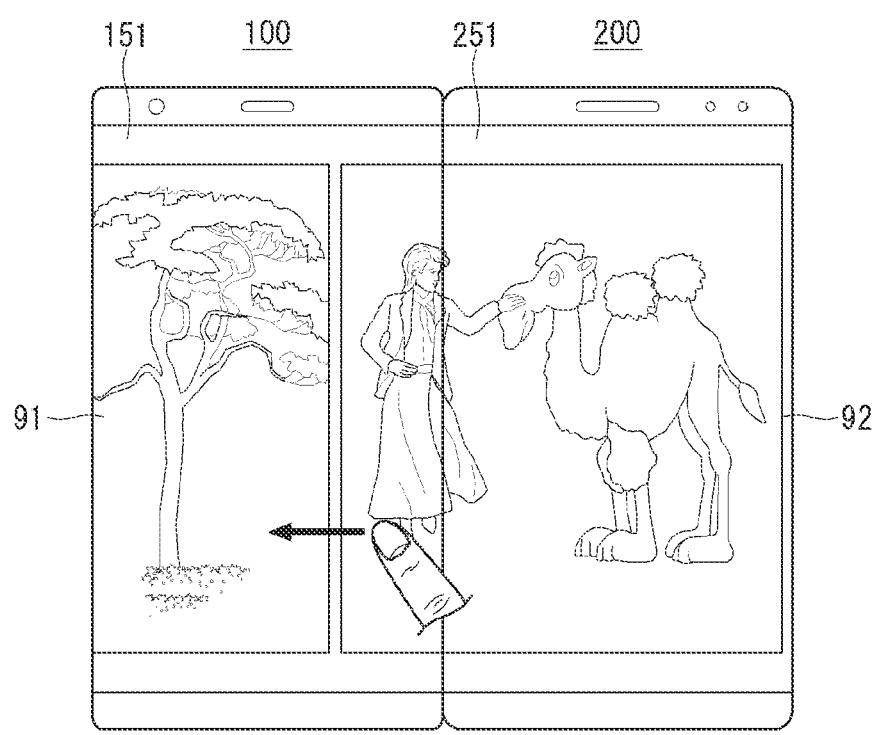
FIGS. 26 and 27 are views illustrating an example of turning images according to the third embodiment of the present invention.
Figure 27:
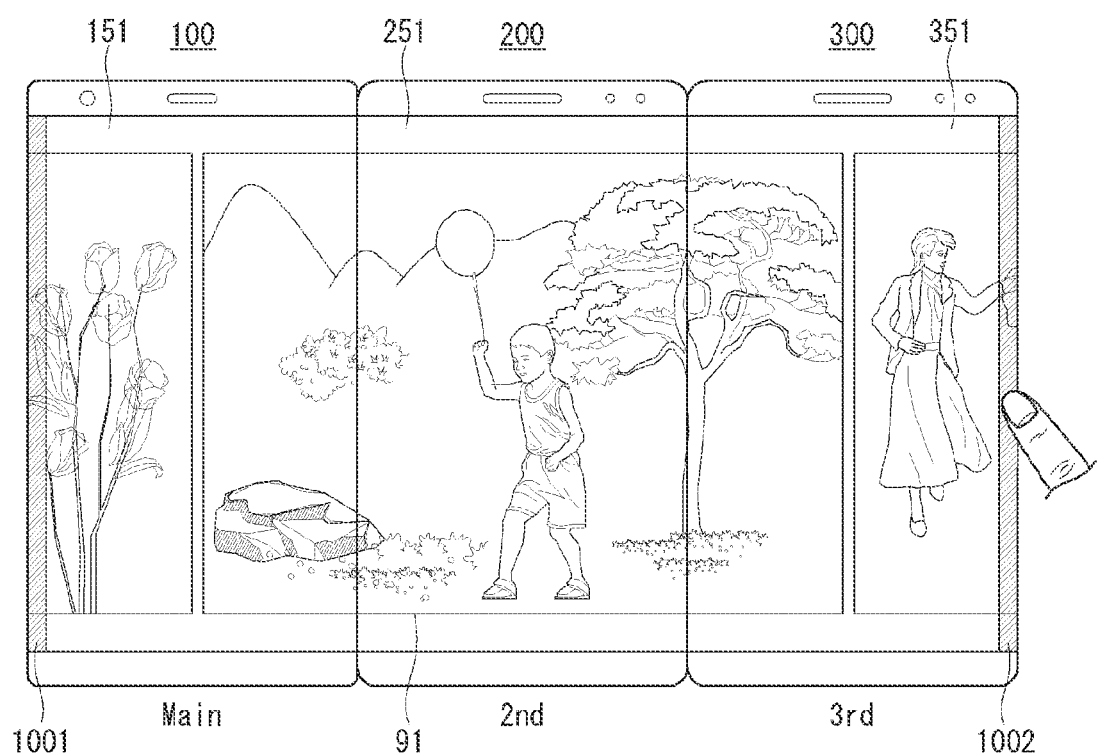

FIGS. 26 and 27 are views illustrating an example of turning images according to the third embodiment of the present invention.

Referring to FIG. 26, the controller 180 can arrange images stored in the galleries of the mobile terminal 100 and the external terminal 200 on the basis of predetermined information and display the arranged image in the shared area when the mobile terminal 100 and the external terminal 200 come into contact with each other.

Here, the shared area is based on the assumption that the first touchscreen 151 of the mobile terminal 100 and the second touchscreen of the external terminal 200 are recognized as a shared area. Upon reception of flicking input applied to the shared area, the controller 180 can arrange the first image 91 stored in the mobile terminal 100 and a second image 92 stored in the external terminal 200 on the basis of predetermined information and display the first image 91 and the second image 92 in the shared area in a scrolling manner.

The predetermined information may include an image capture date, place and the like. In addition, the controller 180 can display only content stored in the mobile terminal 100 or only content stored in the external terminal 200 in the shared area. Furthermore, the controller 180 can display content stored in the mobile terminal 100 and the external terminal 200 in the shared area on the basis of predetermined information.

Referring to FIG. 27, the mobile terminal 100 may come into contact with a first external terminal 200 in contact with a second external terminal 300 and the controller 180 can recognize screens of the terminals as one large screen and control images to be displayed thereon.

The next image or previous image of the currently displayed image may be displayed through touch input applied to the edge 1001 of the first touchscreen 151 of the mobile terminal 100 and the edge 1002 of a third touchscreen 251 of the second external terminal 200. For example, the previous image of the currently displayed image can be displayed upon reception of touch input applied to the edge 1001 of the first touchscreen 151 and the next image of the currently displayed image can be displayed on the touchscreens 151, 251 and 351 upon reception of touch input applied to the edge 1002 of the third touchscreen 351.

Figure 28A:
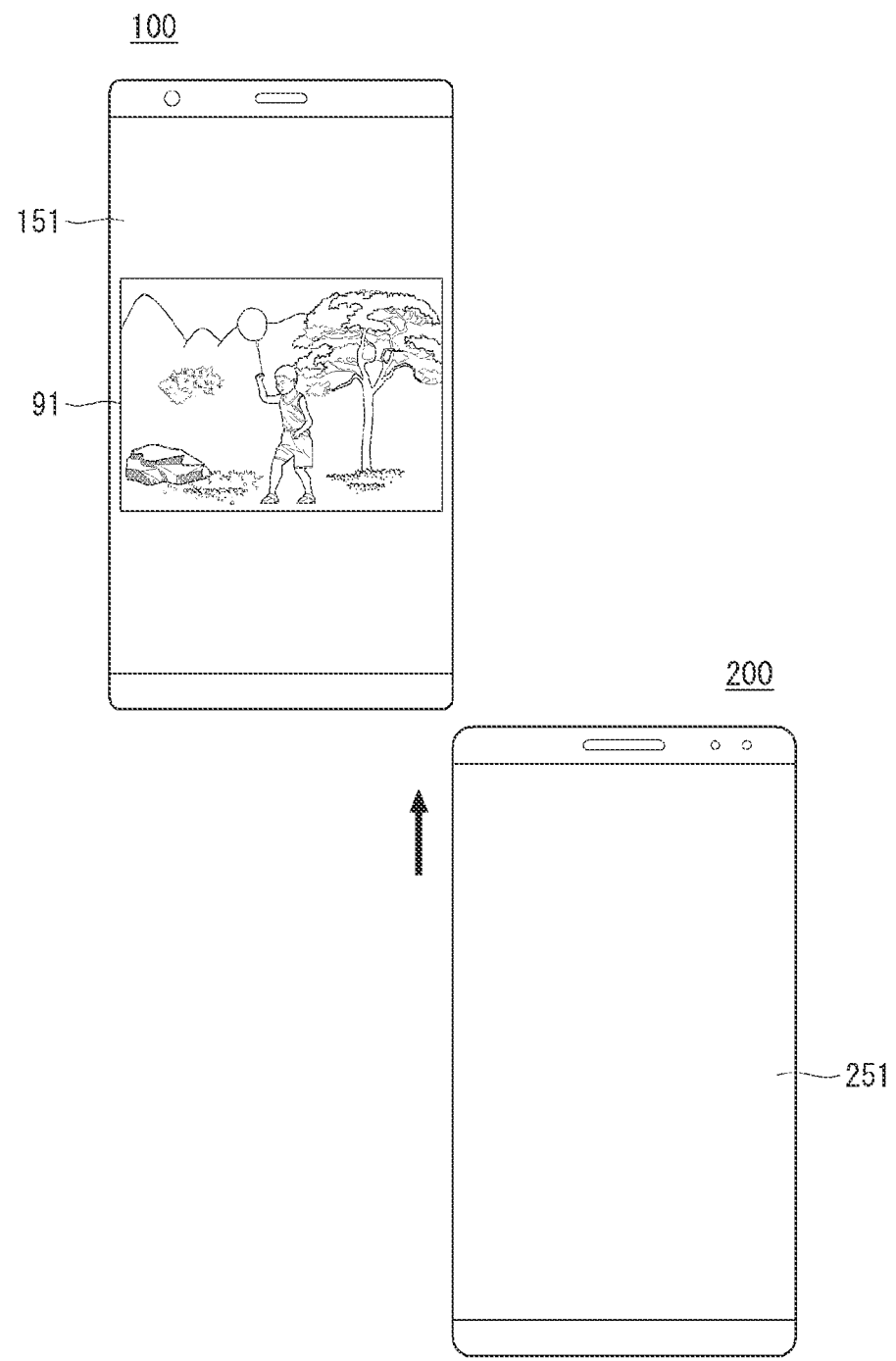
FIGS. 28A and 28B are views illustrating another example of displaying an image on the screens of the mobile terminal and the external terminal according to the third embodiment of the present invention.
Figure 28B:
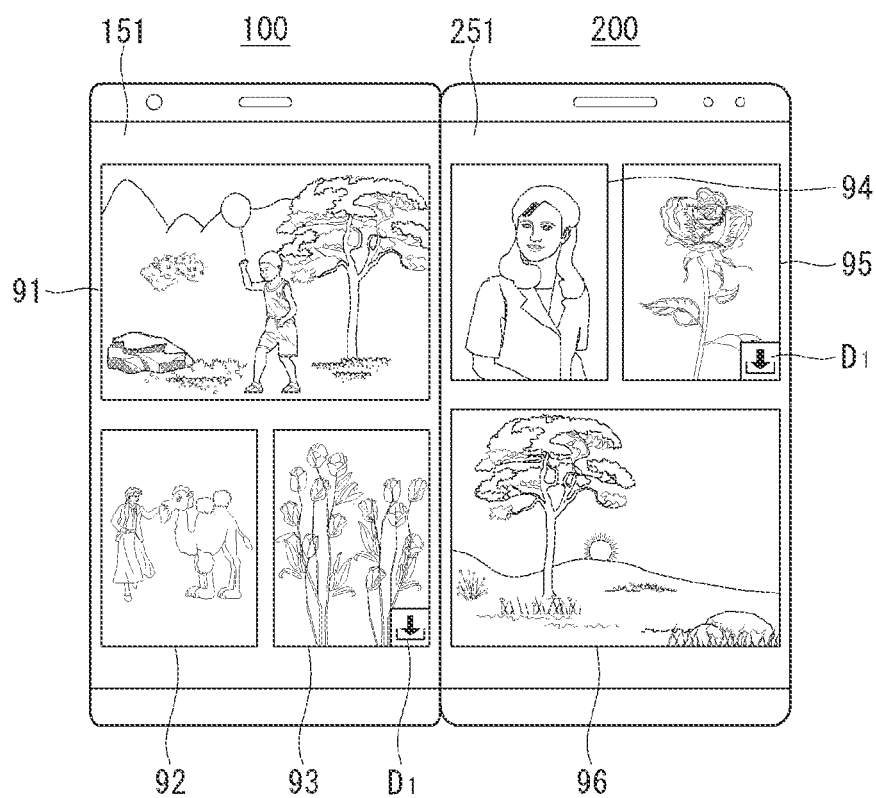

FIGS. 28A and 28B are views illustrating another example of displaying an image on the screens of the mobile terminal and the external terminal according to the third embodiment of the present invention. In FIG. 25, the external terminal 200 comes into contact with the mobile terminal 100 while the first image is displayed in the full view mode on the first touchscreen 151 of the mobile terminal 100.

Referring to FIG. 28A, the first image 91 may be adapted to the size of the first touchscreen 151 of the mobile terminal 100 and displayed thereon rather than being displayed in the full view mode. Referring to FIG. 28B, when the external terminal 200 comes into contact with the mobile terminal 100, a plurality of images stored in the mobile terminal 100 and the external terminal 200 may be displayed on the first touchscreen 151 of the mobile terminal 100 and the second touchscreen 251 of the external terminal 200 in an album view mode.

Referring to FIG. 28B, the controller 180 can add the download indicator D1 to an image 93 from among the images 91, 92 and 93 displayed on the first touchscreen 151 such that the user can intuitively recognize that the source of the image 93 is the external terminal 200. In addition, the controller 180 can add the download indicator D1 to an image 95 from among images 94, 95 and 96 displayed on the second touchscreen 251 such that the user can intuitively recognize that the source of the image 95 is the mobile terminal 100.

The third embodiment of the present invention includes a case in which the external terminal 200 executes an application other than the gallery application before the external terminal 200 comes into contact with the mobile terminal 100. In this instance, the external terminal 200 may automatically execute the gallery application upon contact with the mobile terminal 100 and display a plurality of images stored in the gallery thereof on the second touchscreen 151.

Figure 29A:
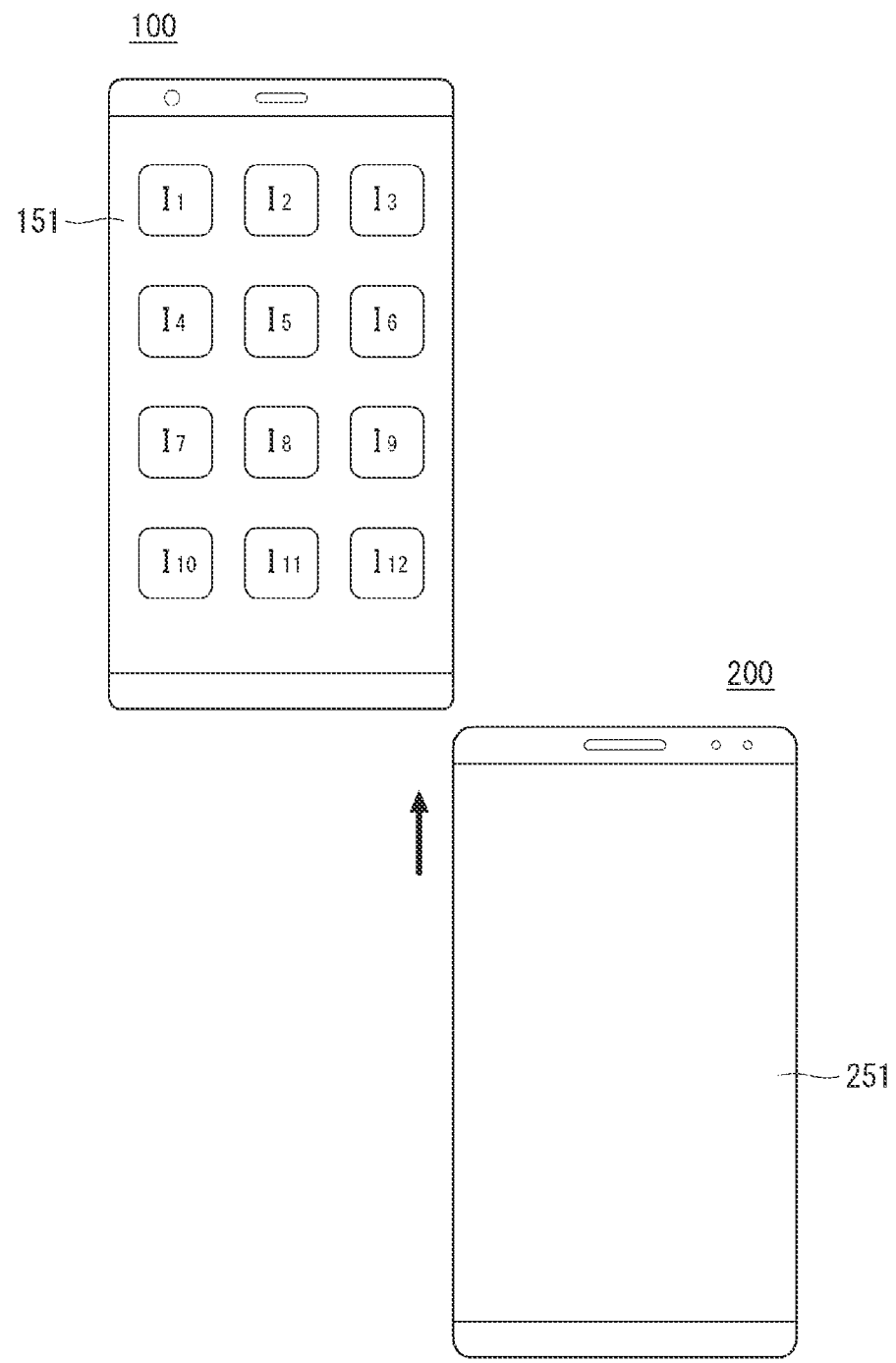
FIGS. 29A and 29B are views illustrating another example of displaying an image according to the third embodiment of the present invention.
Figure 29B:
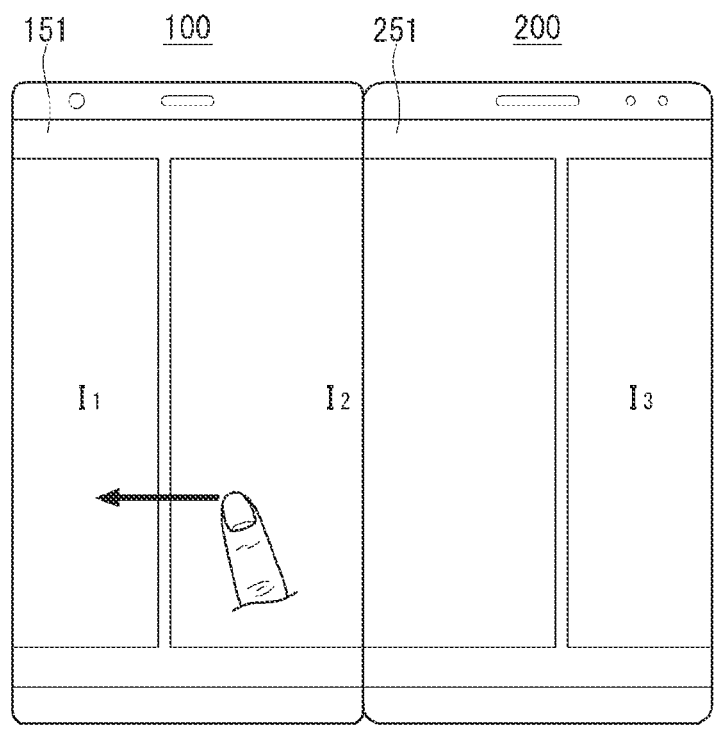

FIGS. 29A and 29B are views illustrating another example of displaying an image according to the third embodiment of the present invention. In particular, FIGS. 29A and 29B illustrate a gallery view function executed when the entire sides of the mobile terminal 100 and the external terminal 200 come into contact with each other.

Referring to FIG. 29A, the mobile terminal 100 may execute the gallery application to display a plurality of stored images I1 to I12 on the touchscreen 151. Referring to FIG. 29B, when lateral contact between the mobile terminal 100 and the external terminal 200 is achieved while the images are displayed on the touchscreen 151, the controller 180 can set the mobile terminal 100 as a master terminal and display images stored in the master terminal 100 throughout the shared area SA. Upon reception of flicking input applied to the image I1 displayed in the shared area SA, following images I2 and I3 may be sequentially displayed in the shared area SA in a sliding manner.

If the gallery application is also being executed in the external terminal 200 before the mobile terminal 100 and the external terminal 200 come into contact with each other, then a plurality of images stored in the galleries of the two terminals can be arranged on the basis of predetermined information and displayed through the overall shared area SA.

Figure 30A:
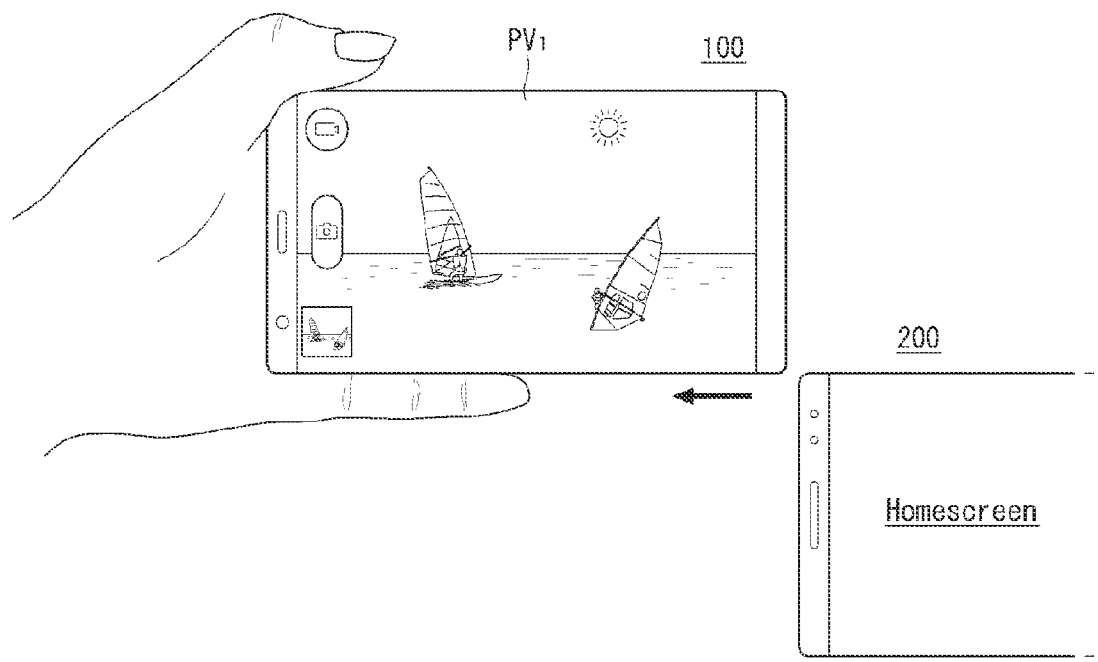
FIGS. 30A to 30C are views illustrating another example of displaying an image according to the third embodiment of the present invention.
Figure 30B:
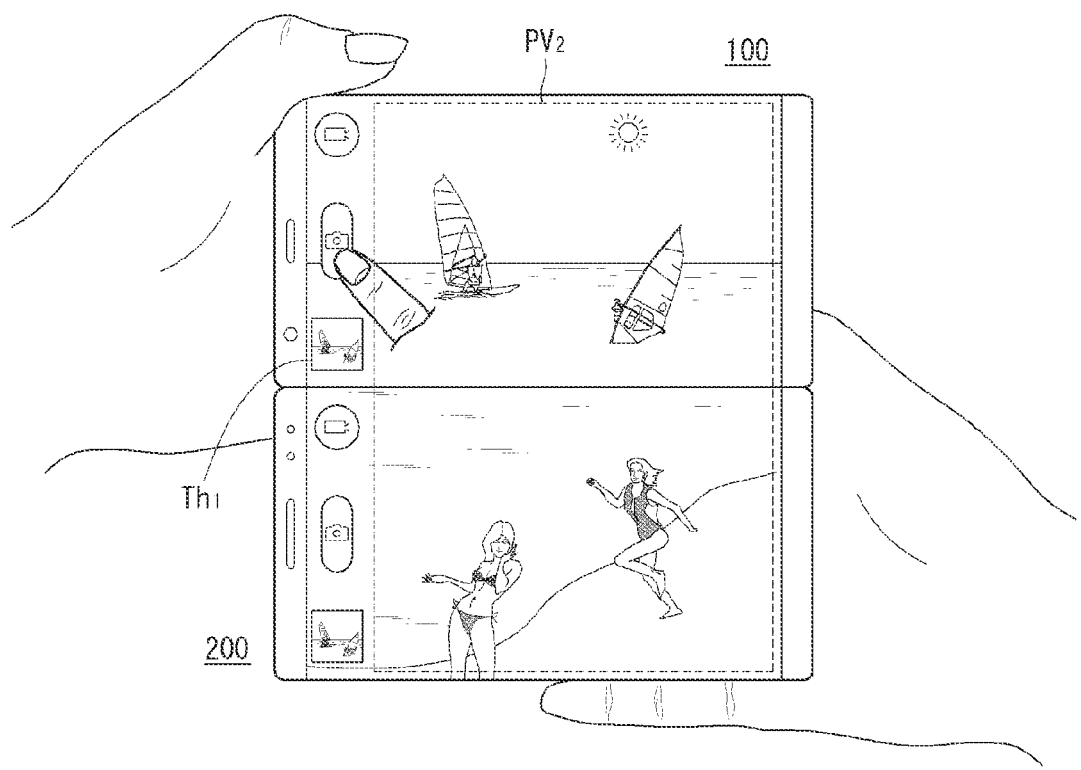
Figure 30C:
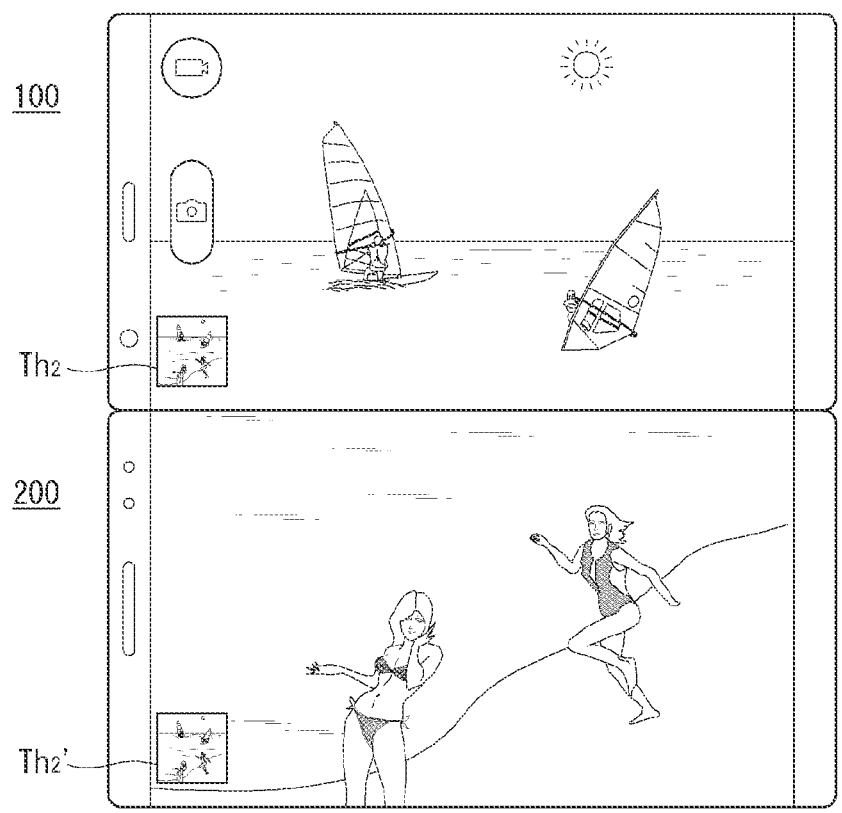

FIGS. 30A to 30C are views illustrating another example of displaying an image according to the third embodiment of the present invention. Referring to FIG. 30A, the mobile terminal 100 may execute a camera application and display a preview image PV1 on the touchscreen 151. Lateral contact between the mobile terminal 100 and the external terminal 200 may be achieved while the camera application is executed. The external terminal 200 coming into contact with the mobile terminal 100 may display the homescreen thereof. Otherwise, the external terminal 200 may execute an application other than the camera application.

Referring to FIG. 30B, upon contact of the external terminal 200 with the mobile terminal 100 in the state shown in FIG. 30A, the external terminal 200 may also execute the camera application and thus the preview image of the mobile terminal 100 may be extended to the touchscreen of the external terminal 200.

Upon reception of input of capturing an image while a preview image PV2 is displayed on the touchscreens of the two terminals according to contact between the two terminals, the controller 180 can display a thumbnail image Th2 corresponding to the captured image on the touchscreen 151, as shown in FIG. 30C. The captured image may also be stored in the external terminal 200 (refer to Th2' in FIG. 30C).

That is, an image can be captured using a large screen by applying the method for controlling the mobile terminal according to an embodiment of the present invention to the image capture function. The external terminal 200 may execute a function of sharing the screen only without directly executing the camera application. For example, upon contact between the mobile terminal 100 and the external terminal 200, the controller 180 can extend the area in which a preview image according to execution of the camera application is displayed to the touchscreen of the external terminal 200.

Figure 31:
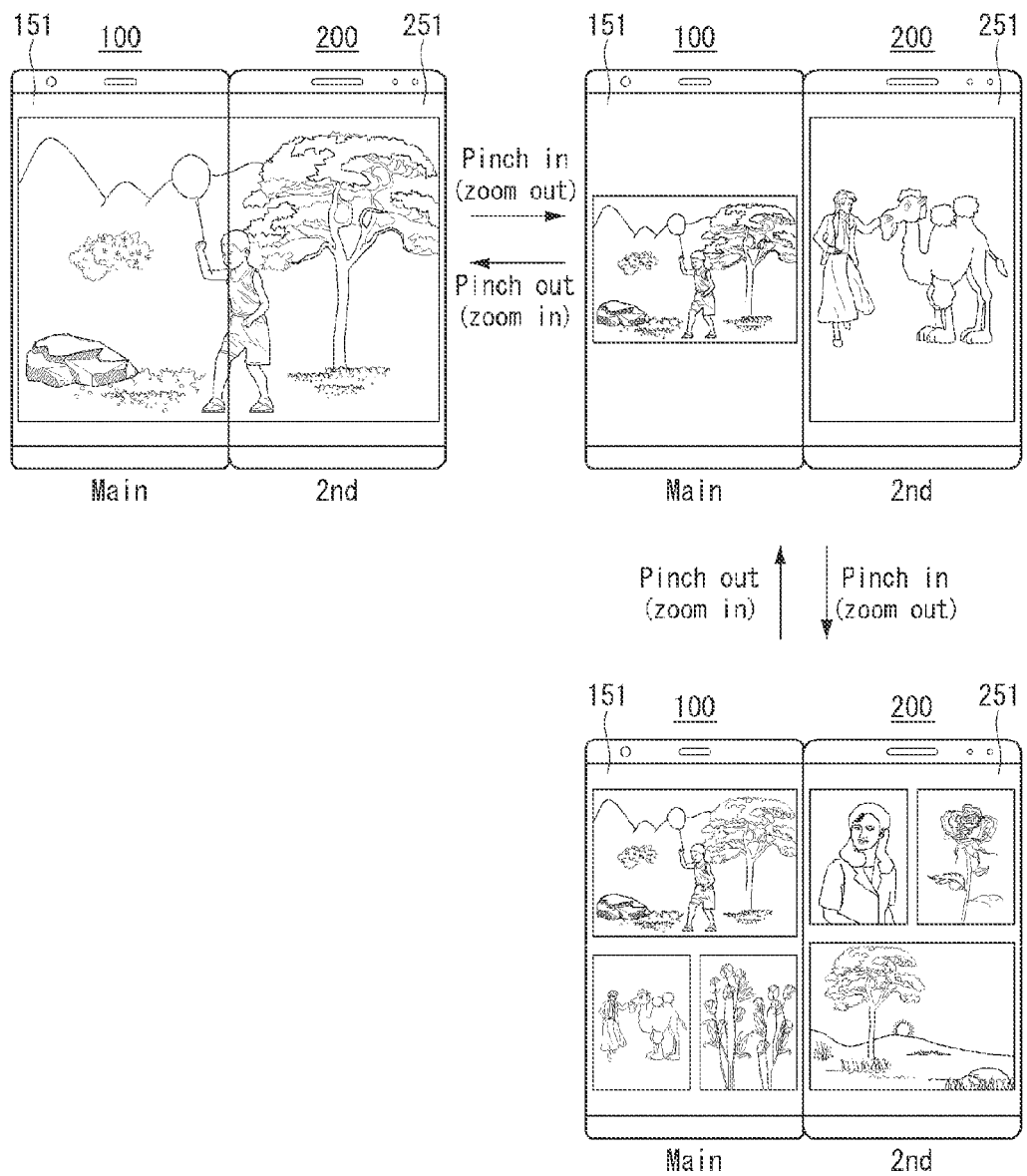
FIG. 31 is a view illustrating an example of changing an image display mode when the two terminals come into contact with each other according to the third embodiment of the present invention.

FIG. 31 is a view illustrating an example of changing an image display mode when the two terminals come into contact with each other according to the third embodiment of the present invention. Referring to FIG. 31, the controller 180 can switch image display modes through a zoom-in command or a zoom-out command with respect to the first touchscreen 151 and/or the second touchscreen 251 while the mobile terminal 100 and the external terminal 200 are in contact with each other.

For example, upon reception of zoom-out input in the full view mode (first mode), the controller 180 can control the first mode to be changed to a second mode in which only one image is displayed on each terminal. In addition, upon reception of zoom-out input in the second mode, the controller 180 can control images displayed on the mobile terminal 100 and the external terminal 200 to be displayed in the album view mode (third mode). When zoom-in input is received, operations opposite to the aforementioned operations may be performed.

Figure 32:
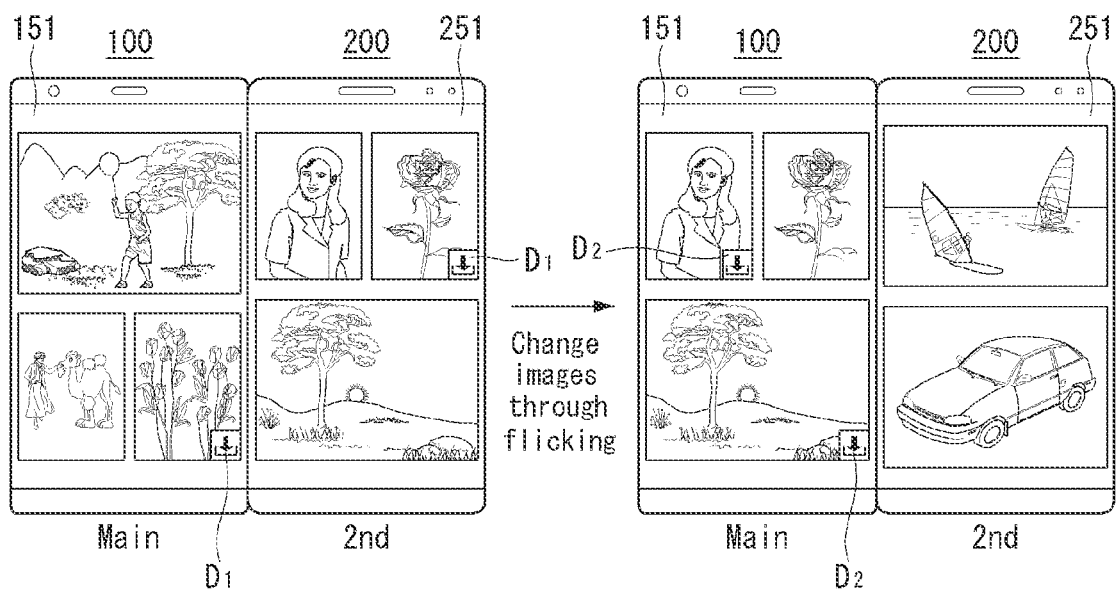
FIG. 32 is a view illustrating an example of displaying image sources when multiple pieces of content are displayed through the entire shared area according to the third embodiment of the present invention.

FIG. 32 is a view illustrating an example of displaying image sources when multiple pieces of content are displayed on the overall shared area according to the third embodiment of the present invention. Referring to FIG. 32, upon reception of flicking input applied to the shared area in the album view mode (third mode), the controller 180 can selectively change the position of the download indicator D1 and display the download indicator D1 in the changed position.

Figure 33:
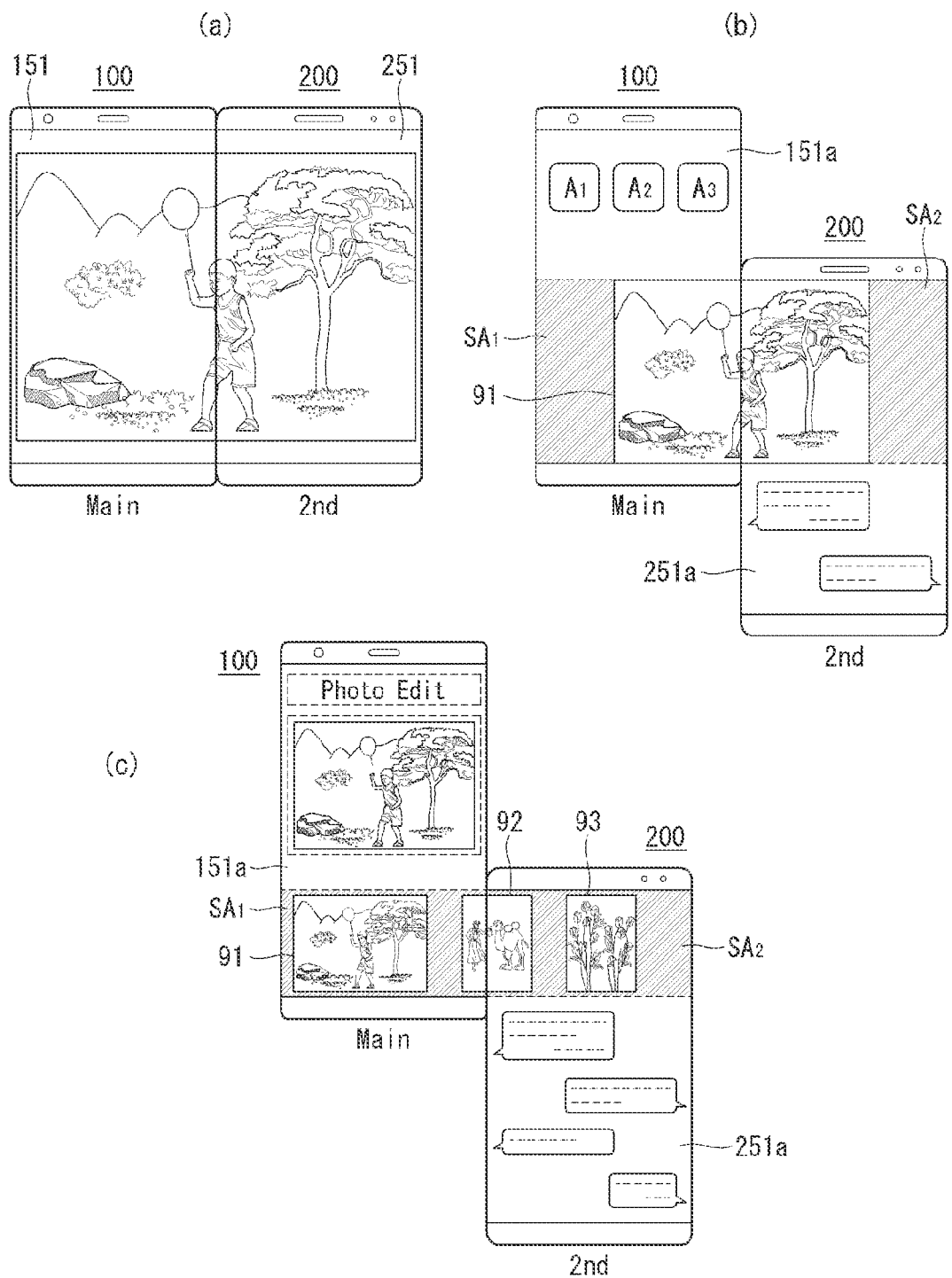
FIG. 33 is a view illustrating an example of performing multi-tasking operation in each terminal while changing the size of the shared area according to the third embodiment of the present invention.

FIG. 33 is a view illustrating an example of performing multi-tasking in each terminal while changing the size of the shared area according to the third embodiment of the present invention. Referring to FIG. 33(*a*), upon contact between the mobile terminal 100 and the external terminal 200 through the overall sides thereof, the specific image 91 may be displayed in the overall shared area including the first touchscreen 151 and the second touchscreen 251.

In this state, when the contact area decreases according to sliding of the external terminal 200, the shared area is also reduced. Accordingly, the controller 180 displays the specific image 91 in the first shared area SA1 and the second shared area SA2. An application executed through multi-tasking, other than the gallery application, or an execution screen of the application may be displayed in the areas 151*a* and 251*a* other than the first and second shared areas SA1 and SA2 (FIG. 31(*b*)).

When the contact area of the two terminals is further decreased, the first and second shared areas SA1 and SA2 may be used to display shared images 91, 92 and 93 and the remaining areas 151*a* and 251*a* may be used for multi-tasking (e.g. image editing or a messenger execution screen), as described above.

FIGS. 34 and 35 are views illustrating an example of sharing content through sharing trays when the content is displayed in the overall shared area according to the third embodiment of the present invention. Referring to FIG. 34(*a*), upon reception of predetermined input, the controller 180 can display a first sharing tray ST1 so the first sharing tray ST1 slides from a side of the first touchscreen 151.

The controller 180 can control a predetermined image to be stored in a desired terminal by associating the first sharing tray ST1 with the predetermined image.

Referring to FIG. 34(*b*), when the mobile terminal 200, the first external terminal 200 and the third external terminal 300 are sequentially brought into contact with each other to share the screens thereof, the controller 180 can display a second sharing tray ST2 so the second sharing tray ST2 slides from a side of the second touchscreen 251 upon reception of predetermined touch input applied to the first external terminal 200 located at the center.

Referring to FIG. 35(*a*), upon reception of long touch input applied to the specific image 93 while the sharing trays ST1 and ST2 are displayed, the controller 180 can display the sharing trays ST1 and ST2 differently such that the user can intuitively recognize the terminal in which the specific image 93 will be stored.

Referring to FIG. 35(*b*), the controller 180 can control a plurality of image to be stored in a desired terminal by associating the first sharing tray ST1 with the images. When contact between the mobile terminal 100 and the external terminal 200 is cancelled, content associated with the sharing tray ST1 may be stored in the mobile terminal 100 through input of moving the associated content to the touchscreen 151 of the mobile terminal 100.

Figure 36:
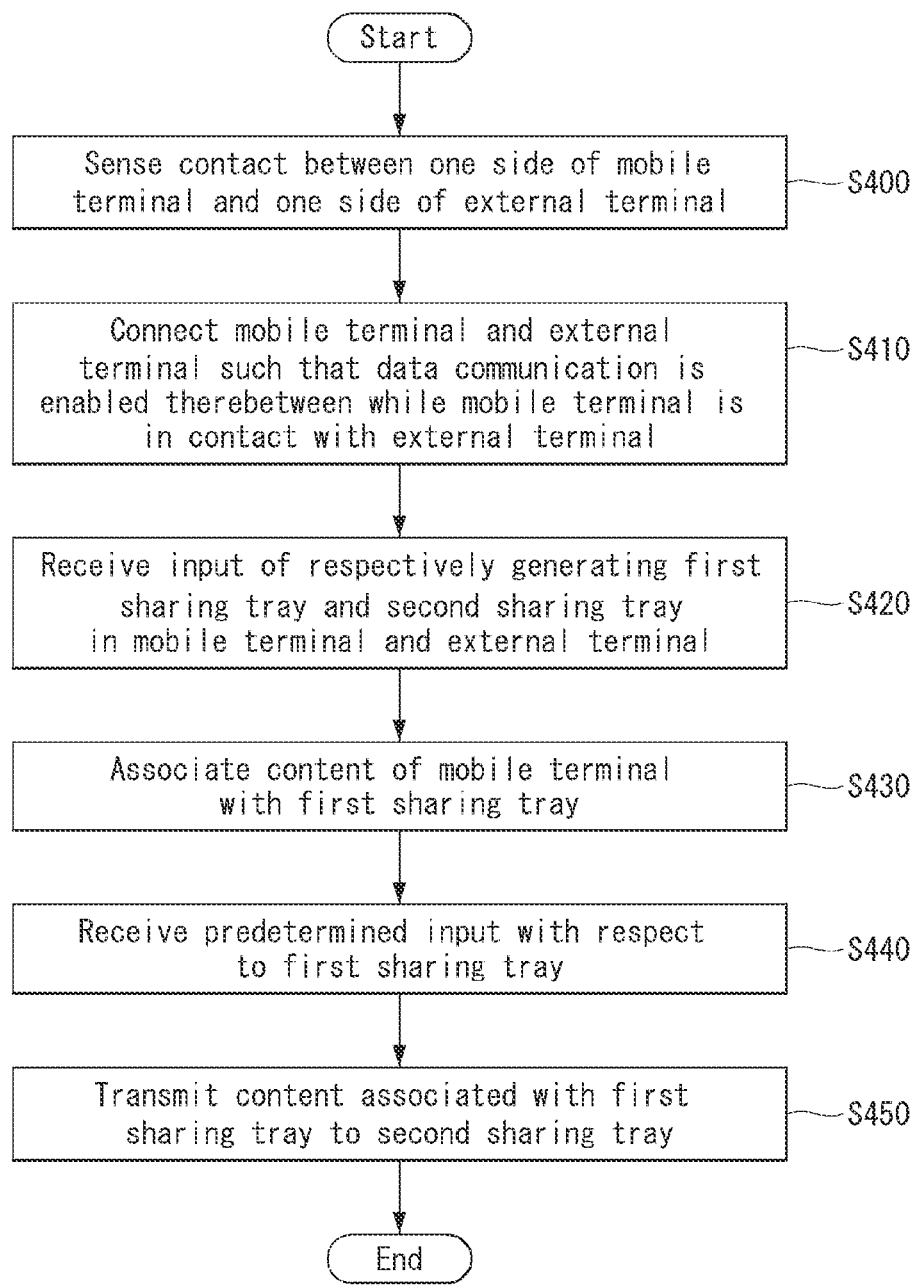
FIG. 36 is a flowchart illustrating a method for controlling the mobile terminal according to a fourth embodiment of the present invention.

FIG. 36 is a flowchart illustrating a method for controlling the mobile terminal according to a fourth embodiment of the present invention. The method for controlling the mobile terminal according to the fourth embodiment of the present invention may be implemented in the mobile terminal 100 described above with reference to FIGS. 1 to 3. The fourth embodiment of the present invention may be implemented based on the first embodiment. Further, the fourth embodiment is implemented on the assumption that the external terminal 200 coming into contact with the mobile terminal 100 can perform the same operations as those performed in the mobile terminal 100.

Referring to FIG. 36, the controller 180 can sense contact between one side of the mobile terminal 100 and one side of the external terminal 200 (S400) and generate a data communication link between the two terminals such that data communication can be performed therebetween while the two terminals come into contact with each other (S410).

The first to third embodiments of the present invention describe a case in which the mobile terminal 100 and the external terminal vertically come into contact with each other, whereas the fourth embodiment of the present invention describes a case in which the mobile terminal 100 and the external terminal horizontally come into contact with each other.

Figure 37:
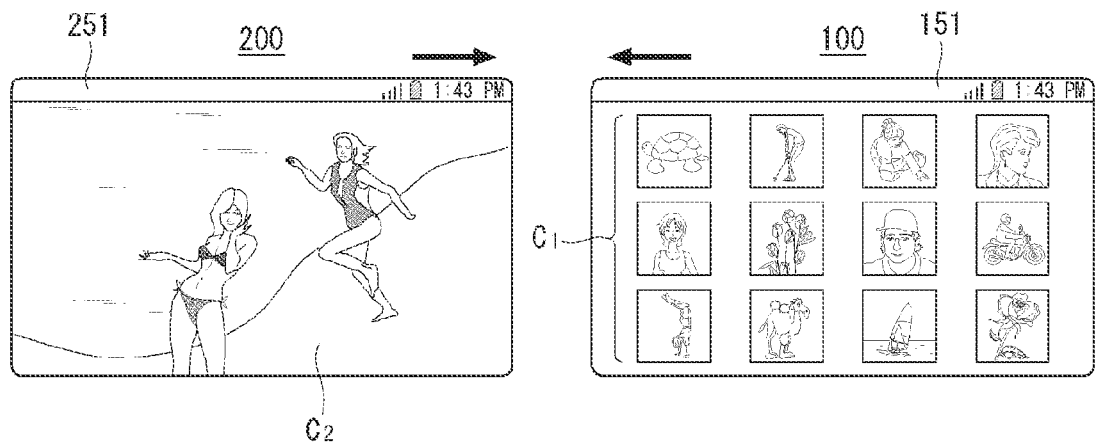
FIG. 37 is an overview illustrating a display state before the mobile terminal comes into contact with the external terminal according to the fourth embodiment of the present invention.

FIG. 37 illustrates a display state before the mobile terminal comes into contact with the external terminal according to the fourth embodiment of the present invention. Referring to FIG. 37, the mobile terminal 100 may display multiple pieces of content on the touchscreen 151. The external terminal 200 may display a video replay of a predetermined video file on the touchscreen 251. In this state, the two terminals may come into contact with each other.

Figure 38A:
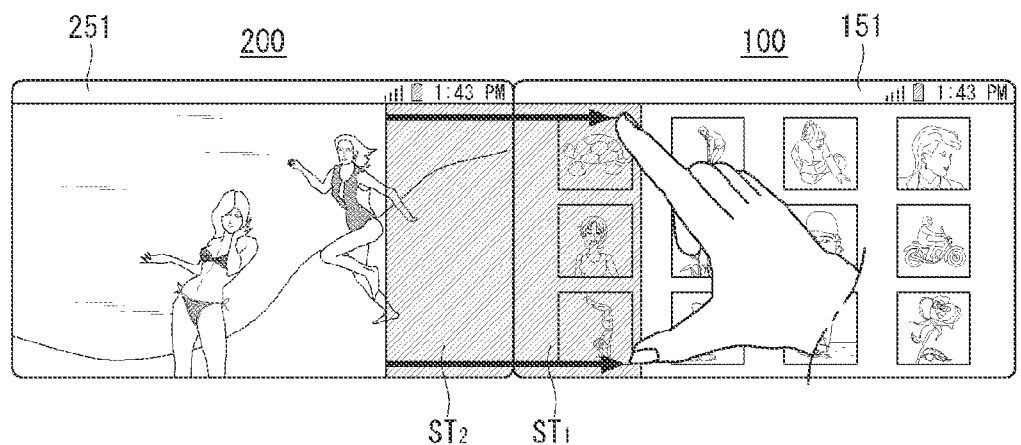
FIGS. 38A to 38E are views illustrating an example of sharing content through sharing trays between two terminals coming into contact with each other according to the fourth embodiment of the present invention.
Figure 38B:
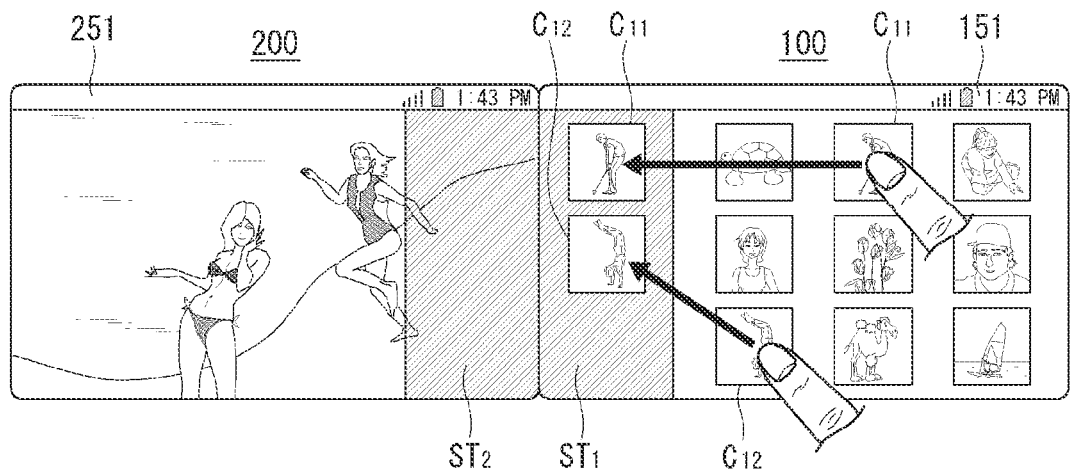

An example of sharing content according to the fourth embodiment will now be described with reference to FIGS. 38A to 38E. FIGS. 38A and 38B are views illustrating an example of sharing content through sharing trays between two terminals coming into contact with each other according to the fourth embodiment of the present invention.

The controller 180 can receive input of respectively generating the first and second sharing trays ST1 and ST2 in the mobile terminal 100 and the external terminal 200 (S420). An example of the input of generating the first and second sharing trays will now be described with reference to FIG. 38A.

Referring to FIG. 38A, the controller 180 of the mobile terminal 100 may receive drag input of extending touch input applied to the touchscreen 251 of the external terminal 200 to the touchscreen 151 of the mobile terminal 100.

That is, the start point of the drag input may correspond to one point on the touchscreen 251 of the external terminal 200. In addition, the drag input may be seamlessly extended to one point on the touchscreen 151 of the mobile terminal 100.

Accordingly, the second sharing tray ST2 can be generated on the touchscreen 251 of the external terminal 200 and the first sharing tray ST1 can be generated on the touchscreen 151 of the mobile terminal 100. According to the fourth embodiment of the present invention, content stored in each terminal can be shared with the other terminal through predetermined gesture input applied to the first and second sharing trays ST1 and ST2.

Referring to FIG. 38A, the first sharing tray ST1 may be overlaid on content displayed on the first touchscreen 151 so as to be provided as a separate layer through the gesture input. For example, the first sharing tray ST1 may be displayed in a space generated as the content displayed on the first touchscreen 151 is pushed aside.

The portion of the touchscreen 151 of the mobile terminal 100 other than the first sharing tray ST1 may be regarded as the first area and the portion of the touchscreen 251 of the external terminal 200 other than the second sharing tray ST2 may be regarded as the first area.

Referring to FIG. 36, the controller 180 can receive input of associating one or more pieces of content C11 and C12 displayed on the first touchscreen 151 with the first sharing tray ST1 (S430). Referring to FIG. 38B, the input of associating the content C11 and C12 with the first sharing tray ST1 may include input of dragging the content C11 and C12 to the first sharing tray ST1.

Figure 38C:
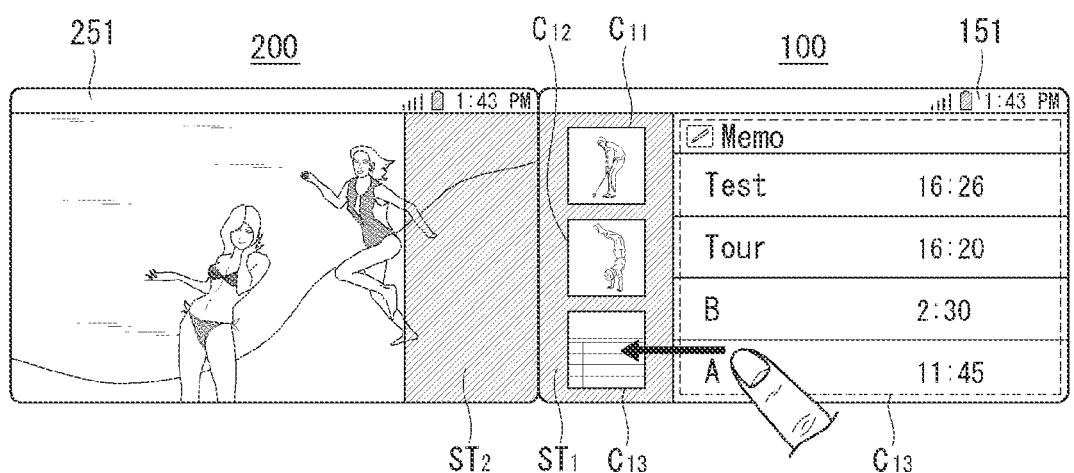

Referring to FIG. 38C, the controller 180 can display the execution screen of a predetermined application (e.g. note pad C13) on the first touchscreen 151. The input of associating content with the sharing tray may include input of touching a point on the execution screen of the specific application and dragging the touch point to the first sharing tray ST1.

Figure 38D:
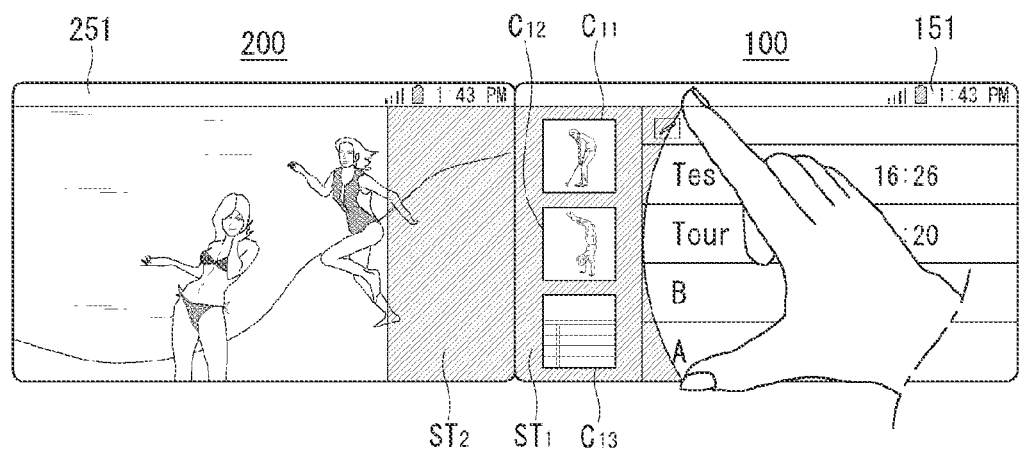
Figure 38E:
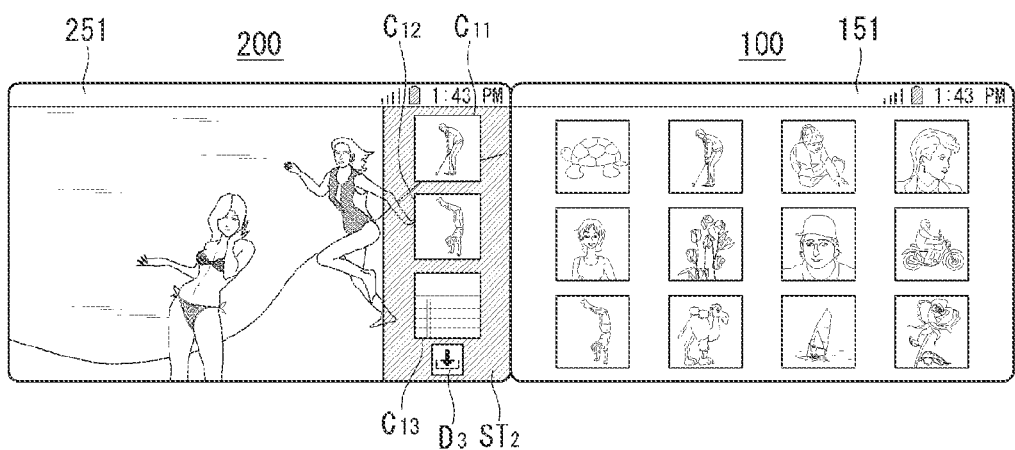

Referring to FIGS. 38B and 38C, the content C12 and C13 can be associated with the first sharing tray ST1 according to the drag input. Referring to FIG. 36, upon reception of predetermined input with respect to the first sharing tray ST1 (S440), the controller 180 can transmit content associated with the second sharing tray ST2 to the second sharing tray ST3 (S450). Referring to FIGS. 38D and 38E, predetermined input with respect to the first sharing tray ST1 may be received.

The controller 180 can display the first sharing tray ST1 as an entity having elasticity. Accordingly, the controller 180 can receive touch input of expanding at least part of the entity ST1 to a direction opposite to the external terminal 200 and then returning the expanded entity ST1 to the original position thereof. The controller 180 can transmit the associated content to the second sharing tray ST2 of the external terminal 200 when the extended entity ST1 is returned to the original position thereof.

As the first sharing tray ST1 is displayed as an entity having elasticity, the user can transmit the content C11, C12 and C13 associated with the first sharing tray ST1 to the external terminal 200 through gesture input of expanding the first sharing tray ST1 and then flicking the expanded first sharing tray ST1 to the external terminal 200.

When the predetermined gesture input is released, the controller 180 can control the first sharing tray ST1 to disappear. The second sharing stray ST2 of the external terminal 200 may include the content C11, C12 and C13 previously present in the mobile terminal 200 according to the predetermined gesture input.

The controller 180 can display a download key D3 for determining whether to download content along with the content C11, C12 and C13 in the second sharing key ST2. The external terminal 200 may determine whether to download the content C11, C12 and C13 transmitted thereto through the download key D3.

Figure 39A:
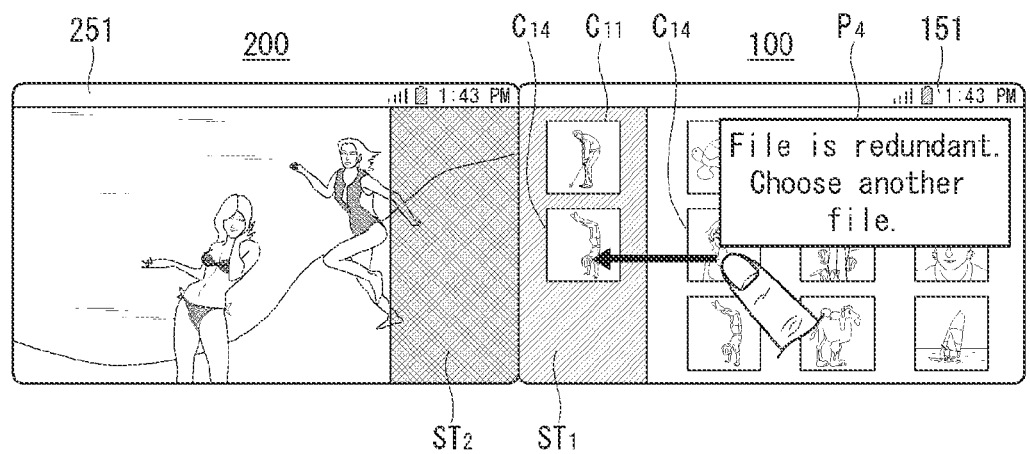
FIGS. 39A and 39B are views illustrating an operation of the mobile terminal when content to be shared is redundant content according to the fourth embodiment of the present invention.
Figure 39B:
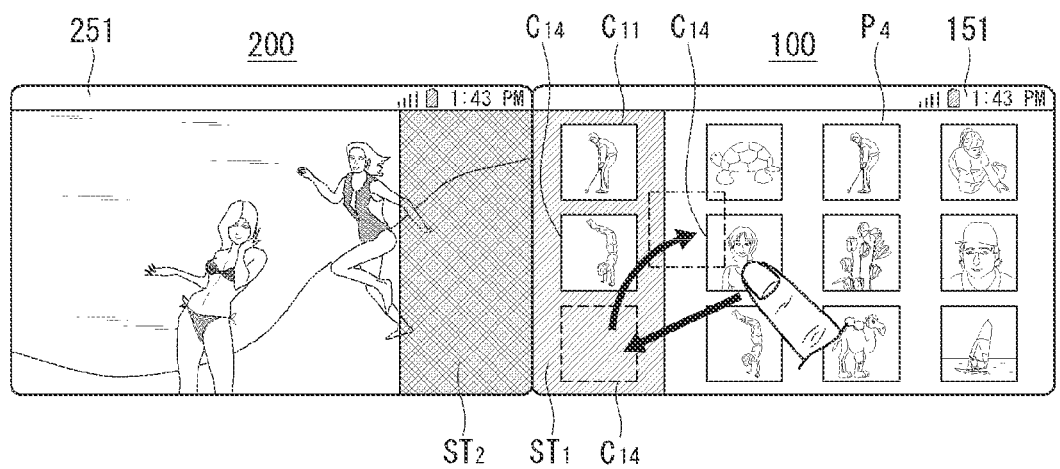

Next, FIGS. 39A and 39B are views illustrating an operation of the mobile terminal when content to be shared is redundant content according to the fourth embodiment of the present invention.

According to the fourth embodiment of the present invention, when predetermined content is shared with the external terminal 200 through the first sharing tray ST1, display characteristics of the first and second sharing trays ST1 and ST2 may be changed such that the user can intuitively recognize that the content to be shared is content previously present in the external terminal 200 or a redundant file associated with the first sharing tray ST1.

Referring to FIG. 39A, upon reception of long touch input applied to specific content C14, the controller 180 can determine whether the specific content C14 is already present in the external terminal 200. The controller 180 can control an animation effect of changing the color of the second sharing tray ST2 of the external terminal 200 to be applied to the second sharing tray ST2 upon determining that the specific content C14 is already present in the external terminal.

For example, the controller 180 can display, on the touchscreen 151, a pop-up window P4 which indicates that the specific content C14 is content already associated with the first sharing tray ST1.

Referring to FIG. 39B, upon reception of input of dragging the specific content C14 to the first sharing tray ST1, the controller 180 can provide animation effect to the content C14 such that the content C14 is blocked while moving to the first sharing tray ST1. Accordingly, the controller 180 can provide a user interface for avoiding redundant sharing of content.

The example of sharing an image displayed on the mobile terminal 100 with the external terminal 200 through the sharing trays has been described. However, content shared in the present invention is not limited to the image. For example, content to be shared may be a video file provided in streaming form.

Figure 40A:
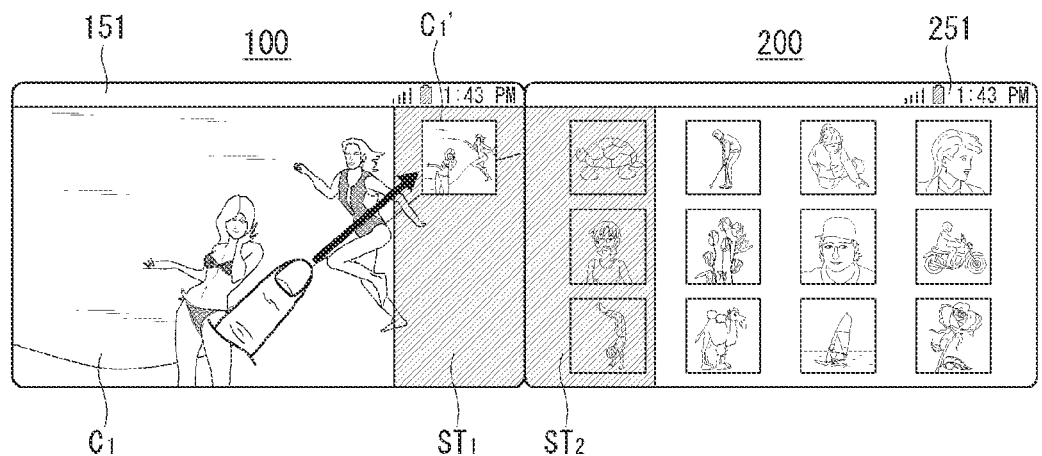
FIGS. 40A and 40B are views illustrating an example of a shared video file according to the fourth embodiment of the present invention.
Figure 40B:
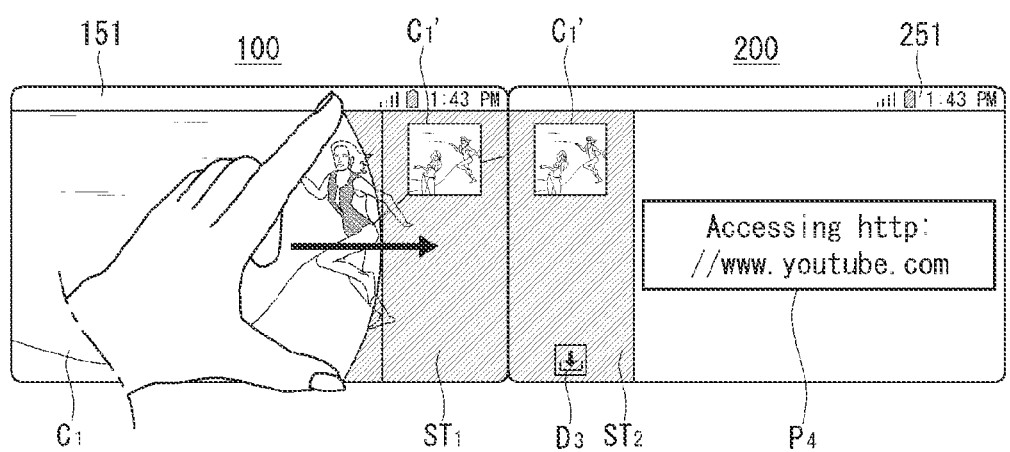

FIGS. 40A and 40B are views illustrating an example of a shared video file according to the fourth embodiment of the present invention when content to be shared is the video file. Referring to FIGS. 40A and 40B, the controller 180 can reproduce a predetermined video file C1 in a streaming manner. Upon reception of input of dragging the reproduced image of the video file to the first sharing tray ST1, the controller 180 can display a thumbnail image C1' of the video file on the first sharing tray ST1.

Then, the controller 180 can transmit the thumbnail image C1' of the video file to the second sharing tray ST2 upon reception of the gesture input described above with reference to FIG. 38D.

When the download key D3 displayed on the second sharing tray ST2 of the external terminal 200 is selected, the controller 180 can transmit a link address provided by the video file C1 to the external terminal 200. The external terminal 200 may display, on the touchscreen 251 thereof, a pop-up window P4 indicating that the link address is being accessed.

Figure 41A:
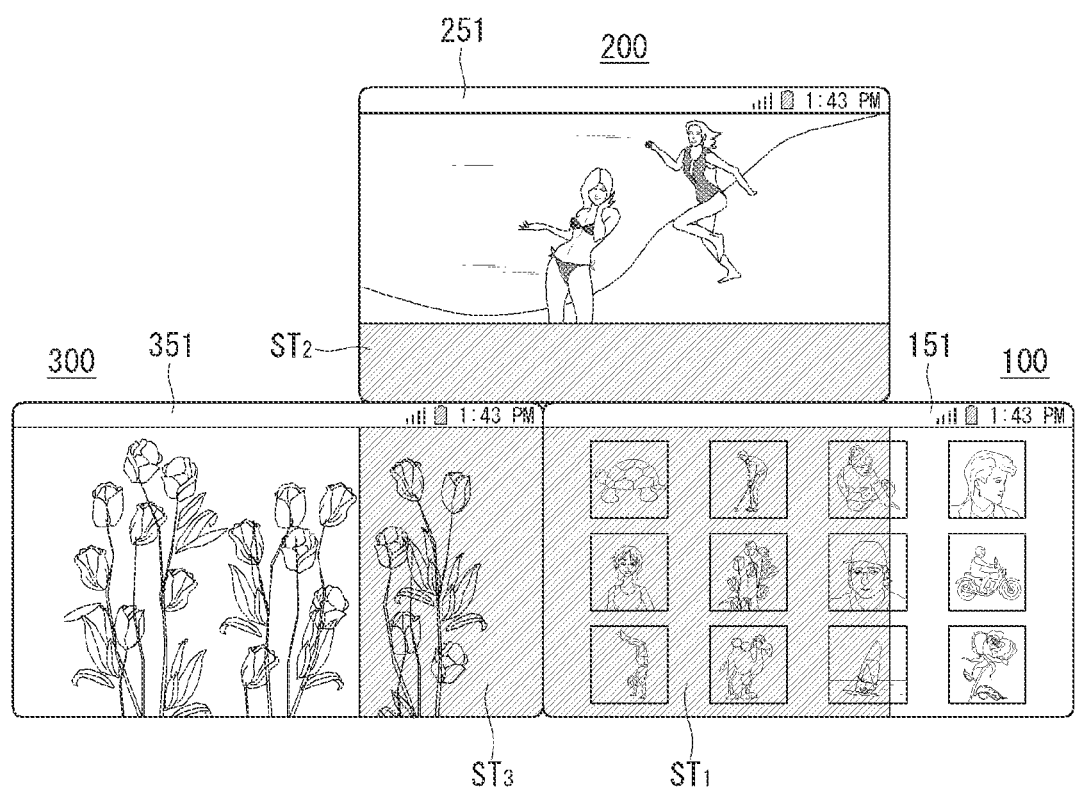
FIGS. 41A and 41B are views illustrating a change in the size of the shared area according to a change in the contact area of the mobile terminal and at least one external terminal according to the fourth embodiment of the present invention.
Figure 41B:
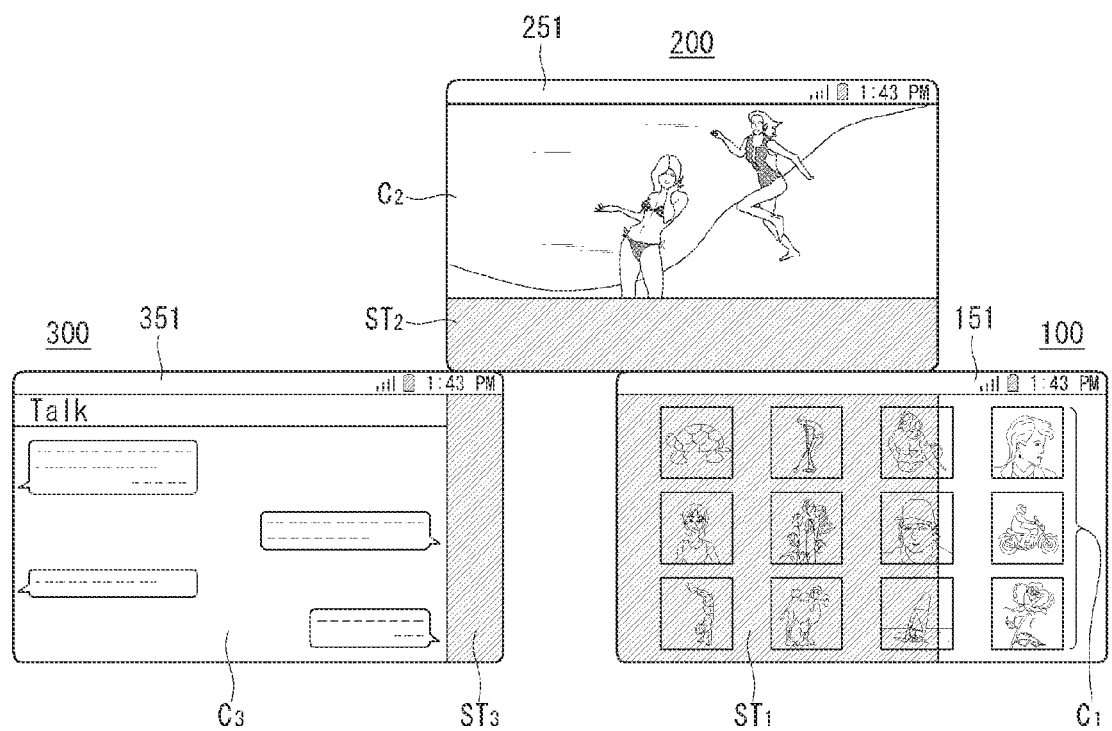

FIGS. 41A and 41B are views illustrating a change in the size of the shared area according to a change in the contact area of the mobile terminal and at least one external terminal according to the fourth embodiment of the present invention.

Referring to FIG. 41A, the mobile terminal 100 may come into contact with the first external terminal 200 and the second external terminal 300. Specifically, one side of the mobile terminal 100 may come into contact with one side of the first external terminal 200 and another side of the mobile terminal 100 may come into contact with one side of the second external terminal 300. In addition, at least part of the side of the first external terminal 200 may come into contact with another side of the second external terminal 300. Thus, the mobile terminal 100 can come into contact with the first external terminal 200 and the second external terminal 300.

The contact portions of the three terminals may be respectively referred to as first, second and third sharing trays ST1, ST2 and ST3. Accordingly, the mobile terminal 100 may associate one or more pieces of content with the first sharing tray ST1, and then share the associated content with the first external terminal 200 upon reception of the predetermined gesture input described above with reference to FIG. 38, that is, gesture input of flipping the first sharing tray ST1 to the first external terminal 200.

In addition, the controller 180 can share the associated content with the second external terminal 300 upon reception of gesture input of flipping the first sharing tray ST1 to the second external terminal 300.

According to the fourth embodiment of the present invention, the areas of the sharing trays of the terminals can be changed by controlling the contact areas of the terminals to be different from one another, as described in the aforementioned embodiments.

Referring to FIG. 41B, when the second external terminal 300 is slid to the left in the state of FIG. 41A, contact between the mobile terminal 10 and the second external terminal 300 is cancelled and contact between the first external terminal and the second external terminal 300 may be maintained with a minimized contact area therebetween. Even In this instance, the three terminals 100, 200 and 300 can maintain a data link for sharing content.

The third sharing tray ST3 of the second external terminal 300 may be minimized and the remaining touchscreen area 351 may be maximized. The second external terminal 300 may perform multi-tasking through the touchscreen 351. For example, the second external terminal 300 can execute a predetermined messenger application C3 In addition, simultaneously, maintain the mode of sharing content with the mobile terminal 100 and the first external terminal 200.

Figure 42:
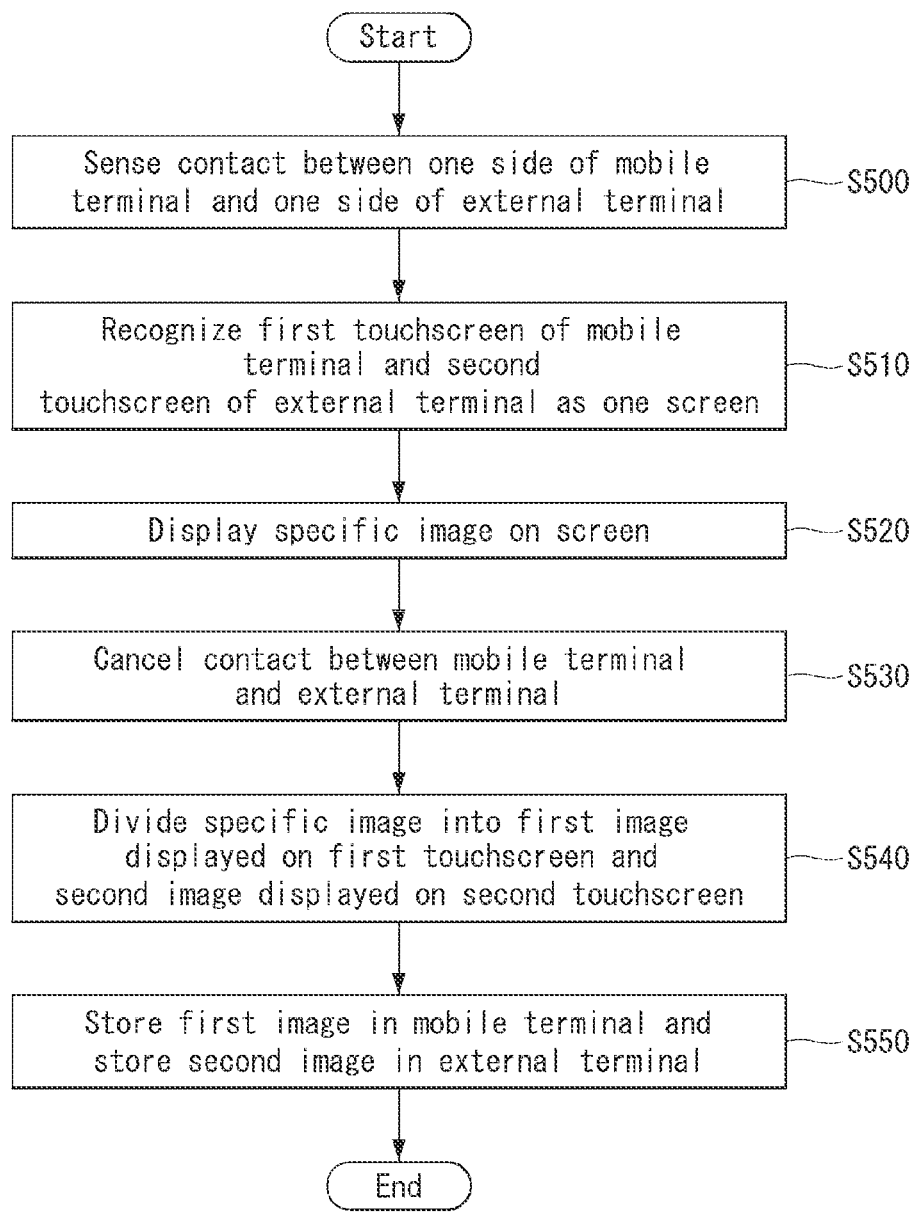
FIG. 42 is a flowchart illustrating a method for controlling the mobile terminal according to a fifth embodiment of the present invention.
Figure 43:
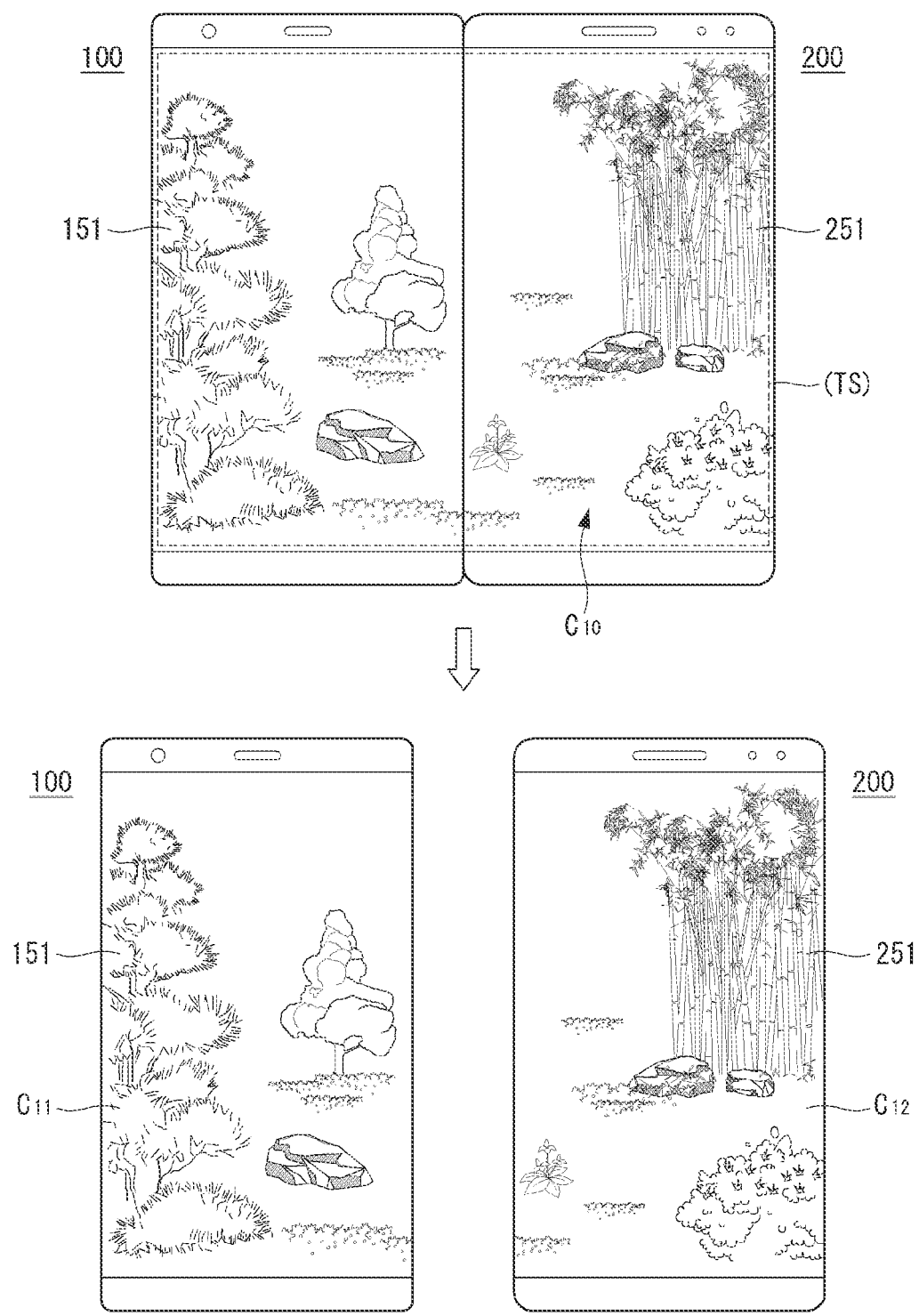
FIG. 43 is a view illustrating the fifth embodiment of the present invention.

FIG. 42 is a flowchart illustrating a method for controlling the mobile terminal according to a fifth embodiment of the present invention and FIG. 43 is a view illustrating the fifth embodiment of the present invention.

The method for controlling the mobile terminal according to the fifth embodiment of the present invention may be implemented in the mobile terminal 100 described above with reference to FIGS. 1 to 3. The fifth embodiment of the present invention may be implemented based on the first embodiment.

The fifth embodiment is implemented on the assumption that the external terminal 200 coming into contact with the mobile terminal 100 can perform the same operations as those performed in the mobile terminal 100.

Referring to FIGS. 42 and 43, the controller 180 can sense contact between one side of the mobile terminal 100 and one side of the external terminal 200 (S500).

The touchscreen 151 of the mobile terminal 100 and the second touchscreen 251 of the external terminal 200 may be recognized as one screen TS when one side of the mobile terminal 100 comes into contact with one side of the external terminal 200 (S510).

Upon recognition of the first touchscreen 151 and the second touchscreen 251 as one screen TS, the controller 180 of the mobile terminal 100 may control display of the second touchscreen 251 through touch input applied to the first touchscreen 151. In addition, the controller 180 can recognize touch input applied to the second touchscreen 251 and respond to the touch input.

The touchscreen TS is obtained by physically seamlessly connecting the first touchscreen 151 and the second touchscreen 251 when one side of the mobile terminal 100 comes into contact with one side of the external terminal 200, and thus one image may be naturally displayed through the first touchscreen 151 and the second touchscreen 251.

The controller 180 can display a specific image C10 on the touchscreen TS (S520). The controller 180 can receive predetermined input with respect to the specific image C10. Contact between the mobile terminal 100 and the external terminal may be cancelled upon reception of the predetermined input (S530).

The predetermined input may include touch input applied to the first touchscreen 151 of the mobile terminal 100 or the second touchscreen 251 of the external terminal 200. Furthermore, the predetermined input may include input of selecting a predetermined menu white the specific image C10 is displayed on the touchscreen TS.

Upon cancellation of contact between the mobile terminal 100 and the external terminal 200, the controller 180 can segment the specific image C10 into a first image C11 displayed on the first touchscreen 151 and a second image C12 displayed on the second touchscreen 251 (S540).

Image segmentation is an example of an editing process. Accordingly, various editing processes in addition to image segmentation may be applied to the first image C11 and the second image C12 upon termination of contact between the two terminals.

While the specific image C10 shown in FIG. 43 is symmetrical on the basis of the contact face of the two terminals, the present invention is not limited thereto and the specific image C10 may be any image that can be displayed as one image.

The controller 180 can store the first image C11 in the mobile terminal 100 and store the second image C12 in the external terminal 200 (S550). The controller 180 can control the first image C11 to be displayed on the first touchscreen 151 and control the second image C12 to be displayed on the second touchscreen 251 of the external terminal 200.

Furthermore, the controller 180 can control the first image C11 to be set as a lock screen of the mobile terminal 100 and displayed on the first touchscreen 151 in the lock state upon termination of contact between the mobile terminal 100 and the external terminal 200.

In addition, the external terminal 200 may control the second image C12 to be set as a lock screen thereof and displayed on the second touchscreen 251 in the lock state upon cancellation of contact between the mobile terminal 100 and the external terminal 200.

The controller 180 can set the first image C11 as the homescreen of the mobile terminal 100 upon cancellation of contact between the mobile terminal 100 and the external terminal 200. The external terminal 200 may perform the same operation.

Thus, according to at least one of embodiments of the present invention, it is possible to easily share content of two terminals therebetween through a touchscreen area shared through physical contact between the terminals.

In addition, according to at least one of embodiments of the present invention, it is possible to easily use content through a large screen by using touchscreens of the two terminals as one screen according to physical contact between the two terminals.

Furthermore, according to at least one of embodiments of the present invention, it is possible to use content in various manners in the mobile terminal according to physical contact between the two terminals and cancellation of contact.

The first to fifth embodiments of the present invention may be independently implemented or one or more thereof may be combined and implemented.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely and are not to be considered as limiting the present invention. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the embodiments described herein may be combined in various ways to obtain additional and/or alternative embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal, comprising:
   a body;
   a touchscreen provided to a front and extending to side of the body and configured to display content; and
   a controller configured to:
   detect one side of the body comes into contact with one side of an external terminal,
   display a first area on the touchscreen corresponding to a contact area of the body and the external terminal and a second area including the content,
   receive an input of moving the content displayed in the second area to the first area,
   display the content in the first area in response to the input,
   share the content in the first area with the external terminal, and
   control sizes of the first and second areas to vary according to a length of a sliding contact surface between the body and the external terminal when the one side of the body and the one side of the external terminal come into contact with each other in a sliding manner.

2. The mobile terminal of claim 1, wherein the first area includes a first shared area included in the touchscreen and a second shared area extended to a touchscreen of the external terminal sharing the contact area with the first shared area, and
   wherein the controller is further configured to control the first shared area and the second shared area as one overall shared area.

3. The mobile terminal of claim 2, wherein the controller is further configured to:
   receive a predetermined input applied to the content displayed in the first area, and
   magnify and display the content in the overall shared area including the first shared area and the second shared area.

4. The mobile terminal of claim 3, wherein the controller is further configured to display multiple shared pieces of content in the shared area when a plurality of zoom-out inputs is sequentially input for the content displayed in the overall shared area.

5. The mobile terminal of claim 2, wherein the controller is further configured to:
   display multiple pieces of content that have been moved to the overall shared area, and
   scroll the multiple pieces of content through a scroll input applied to the shared area.

6. The mobile terminal of claim 2, wherein the input of moving the content to the first area includes at least one of a drag input of moving the content to the first shared area, a drag input of moving the content to the second shared area, and a drag input of moving content displayed in the first shared area to the second shared area.

7. The mobile terminal of claim 2, wherein the controller is further configured to add a download indicator to the content when the content displayed in the first shared area is not content stored in the mobile terminal.

8. The mobile terminal of claim 7, wherein the controller is further configured to download the content and to store the downloaded content in a memory upon reception of an input of selecting the download indicator.

9. The mobile terminal of claim 2, wherein the controller is further configured to share content associated with a specific application through the shared area when the mobile terminal comes into contact with the external terminal during execution of the specific application.

10. The mobile terminal of claim 9, wherein the controller is further configured to control the specific application to be executed in the external terminal.

11. The mobile terminal of claim 9, wherein the controller is further configured to display at least one application commonly installed in the mobile terminal and the external terminal in the first shared area and the second shared area.

12. The mobile terminal of claim 2, wherein the controller is further configured to execute a first application for displaying one or more images and to control a specific image from among the one or more images to be displayed in the overall shared area when the one side of the mobile terminal comes into contact with the one side of the external terminal while the specific image is displayed on the touchscreen.

13. The mobile terminal of claim 12, wherein the contact area of the mobile terminal and the external terminal corresponds to the overall side of the mobile terminal and the overall side of the external terminal.

14. The mobile terminal of claim 12, wherein the controller is further configured to arrange a first image stored in the mobile terminal and a second image stored in the external terminal based on predetermined information and to display the first and second images in the overall shared area in a scrolling manner, upon reception of flicking input applied to the shared area.

15. The mobile terminal of claim 2, wherein the controller is further configured to seamlessly display a first image output through a touchscreen provided to the side of the body and a second image output through a touchscreen included in the external terminal when the content is displayed in the overall shared area.

16. The mobile terminal of claim 1, wherein the controller is further configured to execute a predetermined application through the second area irrespective of the sharing the content through the first area.

17. The mobile terminal of claim 1, wherein the content displayed in the second area includes at least one of a still image, multimedia content including a video or a reproducible music file, an application, a text file and a contact list.

18. The mobile terminal of claim 1, further comprising:
a radio communication unit,
wherein the mobile terminal and the external terminal are connected such that data communication is performed therebetween through the radio communication unit while the mobile terminal and the external terminal are in contact with each other, when the one side of the body and the one side of the external terminal come into contact with each other.

19. A method for controlling a mobile terminal, the method comprising:
detecting one side of a body of the mobile terminal comes into contact with one side of an external terminal;
displaying, via a touchscreen of the mobile terminal, a first area corresponding to a contact area of the body and the external terminal and a second area including the content;
receiving, via a controller of the mobile terminal, an input of moving the content displayed in the second area to the first area;
displaying the content in the first area of the touchscreen in response to the input; and
sharing, via the controller, the content in the first area with the external terminal,
wherein sizes of the first and second areas are varied according to a length of a sliding contact surface between the body and the external terminal when the one side of the body and the one side of the external terminal come into contact with each other in a sliding manner.

* * * * *